(12) United States Patent
Nagoya et al.

(10) Patent No.: US 11,450,293 B2
(45) Date of Patent: Sep. 20, 2022

(54) PHASE MODULATOR AND PHASE MODULATION METHOD FOR REFLECTING INCIDENT LIGHT AT DESIRED ANGLE

(71) Applicant: JVCKENWOOD Corporation, Yokohama (JP)

(72) Inventors: Takashi Nagoya, Yokohama (JP); Shunsuke Izawa, Yokohama (JP); Kensei Oe, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/477,989

(22) Filed: Sep. 17, 2021

(65) Prior Publication Data

US 2022/0005430 A1 Jan. 6, 2022

Related U.S. Application Data

(63) Continuation of application No. PCT/JP2020/013395, filed on Mar. 25, 2020.

(30) Foreign Application Priority Data

Mar. 25, 2019 (JP) .............................. JP2019-057214
Mar. 25, 2019 (JP) .............................. JP2019-057219

(Continued)

(51) Int. Cl.
*G09G 3/36* (2006.01)
*G02F 1/1343* (2006.01)
*G02F 1/1362* (2006.01)

(52) U.S. Cl.
CPC ..... *G09G 3/3674* (2013.01); *G02F 1/134336* (2013.01); *G02F 1/136277* (2013.01); *G09G 3/3696* (2013.01); *G09G 2300/0426* (2013.01)

(58) Field of Classification Search
CPC .......... G09G 3/3674; G09G 2300/0426; G02F 1/134336; G02F 1/136277; G09F 3/3696
See application file for complete search history.

(56) References Cited

U.S. PATENT DOCUMENTS

2003/0201729 A1* 10/2003 Kimura ................ G09G 3/3258
315/169.3
2004/0171221 A1* 9/2004 Takatori .............. G02F 1/13306
438/281

(Continued)

FOREIGN PATENT DOCUMENTS

JP 2014-056004 A 3/2014

*Primary Examiner* — Sanghyuk Park
(74) *Attorney, Agent, or Firm* — Nath, Goldberg & Meyer; Jerald L. Meyer

(57) ABSTRACT

A phase modulator for reflecting incident light at a desired angle includes pixel circuits and reflection pixels provided at positions where column data lines and row scanning lines orthogonal and intersect each other, and liquid crystal layers where each refractive index to incident light is changed by a driving voltage supplied from one pixel circuit. Each column data line outputs a control voltage which varies in a range up to a predetermined maximum voltage to corresponding pixel circuits. Each pixel circuit includes a charge pump for amplifying the control voltage. When the driving voltage supplied to a corresponding liquid crystal layer is not higher than the maximum voltage, the control voltage is outputted to the liquid crystal layer without amplifying. When the driving voltage supplied to the liquid crystal layer exceeds the maximum voltage, the control voltage is amplified by a charge pump and outputted to the liquid crystal layer.

20 Claims, 33 Drawing Sheets

(30) Foreign Application Priority Data

| Mar. 25, 2019 | (JP) | JP2019-057220 |
| Mar. 25, 2019 | (JP) | JP2019-057222 |
| Mar. 25, 2019 | (JP) | JP2019-057225 |
| Mar. 25, 2019 | (JP) | JP2019-057230 |
| Mar. 25, 2019 | (JP) | JP2019-057239 |
| Mar. 25, 2019 | (JP) | JP2019-057247 |

(56) References Cited

U.S. PATENT DOCUMENTS

| 2008/0055222 A1* | 3/2008 | Chen | G09G 3/3648 |
| | | | 345/90 |
| 2009/0121987 A1* | 5/2009 | Fukutome | G09G 3/342 |
| | | | 345/82 |
| 2012/0056558 A1* | 3/2012 | Toshiya | G09G 3/3659 |
| | | | 315/294 |
| 2014/0085561 A1* | 3/2014 | Takatori | G09G 3/3651 |
| | | | 349/46 |
| 2015/0042632 A1* | 2/2015 | Amino | G09G 3/3696 |
| | | | 345/212 |

* cited by examiner pixel circuit region (a) (b)

(a) (b)

FIG. 32A   21A 1st pixel circuit
(a)
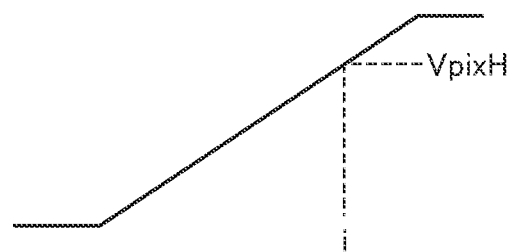
(b)
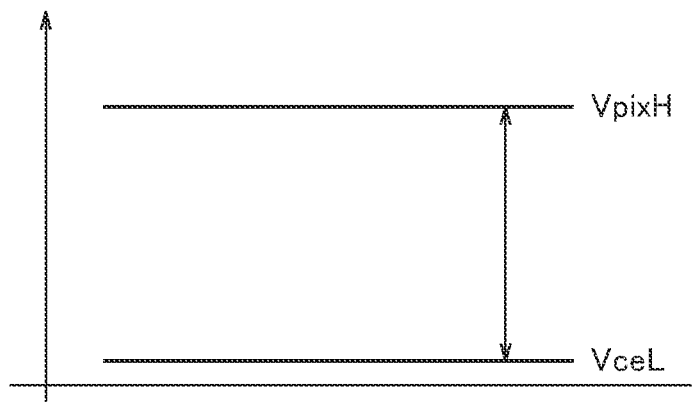
FIG. 32B   21B 2nd pixel circuit
(a)
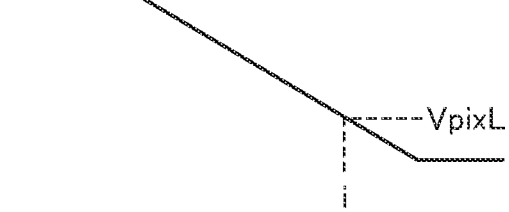
(b)
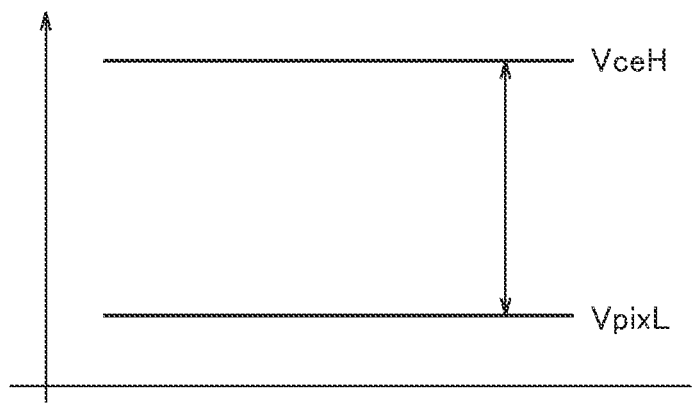

PHASE MODULATOR AND PHASE MODULATION METHOD FOR REFLECTING INCIDENT LIGHT AT DESIRED ANGLE

CROSS-REFERENCE TO RELATED APPLICATIONS

The present application is a continuation of International Application No. PCT/JP2020/013395, filed on Mar. 25, 2020, and based upon and claims the benefit of priority from Japanese Patent Applications No. 2019-057214, No. 2019-057220, No. 2019-057247, No. 2019-057230, No. 2019-057219, No. 2019-057222, No. 2019-057225, and No. 2019-057239, each filed on Mar. 25, 2019, the entire contents of which are incorporated herein by reference.

TECHNICAL FIELD

The disclosure relates to a phase modulator and a phase modulation method.

BACKGROUND

As disclosed in Patent Document 1 (JP 2014-056004 A), a phase modulator using LCOS (Liquid Crystal On Silicon) has been proposed. In paragraph [0015] and the like in Patent Document 1, for example, that a voltage applied to each pixel of an LCOS element is controlled to phase modulate incident light.

SUMMARY

In a phase modulator that handles infrared light, long wavelength light must be sufficiently modulated. For this reason, as a means for securing a high modulation factor, a liquid crystal material having a high refractive index anisotropy is basically used, but in addition, first, a liquid crystal layer is made thick, and second, a voltage applied to the liquid crystal layer is made high. The method of increasing the thickness of the liquid crystal layer has a demerit that the alignment of the liquid crystal tends to be disturbed.

On the other hand, in the technique disclosed in Patent Document 1, since a voltage supplied from a driving circuit to each pixel is limited, the modulation amount at the time of phase modulation cannot be increased. If the voltage outputted from the driving circuit is increased, the withstand voltage of the circuit element needs to be increased, and further, the power consumption increases.

It is an object of the present application to provide a phase modulator and a phase modulation method capable of suppressing an increase in the thickness of a liquid crystal layer and securing a sufficient amount of phase modulation even in infrared light by increasing a voltage applied to the liquid crystal layer without increasing a voltage supplied from a column data line to a pixel circuit.

In an embodiment, a phase modulator for reflecting incident light at a desired angle includes: a plurality of column data lines and a plurality of row scanning lines orthogonal to each other; a plurality of pixel circuits provided at positions where the plurality of column data lines and the plurality of row scanning lines intersect each other; a plurality of reflection pixels provided respectively corresponding to the plurality of pixel circuits; a plurality of liquid crystal layers provided corresponding to each of the plurality of reflection pixels and each of whose refractive index with respect to incident light is changed by a driving voltage supplied from a corresponding pixel circuit; and a charge pump controller. Each of the column data lines outputs a control voltage varying within a range up to a predetermined maximum voltage to each of the pixel circuits. Each of the pixel circuits includes a charge pump configured to amplify the control voltage. When the driving voltage supplied to a corresponding liquid crystal layer is not higher than the predetermined maximum voltage, the charge pump controller is configured to output the control voltage to the corresponding liquid crystal layer without amplifying the control voltage, and when the driving voltage exceeds the predetermined maximum voltage, the charge pump controller is configured to control the charge pump to amplify the control voltage and output a amplified control voltage to the corresponding liquid crystal layer.

In an embodiment, a phase modulation method for reflecting incident light at a desired angle includes: a control voltage output step of outputting a control voltage varying in a range up to a predetermined maximum voltage to a plurality of pixel circuits provided at positions where a plurality of column data lines and a plurality of row scanning lines orthogonal to each other intersect each other; a non-amplified voltage output step of outputting the control voltage to liquid crystal layers without amplifying the control voltage when a driving voltage supplied to the liquid crystal layers is not higher than the predetermined maximum voltage, the liquid crystal layers provided corresponding to each of the pixel circuits and each of whose refractive index for incident light varies according to the input voltage; and an amplified voltage output step of amplifying the control voltage by a charge pump and outputting the amplified control voltage to the liquid crystal layers when the driving voltage exceeds the predetermined maximum voltage.

With the phase modulator and the phase modulation method according to the embodiment, since the phase modulation amount of the reflected light can be set large without increasing the control voltages supplied from the column data lines to the pixel circuits, the thickness of the liquid crystal layer for securing the phase modulation amount and the disturbance of the liquid crystal orientation due to the thickness of the liquid crystal layer can be suppressed.

BRIEF DESCRIPTION OF THE DRAWINGS

FIG. 5 is an explanatory diagram showing directions of reflected light reflected by each pixel circuit provided in the phase modulator according to each embodiment, where sa1 indicates that a charge pump is off and sb1 indicates that the charge pump is on.

FIG. 32A shows an example of supplying a monotonically increasing ramp voltage to a pixel circuit in a second modification of the phase modulator according to the ninth embodiment.

FIG. 32B shows an example of supplying a monotonically decreasing ramp voltage to the pixel circuit in a second modification of the phase modulator according to the ninth embodiment.

DETAILED DESCRIPTION

Description of First Embodiment

Figure 1:
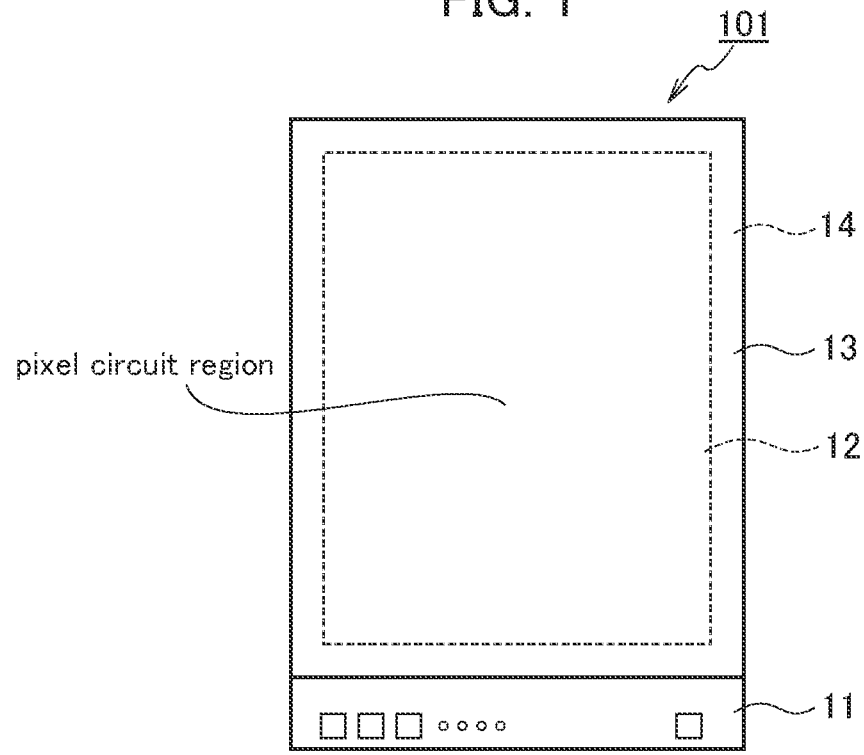
FIG. 1 is a plan view showing a configuration of a phase modulator according to each embodiment.
Figure 2:
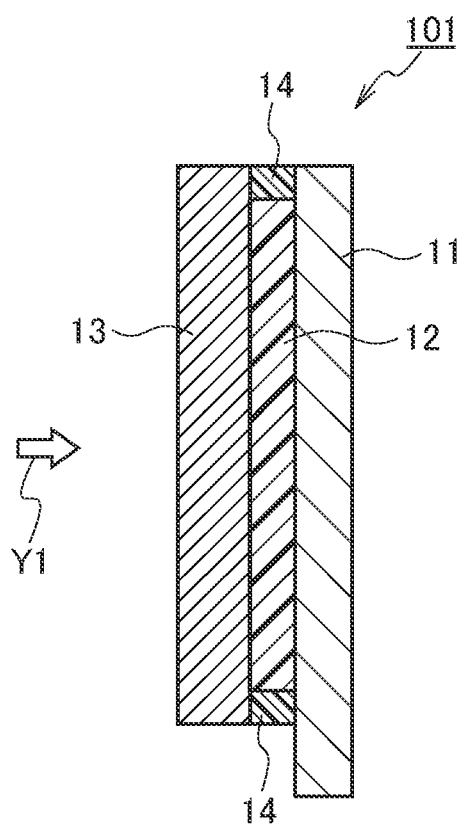
FIG. 2 is a side sectional view showing a configuration of a phase modulator according to each embodiment.

Hereinafter, a phase modulator according to a first embodiment will be described with reference to the drawings. FIG. 1 is a plan view of a phase modulator according to each embodiment (here, the first embodiment is described), and FIG. 2 is a cross-sectional view of the phase modulator according to each embodiment (here, the first embodiment is described) in a side direction. As shown in FIGS. 1 and 2, the phase modulator 101 according to each embodiment (here, the first embodiment is described) has an LCOS (Liquid Crystal On Silicon) panel structure including a reflection substrate 11, a liquid crystal layer 12, and a counter substrate 13. Then, light incident from the counter substrate 13 side (direction of an arrow Y1 in FIG. 2) is reflected and divided into a plurality of reflected light beams having different phases. Hereinafter, the surfaces of the reflection substrate 11 and the counter substrate 13 on the side where light enters are referred to as a "light incident surface".

The light incident surface of the reflection substrate 11 is provided with a plurality of reflection pixels formed of a metal (e.g. aluminum) for reflecting light, and further, a pixel circuit is provided for each reflection pixel. As will be described later with reference to FIG. 3, a plurality of pixel circuits 21 are arranged in a horizontal direction and a vertical direction, respectively. Each pixel circuit 21 is operated under controlling of a control circuit 22.

The counter substrate 13 is arranged parallel to the light incident surface side of the reflection substrate 11 at a predetermined interval, and is formed of a transparent member (e.g. transparent glass material). That is, the counter substrate 13 has a function as a transparent substrate. Further, a transparent electrode is provided on the counter substrate 13. Therefore, the light incident from the light incident surface side of the counter substrate 13 passes through the transparent member and the transparent electrode and is incident into the liquid crystal layer 12 and the reflection substrate 11.

The liquid crystal layer 12 is arranged in a space sandwiched between the reflection substrate 11 and the counter substrate 13, and its periphery is sealed with a sealing material 14. Further, for the sake of convenience in the following description, the liquid crystal layer 12 is considered to be liquid crystal 42 (see FIG. 4, which will be described later) divided on each reflection pixel (i.e. each pixel circuit 21). The liquid crystal 42 is constituted by filling and sealing between a pixel electrode (q1 shown in FIG. 4 to be described later, i.e., the reflection pixel) having light reflectivity and a common electrode (q2 shown in FIG. 4, to be described later, i.e., the transparent electrode) arranged to face the pixel electrode with a space therebetween. The pixel electrode q1 is supplied with a voltage outputted from the pixel circuit 21 (hereinafter referred to as "driving voltage"), and the common electrode q2 is supplied with a preset common electrode voltage.

Accordingly, by the potential difference between the driving voltage applied by each pixel circuit 21 and the common electrode voltage applied to the common electrode q2, the refractive index for the incident light of the liquid crystal 42 on each reflection pixel is changed for each individual liquid crystal 42 or for each predetermined number of groups, and the incident light incident from the light incident surface side of the counter substrate 13 can be reflected in a desired direction.

By changing the refractive index of the liquid crystal 42 on a plurality of continuous reflection pixels from large to small (or small to large) stepwise, a difference occurs in the speed (phase advance or delay) of the incident light incident thereon, so that the incident light travels in a bent manner to obtain the reflected light having a certain angle.

Figure 3:
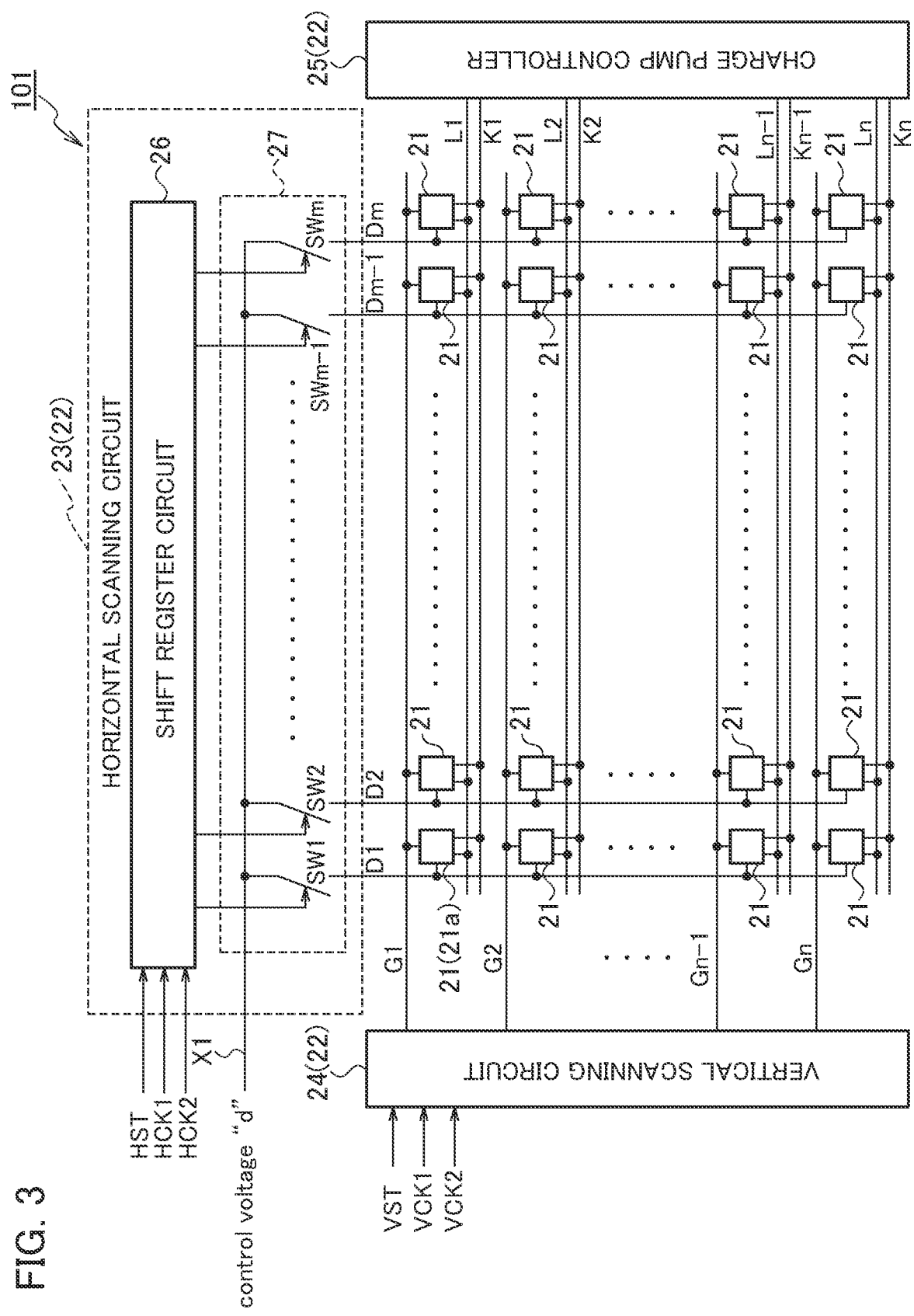
FIG. 3 is a circuit diagram of a phase modulator according to a first and second embodiments.

Next, the configuration of each pixel circuit 21 and the control circuit 22 for controlling each pixel circuit 21 in the phase modulator according to the first embodiment will be described with reference to the block diagram shown in FIG. 3 and the circuit diagram shown in FIG. 4. In FIG. 3, the control circuit 22 includes a plurality of (m columns, n rows) pixel circuits 21 arranged in a matrix, a horizontal scanning circuit 23, a vertical scanning circuit 24, and a charge pump controller 25. Then, the control circuit 22 outputs an electric signal to each pixel circuit 21 to drive each pixel circuit 21, and each pixel circuit 21 applies a driving voltage to each liquid crystal 42. Accordingly, the refractive index of each liquid crystal 42 on each reflection pixel to the incident light is controlled to be a desired value.

The plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), driving lines (L1 to Ln) and control lines (K1 to Kn) are provided. The driving lines (L1 to Ln) and the control lines (K1 to Kn) are connected to the charge pump controller 25.

The driving lines (L1 to Ln) are lines for transmitting control signals for switching on/off each second transistor Q2 (short circuit switch; see FIG. 4) provided in each pixel circuit 21. The control lines (K1 to Kn) are lines for transmitting control signals for switching on/off the switches S1 to S4 (see FIG. 4) provided in each pixel circuit 21. As shown in FIG. 4, each of the plurality of control lines (K1 to Kn) includes a plurality of lines (in FIG. 4, two lines K1-1, K1-2), but in FIG. 3, only one control line K1 is used.

The column data lines (D1 to Dm) are lines each for supplying an analog voltage (hereinafter referred to as "control voltage") outputted from the voltage supply line X1 to each pixel circuit 21. The row scanning lines (G1 to Gn) are lines for outputting row selection signals (scanning signals) to each pixel circuit 21.

Figure 4:
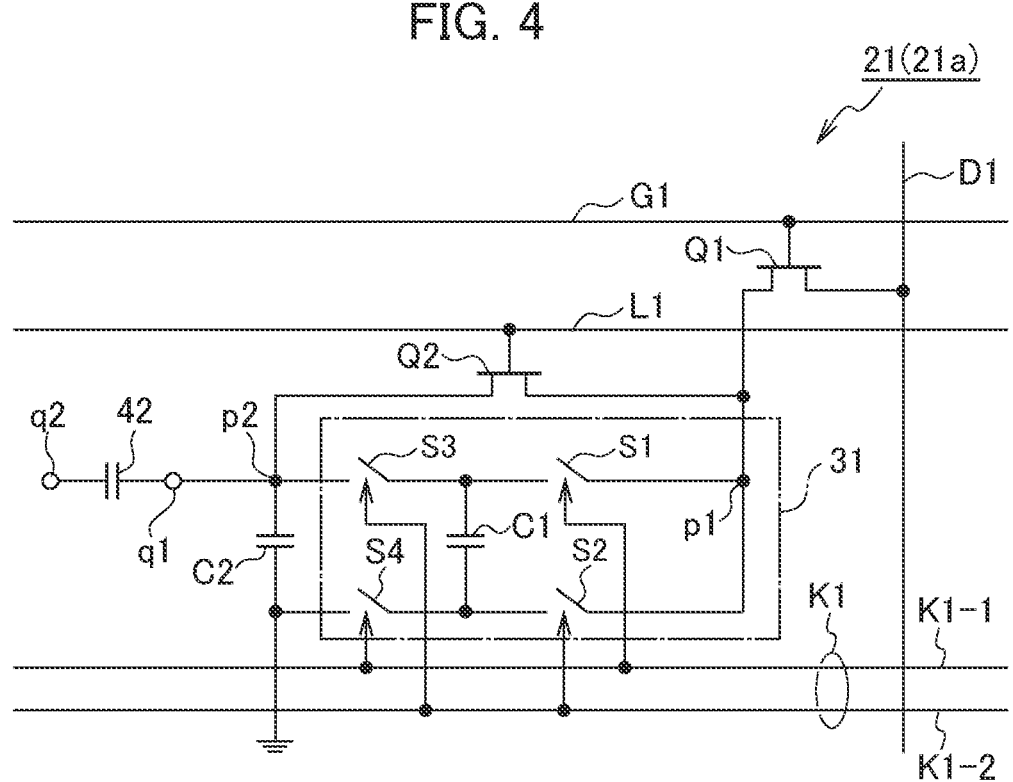
FIG. 4 is a circuit diagram showing a configuration of each pixel circuit provided in the phase modulator according to the first and third embodiments.

FIG. 4 is a circuit diagram showing a detailed configuration of the pixel circuit 21. Here, the configuration of the pixel circuit 21 (this is referred to as a pixel circuit 21a) disposed at the intersection of the column data line D1 and the row scanning line G1 shown in FIG. 3 will be described. As shown in FIG. 4, the pixel circuit 21a includes a first transistor Q1, a second transistor Q2, a charge pump 31, and an output capacitor C2.

The first transistor Q1 is a switching transistor, and is composed of, for example, an N-channel MOSFET (field effect transistor). A first terminal (e.g. drain) of the first transistor Q1 is connected to the column data line D1, and a second terminal (e.g. source) is connected to the input terminal p1 of the charge pump 31. A control terminal (e.g. gate) of the first transistor Q1 is connected to the row scanning line G1. Therefore, when the row scanning line G1 is selected and the control voltage is input from the column data line D1, this control voltage is supplied to the input terminal p1 of the charge pump 31.

The second transistor Q2 is a switching transistor in the same manner as the first transistor Q1 described above, and is formed of, for example, an N-channel MOSFET (field effect transistor). The second transistor Q2 has a first terminal (e.g. drain) connected to the input terminal p1 of the charge pump 31, and a second terminal (e.g. the source) connected to the output terminal p2 of the charge pump 31.

A control terminal (e.g. gate) of the second transistor Q2 is connected to the driving line L1. Therefore, when a voltage of "H" level is supplied to the driving line L1, the second transistor Q2 is turned on, the input terminal p1 and the output terminal p2 of the charge pump 31 are short-circuited, and the function of the charge pump 31 can be stopped. On the contrary, when a voltage of "L" level is supplied to the driving line L1, the second transistor Q2 is turned off, the input terminal p1 and the output terminal p2 of the charge pump 31 are opened, and the charge pump 31 can be operated.

That is, the second transistor Q2 has a function as a short circuit switch for short-circuiting the input terminal p1 to which the control voltage is supplied to the charge pump 31 and the output terminal p2 to output the driving voltage from the charge pump 31 to the liquid crystal 42. When the driving voltage for setting the liquid crystal 42 to a desired refractive index is not higher than the maximum voltage VLC supplied from the column data line D1, the charge pump controller 25 (see FIG. 3) controls to short-circuit the second transistor Q2 and does not amplify the control voltage by the charge pump 31. When the driving voltage exceeds the maximum voltage VLC, the second transistor Q2 is opened so that the control voltage can be amplified by the charge pump 31.

The charge pump 31 includes four switches S1 to S4 and a first capacitor C1 for accumulating charge, and amplifies the control voltage supplied to the input terminal p1 and outputs the amplified control voltage to the output terminal p2.

The first switch S1 and the third switch S3 are connected in series with each other, the end of the first switch S1 side is connected to the input terminal p1, and the end of the third switch S3 side is connected to the output terminal p2. The second switch S2 and the fourth switch S4 are connected in series with each other, and the end of the second switch S2 side is connected to the input terminal p1, and the end of the fourth switch S4 side is connected to the ground.

A first capacitor C1 is provided between a connection point of the first switch S1 and the third switch S3 and a connection point of the second switch S2 and the fourth switch S4. That is, one end of the first capacitor C1 is connected to the first switch S1 and the third switch S3, and the other end of the first capacitor C1 is connected to the second switch S2 and the fourth switch S4.

The output terminal p2 is connected to the ground via the output capacitor C2, and further connected to the pixel electrode q1 of the liquid crystal 42. As described above, the common electrode q2 of the liquid crystal 42 is the transparent electrode provided on the transparent glass. A common electrode voltage is applied to the transparent electrode.

The first switch S1 and the fourth switch S4 are connected to a first control line K1-1, and the second switch S2 and the third switch S3 are connected to a second control line K1-2.

Control signals supplied from the control lines K1-1, K1-2 control on and off the switches S1 to S4. Although FIG. 4 shows a configuration in which two control lines K1-1, K1-2 are provided, a configuration in which control lines (four control lines) are provided for each of the switches S1 to S4 may be employed.

The liquid crystal 42 is driven according to a potential difference between a driving voltage applied from the pixel circuit 21 to the pixel electrode q1 and a common electrode voltage applied to the common electrode q2. Therefore, the incident light incident into the liquid crystal 42 is phase-modulated according to the potential difference between the driving voltage and the common electrode voltage, and is reflected.

Figure 5:
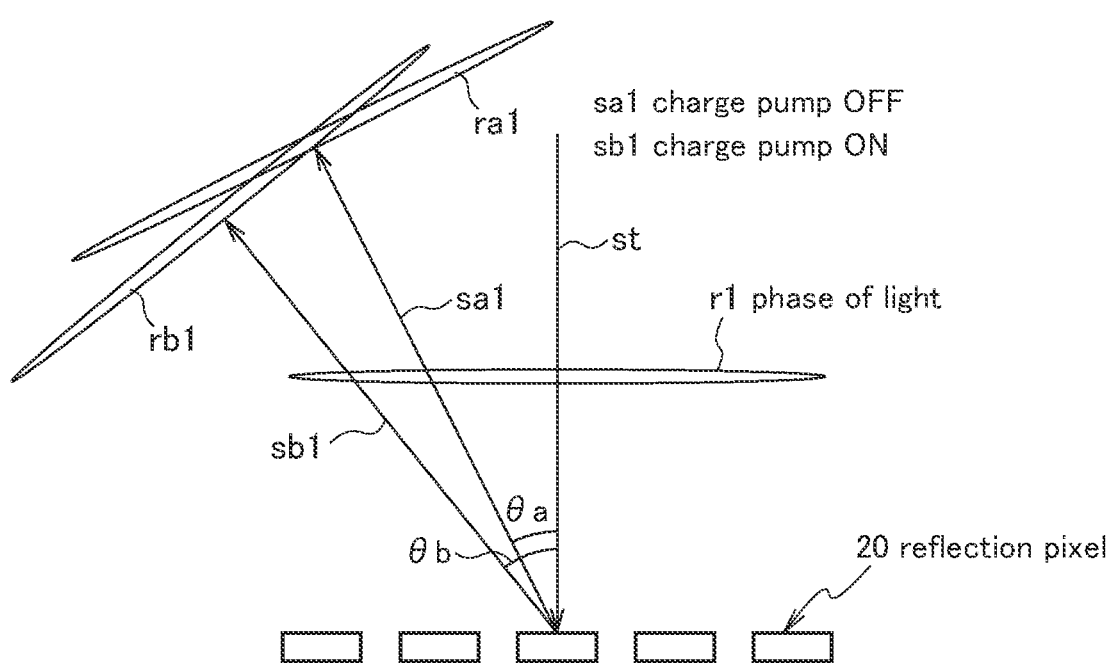

FIG. 5 is an explanatory diagram schematically showing angles of incident light incident into the reflection pixel 20 corresponding to the pixel circuit 21 provided on the reflection substrate 11 and reflected light reflected by the reflection pixel 20. In FIG. 5, a symbol st indicates incident light incident from a direction orthogonal to a reflection pixel 20 (light incident surface of the reflection substrate 11) provided for each pixel circuit 21, a symbol sa1 indicates reflected light reflected at an angle θa at the reflection pixel 20, and a symbol sb1 indicates reflected light reflected at an angle θb. The same phase surface (plane normal to the direction of the incident light st) of the incident light st is r1, the phase surface of the reflected light sa1 is ra1, and the same phase surface of the reflected light sb1 is rb1.

As shown in FIG. 5, when the incident light st is irradiated from a direction substantially orthogonal to the reflection pixel 20 and is incident into the reflection pixel 20, the refractive index of the liquid crystal 42 changes according to the driving voltage applied to the liquid crystal 42 by the pixel circuit 21. For example, when a maximum driving voltage in a related art is a voltage Va, a reflection angle of the reflected light sa1 obtained when the voltage is changed stepwise from a minimum voltage Vmin to the voltage Va in continuous pixels is θa, whereas when the charge pump 31 is driven, a maximum driving voltage is Vb (Vb>Va), and the reflected light sb1 reflected at a larger reflection angle θb is obtained.

At this time, although Vmin is applied, a large refractive index nmax, for example, is obtained in the liquid crystal on the pixel, and a small refractive index na, for example, is obtained in the liquid crystal on the pixel to which the maximum voltage Va is applied. Since the light incident into the liquid crystal having the refractive index na advances faster than the light incident into the liquid crystal having the refractive index nmax, the reflected light is transmitted while being bent at the angle θa. On the other hand, since the liquid crystal on the pixel to which the voltage Vb is applied has a refractive index nb smaller than na, the incident light travels faster. Therefore, the reflected light is transmitted at a larger angle θb.

As shown in FIG. 3, the horizontal scanning circuit 23 provided in the control circuit 22 includes a shift register circuit 26 and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronization signal and the clock signal for horizontal scanning to generate switching signals (i.e. referred to as "SD1 to SDm") to be output to the switch circuit 27 in a period of 1 horizontal scanning period.

The switch circuit 27 includes m number of switches SW1 to SWm for switching on/off of the column data lines (D1 to Dm). The switches SW1 to SWm are controlled to be on or off based on switching signals (SD1 to SDm) outputted from the shift register circuit 26. The switches SW1 to SWm are provided corresponding to the column data lines (D1 to Dm), and the control voltage "d" corresponding to each column data line is sequentially inputted.

The switches SW1 to SWm selectively apply control voltages corresponding to respective column data lines (D1 to Dm) to the column data lines. For example, the switch SW1 is turned on when the switching signal SD1 is at a high level, selects a control voltage corresponding to the column data line D1, and outputs the selected control voltage to the column data line D1.

The control voltage "d" supplied from the voltage supply line X1 to each column data line (D1 to Dm) is an analog voltage ranging from "0" (minimum voltage) to "VLC" (maximum voltage). In the first embodiment, a double voltage (2×VLC) which is a voltage twice the maximum voltage VLC is set, and further, a voltage of k gradations (where k is an integer equal to or greater than 3) is set within a range from the voltage "0" to the double voltage "2×VLC". By switching between driving and stopping of the charge pump 31, control is performed so that the control voltage (voltage in the range of 0 to VLC) supplied from the column data line becomes the above-described voltage of k gradation (voltage in the range of 0 to 2×VLC).

Figure 7A:
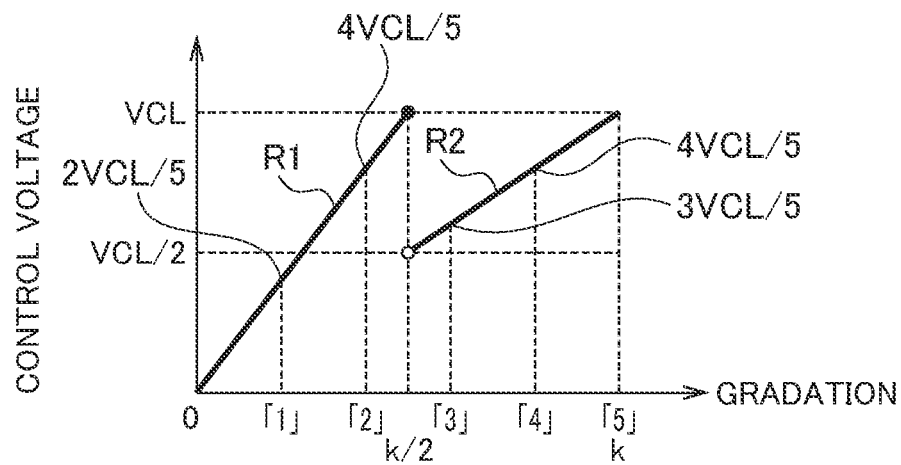
FIG. 7A is a graph showing a relationship between a gradation to be set in the liquid crystal layer and a control voltage to be supplied to the pixel circuit in the phase modulator according to the first, fourth, sixth, and eighth embodiments.

Hereinafter, with reference to FIG. 7A, the relationship between the gradation set in the liquid crystal and the control voltage supplied to the pixel circuit in the phase modulator according to the first embodiment will be described in detail. FIG. 7A is a graph in which the horizontal axis represents the above-described k gradations (five gradations in this example), and the vertical axis represents the control voltage supplied from the voltage supply line X1 to the pixel circuit 21 via the column data line.

The graph R1 shown in FIG. 7A shows the characteristics when the driving voltage supplied to the liquid crystal 42 is not higher than the maximum voltage VLC, and the graph R2 shows the characteristics when the driving voltage supplied to the liquid crystal 42 is equal to or higher than the maximum voltage VLC. Although the graphs R1 and R2 show examples in which the voltage changes linearly, it is not limited to this, and it may be a change that monotonically increases in the range of 0 to VLC.

For example, when the number of gradations of the driving voltage supplied to the liquid crystal 42 is set to "5" (i.e. k=5), the above-described double voltage (2×VLC) is divided into 5 equal parts to set the gradations 1 to 5. Therefore, the double voltage (2×VLC) is divided into 5 equal parts, and the voltage of (1/5)×2×VLC as gradation 1, the voltage of (2/5)×2×VLC as gradation 2, the voltage of (3/5)×2×VLC as gradation 3, the voltage of (4/5)×2×VLC as gradation 4, and the voltage of (5/5)×2×VLC as gradation 5 may be supplied to the pixel circuit 21 as a control voltage.

However, since the control voltage corresponding to the gradations 3 to 5 exceeds the maximum voltage VLC, the control voltage corresponding to the gradations 3 to 5 cannot be supplied from the voltage supply line X1 shown in FIG. 3 to the pixel circuit 21. In the first embodiment, for the gradations 3 to 5, the control voltages of the respective halves are outputted, and then amplified by the charge pump 31 by a factor of 2. That is, the control voltage of (3/5)×VLC as the gradation 3, (4/5)×VLC as the gradation 4, and VLC as the gradation 5 is outputted, and is amplified by a charge pump 31 provided in each pixel circuit 21 by a factor of 2 and outputted to the liquid crystal 42.

That is, when the control voltage for obtaining the desired gradation is not higher than the maximum voltage VLC (for the gradations 1 and 2), as shown in the graph R1 of FIG. 7A, the control voltage is outputted to the liquid crystal 42 as the driving voltage without amplified.

On the other hand, when the voltage for obtaining the desired gradation exceeds the maximum voltage VLC (for the gradations 3, 4, and 5), as shown in the graph R2 in FIG. 7A, a half of this voltage is supplied as a control voltage to the pixel circuit 21, and then amplified by the charge pump 31 by a factor of 2 to obtain the desired driving voltage. Therefore, the slope of the graph R2 is half the slope of the graph R1.

That is, the charge pump controller 25 outputs the control voltage to the liquid crystal 42 without amplifying when the voltage corresponding to any one of the plurality of gradations is not higher than the maximum voltage (VLC). On the other hand, when the voltage corresponding to any one of the plurality of gradations exceeds the maximum voltage (VLC), the charge pump 31 amplifies the control voltage to output it to the liquid crystal 42.

In this manner, by controlling on/off of each switch SW1 to SWm provided in the switch circuit 27 and controlling driving of the charge pump 31, the pixel circuit 21 can generate a driving signal corresponding to k gradations (five gradations in this example) and supply it to the liquid crystal 42. That is, as shown in the graph R3 of FIG. 7B, it is possible to output the driving voltage of the gradations 1 to 5 obtained by dividing the double voltage (2×VLC) into 5 equal parts to the liquid crystal 42.

As shown in FIG. 3, the vertical scanning circuit 24 is connected to the row scanning lines (G1 to Gn). The vertical scanning circuit 24 receives a vertical synchronization signal (VST) and clock signals (VCK1, VCK2) for vertical scanning. The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The charge pump controller 25 outputs a drive signal to each driving line (L1 to Ln) shown in FIG. 3. Specifically, when a voltage corresponding to an arbitrary gradation (e.g. gradation 1) among a plurality of gradations (e.g. gradation 1 to gradation 5) is not higher than the maximum voltage (VLC), an "H" level signal is outputted to the driving line. When the voltage corresponding to any one of the plurality of gradations (e.g. gradation 3) exceeds the maximum voltage (VLC), an "L" level signal is outputted to the driving line.

Further, the charge pump controller 25 performs control so as not to drive the charge pump 31 when a signal of "H" level is supplied to the driving line, but to drive the charge pump 31 when a signal of "L" level is supplied to the driving line. The operation of the charge pump 31 will be described below.

When driving the charge pump 31, the charge pump controller 25 outputs a control signal for controlling on/off of each of the switches S1 to S4 shown in FIG. 4 to the control line K1 (K1-1, K1-2). Specifically, when the charge pump 31 is driven and the control voltage is supplied from the column data line D1, the first switch S1 and the fourth switch S4 are turned on and the second switch S2 and the third switch S3 are turned off.

Therefore, the control voltage supplied from the column data line D1 is stored in the first capacitor C1. After the lapse of a predetermined time, the first switch S1 and the fourth switch S4 are turned off, and the second switch S2 and the third switch S3 are turned on. As a result, the control voltage supplied from the column data line D1 and the voltage stored in the first capacitor C1 are added, and the added voltage is stored in the output capacitor C2. Therefore, a voltage twice as large as the control voltage supplied from the column data line D1 is accumulated in the output capacitor C2 and is outputted to the pixel electrode q1.

Then, in the phase modulator 101 according to the first embodiment, a block composed of some pixel circuits is set among the (n×m) pixel circuits 21 shown in FIG. 3. For example, as shown in FIG. 6A, a block including (5 rows×6 columns) pixel circuits 21 is set. In FIG. 6A, suffixes "-nm" are added to identify rows (n) and columns (m) of the pixel circuits 21, respectively. Therefore, the pixel circuits of 1 row and 1 column shown in FIG. 6A are 21-11, and the pixel circuits of 5 rows and 6 columns are 21-56.

In FIG. 6A, the same voltage is supplied to each of the 6 pixel circuits 21-11 to 21-16 in the same row. For example, the pixel circuits 21-11 to 21-16 are supplied with a control voltage corresponding to gradation 1 of gradation 1 to gradation 5. In the vertical direction, the gradation is gradually increased from the top to the bottom in FIG. 6A, and the control voltage corresponding to the gradation 5 is supplied to the lowermost pixel circuits 21-51 to 21-56.

Figure 6B:
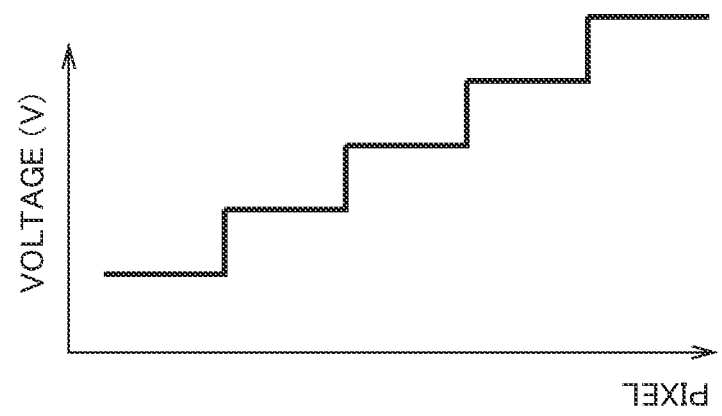
FIG. 6B is a graph showing a driving voltage supplied from each pixel circuit to a liquid crystal layer.
Figure 6A:
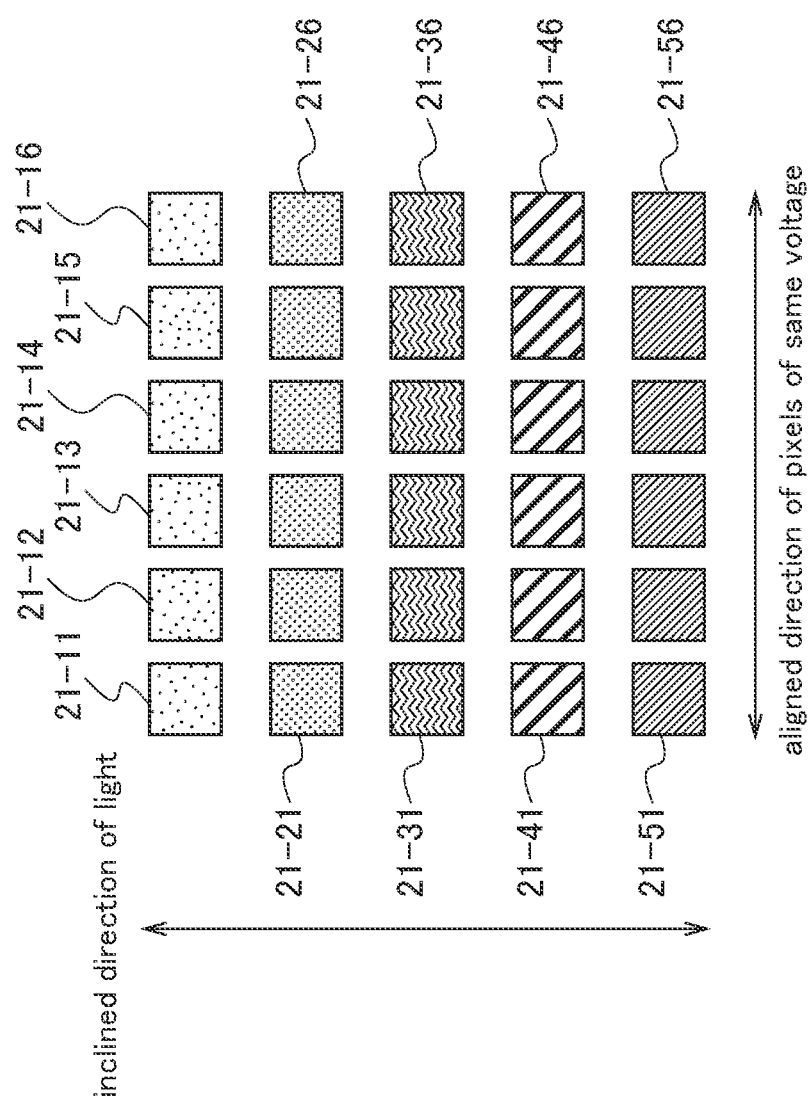
FIG. 6A shows pixel circuits arranged in a matrix.

Specifically, as shown in FIG. 6B, in each of the pixel circuits 21-11 to 21-51 arranged in the vertical direction, the driving voltage supplied to the liquid crystal 42 is set so as to change stepwise in accordance with the gradation 1 to gradation 5. Therefore, the 6 pixel circuits 21 are made into one group, and the phase can be changed in 5 levels, and thus the reflected light phase-modulated in 5 levels can be obtained.

Description of Operation of First Embodiment

Figure 7B:
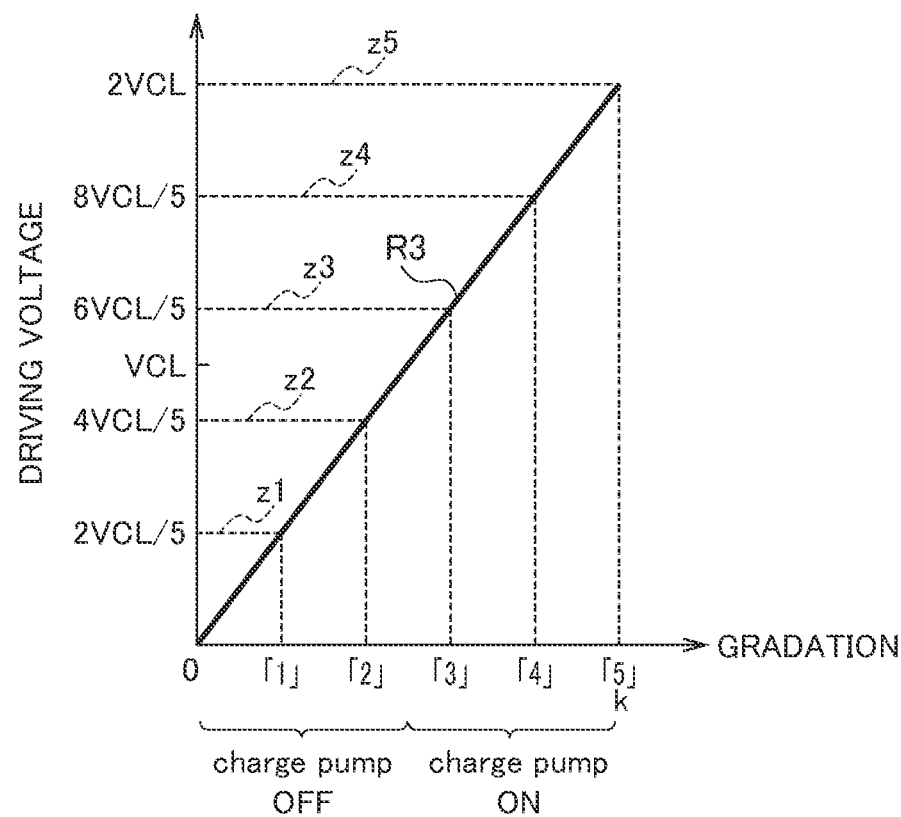
FIG. 7B is a graph showing a relationship between the gradation to be set in the liquid crystal layer and a driving voltage to be supplied to the liquid crystal layer in the phase modulator according to the first, fourth, sixth, and eighth embodiments.

Next, the operation of the phase modulator 101 according to the first embodiment will be described with reference to the graphs shown in FIGS. 7A and 7B and the timing chart shown in FIG. 8. FIG. 7B is a graph showing the relationship between the gradation set to 5 levels and the driving voltage supplied to the liquid crystal 42. In the following, as shown in FIG. 6A, an example in which the pixel circuits 21 arranged in a 6×5 matrix and the reflection pixels corresponding to the pixel circuits 21 are provided will be described.

The horizontal scanning circuit 23 shown in FIG. 3 controls on/off of the switches SW1 to SWm (where m=6) provided in the switching circuit 27, thereby supplying the control voltage supplied from the voltage supply line X1 to the desired column data line.

Further, by driving the vertical scanning circuit 24, scanning lines corresponding to the desired pixel circuit 21 are selected from the respective scanning lines (G1 to Gn) (where n=5). As a result, a control voltage can be supplied to the desired pixel circuit 21.

For example, a voltage in a range from "0" to a voltage that is twice the maximum voltage "0 to 2×VLC" is divided into 5 gradations (i.e. k=1 to 5), a voltage "(1/5)×2×VLC" of gradation 1 is supplied to the pixel circuits 21-11 to 21-16 in the first row shown in FIG. 6A, and a voltage "(2/5)×2×VLC" of gradation 2 is supplied to the pixel circuits 21-21 to 21-26 in the second row.

Further, a voltage of gradation 3 is supplied to the pixel circuits 21-31 to 21-36 of the third row. In this case, the voltage supplied to the pixel circuit becomes "(3/5)×2×VLC" and exceeds the maximum voltage VLC. Therefore, as shown in FIG. 7A, "(3/5)×VLC", which is the half of the above voltage, is outputted as a control voltage, and this voltage is further amplified by a charge pump 31 by a factor of 2 to generate a voltage of "(3/5)×2×VLC" to obtain a voltage of gradation 3.

Similarly, for the pixel circuits 21-41 to 21-46 in the fourth row and the pixel circuits 21-51 to 21-56 in the fifth row, half of the respective voltages are outputted as control voltages, which are then amplified by a charge pump 31 by a factor of 2 to generate voltages of gradations 4 and 5.

Next, the operation of the pixel circuit 21 will be described with reference to the timing chart shown in FIG. 8. As an example, the operation of the charge pump 31 in the pixel circuit 21a connected to the column data line D1 and the row scanning line G1 will be described.

When the pixel circuit 21a is set to the above-described the gradation 1 and the gradation 2, the charge pump 31 is not operated. In this case, as shown at times t0 to t1 in FIG. 8, the charge pump controller 25 outputs an H level signal to the driving line L1. Further, the charge pump 31 is controlled so that all the switches S1 to S4 are turned off. As a result, the second transistor Q2 shown in FIG. 4 is turned on, and the input terminal p1 and the output terminal p2 of the charge pump 31 are short-circuited, so that the control voltage supplied from the column data line D1 is outputted to the liquid crystal 42 without amplified by the charge pump 31. Therefore, as shown by reference sign z1 in FIG. 7B, a voltage of "(1/5)×2×VLC" can be supplied to the liquid crystal.

When the pixel circuit 21a is set to the gradation 2, similarly, the charge pump 31 is not operated, and the control voltage supplied from the column data line D1 is outputted without amplified, as shown by reference sign z2 in FIG. 7B. As a result, a voltage of "(2/5)×2×VLC" can be applied to the liquid crystal.

When the pixel circuit 21 is set to the gradation 3, a half voltage "(2/5)×VLC" of a voltage "(2/5)×2×VLC" corresponding to gradation 3 is outputted to the column data line D1 as a control voltage. Further, the control voltage is amplified by a charge pump 31 by a factor of 2.

Figure 8:
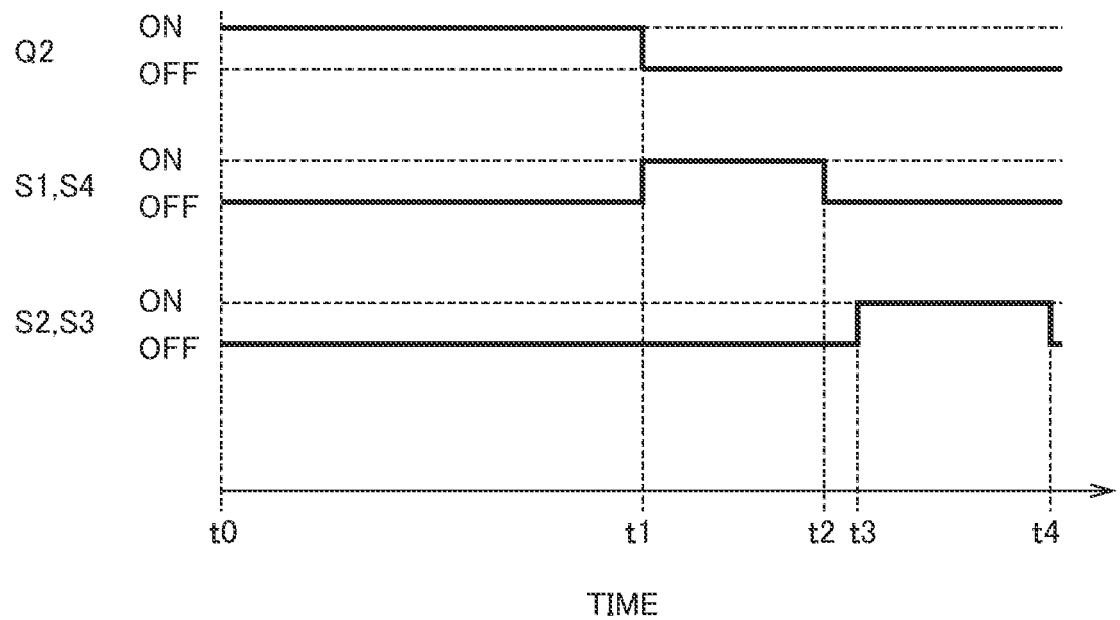
FIG. 8 is a timing chart showing operations of a second transistor Q2 and switches S1 to S4 provided in each pixel circuit of the phase modulator according to the first embodiment.

Specifically, at time t1 in FIG. 8, the charge pump controller 25 switches the signal supplied to the driving line L1 from the H level to the L level. As a result, the second transistor Q2 is turned off. Further, at time t1, the charge pump controller 25 outputs a control signal for turning on the first switch S1 and the fourth switch S4 shown in FIG. 4 and turning off the second switch S2 and the third switch S3 to the control line K1 (K1-1, K1-2).

As a result, the control voltage "(3/5)×VLC" is accumulated in the first capacitor C1. At time t2, the first switch S1 and the fourth switch S4 are turned off, and at time t3, the second switch S2 and the third switch S3 are turned on. As a result, the output capacitor C2 accumulates a voltage that is twice the control voltage "(3/5)×2×VLC". Therefore, as shown by reference sign z3 in FIG. 7B, the driving voltage of the gradation 3 "(3/5)×2×VLC" can be supplied to the liquid crystal 42.

When the pixel circuit 21a is set to the gradation 4, the charge pump 31 is similarly operated to supply a driving voltage of "(4/5)×2×VLC" to the liquid crystal as shown by reference sign z4 in FIG. 7B.

Furthermore, in the case where the pixel circuit 21a is set to the gradation 5, by similarly operating the charge pump 31, as shown by reference sign z5 in FIG. 7B, the driving voltage of "2×VLC" can be supplied to the liquid crystal.

Explanation of Effects of First Embodiment

In the phase modulator 101 according to the first embodiment, as shown in FIG. 4, each pixel circuit 21 includes a charge pump 31. When any one of a plurality of gradations set in advance in a range from "0" to a voltage twice the maximum voltage (2×VLC) is set, and the voltage corresponding to the arbitrary gradation is not more than the maximum voltage (VLC), the control voltage supplied from the column data line to the pixel circuit 21 is outputted to the liquid crystal 42 without amplification.

When the voltage corresponding to any one of the plurality of gradations exceeds the maximum voltage (VLC), the charge pump 31 amplifies the control voltage and outputs the amplified control voltage to the liquid crystal 42.

Therefore, when the maximum value of the control voltage supplied from the column data line to the pixel circuit 21 is the maximum voltage (VLC), the driving voltage for driving the liquid crystal 42 can be set within the range of the voltage that is twice the maximum value (2×VLC). Therefore, the refractive index of the liquid crystal 42 can be varied in a wider range, and an increase in the thickness of the liquid crystal layer 12 can be suppressed and the accuracy of phase modulation can be improved.

Further, since gradation can be set in a wide voltage range without increasing the maximum voltage VLC of the control voltage supplied to the pixel circuit 21, it is not necessary to increase the breakdown voltage of each component constituting the control circuit 22, and the device can be miniaturized and lightened.

Further, since the voltage range for setting the driving voltage of the liquid crystal 42 is set to a voltage which is twice the maximum voltage VLC, a desired driving voltage can be obtained by a simple process of amplifying the control voltage twice, thereby simplifying the circuit configuration.

In the first embodiment, the refractive index of the liquid crystal 42 is set to change in one direction among the direction orthogonal to each other, that is, the column direction and the row direction shown in FIG. 3, and a driving line (L1 to Ln) for switching on and off the charge pump is arranged in the other direction. Therefore, it is possible to prevent the alignment of the liquid crystal from being disturbed due to the change in the refractive index.

In the first embodiment, the range of the driving voltage is set to a voltage that is twice the maximum voltage (2×VLC), but the range of the driving voltage is not limited to this, and may be larger than the maximum voltage VLC.

Description of Modification of First Embodiment

Figure 9:
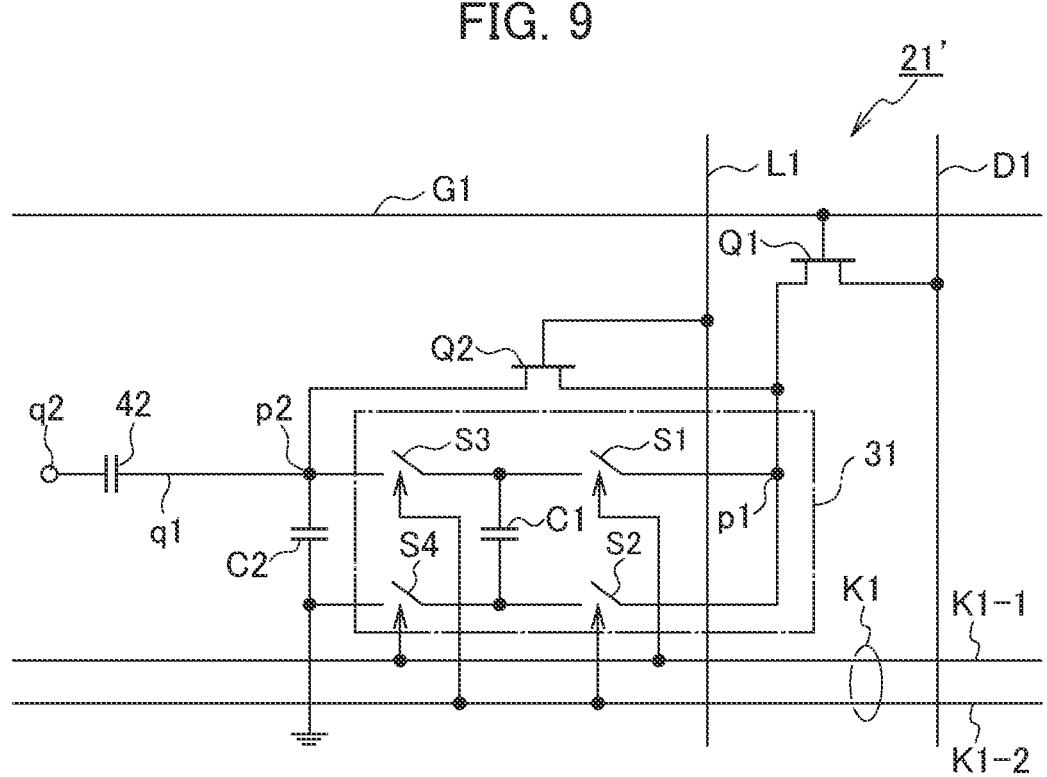
FIG. 9 is an explanatory diagram showing a modification of a pixel circuit provided in the phase modulator according to the first and third embodiments.

Next, a modification of the first embodiment will be described. FIG. 9 is a circuit diagram showing a configuration of a pixel circuit 21' according to the modification of the first embodiment. As shown in FIG. 9, in the pixel circuit 21', the driving line L1 is arranged in the vertical direction. Therefore, ON or OFF of the charge pump circuit can be set in the vertical direction of each pixel circuit 21' arranged in a matrix. Therefore, the direction in which the refractive index changes becomes the lateral direction.

That is, in the example shown in FIGS. 6A and 6B, the refractive index of the liquid crystal 42 changes in the vertical direction, while in the modification of the first embodiment shown in FIG. 9, the refractive index of the liquid crystal 42 changes in the horizontal direction.

Description of Second Embodiment

The basic configuration of a phase modulator according to a second embodiment is the same as the basic configuration of the respective embodiments shown in FIGS. 1 and 2 described in the first embodiment, and therefore the description thereof is omitted.

In the phase modulator 101 according to the second embodiment, the configuration of each pixel circuit 21 and a control circuit 22 for controlling each pixel circuit 21 will be described with reference to the block diagram shown in FIG. 3 and the circuit diagram shown in FIG. 10. In FIG. 3, the control circuit 22 includes a plurality of (m columns, n rows) pixel circuits 21 arranged in a matrix, a horizontal scanning circuit 23, a vertical scanning circuit 24, and a charge pump controller 25. Then, the control circuit 22 outputs an electric signal to each pixel circuit 21 to drive each pixel circuit 21, and each pixel circuit 21 applies a driving voltage to each liquid crystal 42. Accordingly, the refractive index of each liquid crystal 42 on each reflection pixel to the incident light is controlled to be a desired value.

The plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), driving line (L1 to Ln) and a control lines (K1 to Kn) are provided. The driving lines (L1 to Ln) and the control lines (K1 to Kn) are connected to the charge pump controller 25.

The driving lines (L1 to Ln) are lines for transmitting control signals for switching on/off each second transistor Q2 (short-circuit switch; see FIG. 10) provided in each pixel circuit 21. The control lines (K1 to Kn) are lines for transmitting control signals for switching on/off the switches S1 to S4 (see FIG. 10) provided in each pixel circuit 21 and a control signal for switching on/off the third transistor Q3. As shown in FIG. 10, each of the plurality of control lines (K1 to Kn) includes a plurality of lines (in FIG. 10, there are lines K1-1, K1-2, and K1-3), but in FIG. 3, only one control line K1 is used.

The column data lines (D1 to Dm) are lines for supplying an analog voltage (hereinafter referred to as "control voltage") outputted from the voltage supply line X1 to each pixel circuit 21.

Figure 10:
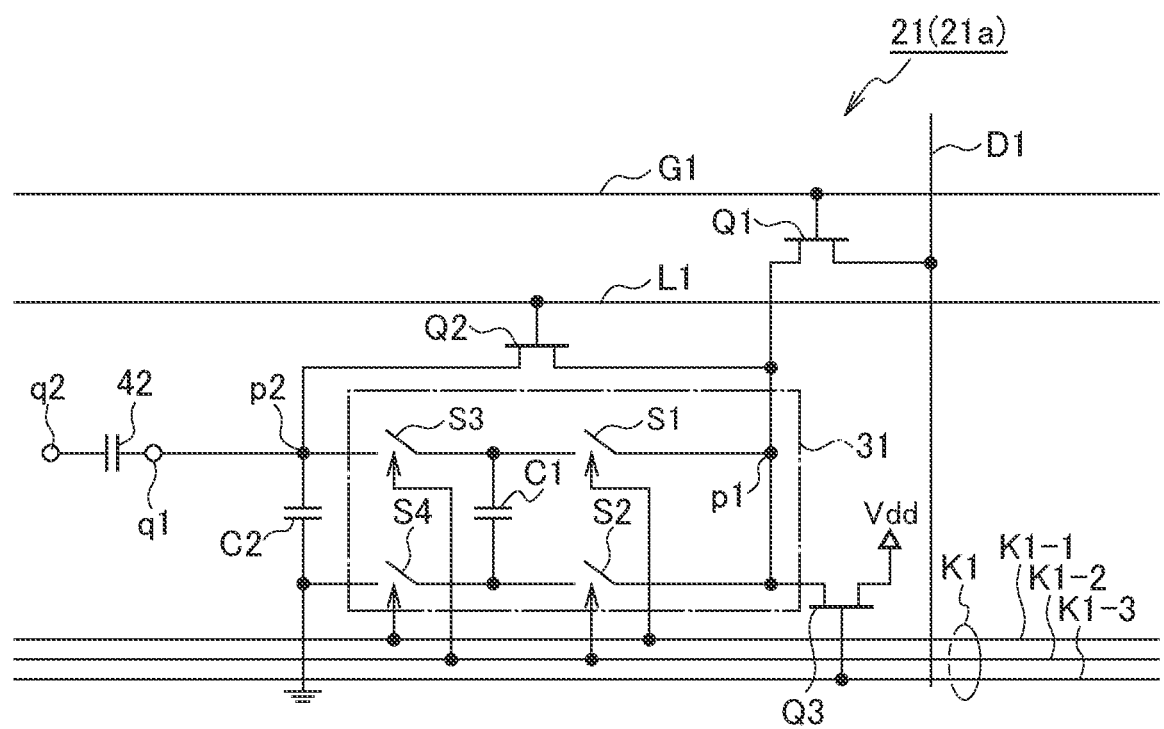
FIG. 10 is a circuit diagram showing a configuration of each pixel circuit provided in the phase modulator according to the second embodiment.

FIG. 10 is a circuit diagram showing a detailed configuration of the pixel circuit 21. Here, the configuration of the pixel circuit 21 (this is referred to as a pixel circuit 21a) disposed at the intersection of the column data line D1 and the row scanning line G1 shown in FIG. 3 will be described. As shown in FIG. 10, the pixel circuit 21a includes a first transistor Q1, a second transistor Q2, a third transistor Q3, a charge pump 31, and an output capacitor C2.

The first transistor Q1 is a switching transistor, and is composed of, for example, an N-channel MOSFET (field effect transistor). A first terminal (e.g. drain) of the first transistor Q1 is connected to the column data line D1, and a second terminal (e.g. source) is connected to the input terminal p1 of the charge pump 31. A control terminal (e.g. gate) of the first transistor Q1 is connected to the row scanning line G1. Therefore, when the row scanning line G1 is selected and the control voltage is input from the column data line D1, this control voltage is supplied to the input terminal p1 of the charge pump 31.

The second transistor Q2 is a switching transistor in the same manner as the first transistor Q1 described above, and is formed of, for example, an N-channel MOSFET (field effect transistor). The second transistor Q2 has a first terminal (e.g. drain) connected to the input terminal p1 of the charge pump 31, and a second terminal (e.g. source) connected to the output terminal p2 of the charge pump 31.

The control terminal (e.g. gate) of the second transistor Q2 is connected to the driving line L1. Therefore, when a voltage of "H" level is supplied to the driving line L1, the second transistor Q2 is turned on, the input terminal p1 and the output terminal p2 of the charge pump 31 are short-circuited, and the function of the charge pump 31 can be stopped. On the contrary, when a voltage of "L" level is supplied to the driving line L1, the second transistor Q2 is turned off, the input terminal p1 and the output terminal p2 of the charge pump 31 are opened, and the charge pump 31 can be operated.

That is, the second transistor Q2 has a function as a short-circuit switch for short-circuiting the input terminal p1 to which the control voltage is supplied to the charge pump 31 and the output terminal p2 to output the driving voltage from the charge pump 31 to the liquid crystal 42. When the driving voltage for setting the liquid crystal 42 to a desired refractive index is not higher than the maximum voltage VLC supplied from the column data line D1, the charge pump controller 25 (see FIG. 3) controls to short-circuit the second transistor Q2, and when the driving voltage exceeds the maximum voltage VLC, the second transistor Q2 is opened to make the charge pump 31 drivable.

The third transistor Q3 is a switching transistor such as a MOSFET similarly to the first transistor Q1 and the second transistor Q2 described above, and the first terminal is connected to the input terminal p1 of the charge pump 31, and the second terminal is connected to a power source (maximum voltage is VLC) for outputting the voltage Vdd (not shown). The control terminal (e.g. a gate) of the third transistor Q3 is connected to the third control line K1-3.

The charge pump 31 includes 4 switches S1 to S4 and a first capacitor C1 for accumulating charge, and amplifies the control voltage supplied to the input terminal p1 and outputs it to the output terminal p2.

The first switch S1 and the third switch S3 are connected in series with each other, the end of the first switch S1 side is connected to the input terminal p1, and the end of the third switch S3 side is connected to the output terminal p2. The second switch S2 and the fourth switch S4 are connected in series with each other, and the end of the second switch S2 side is connected to the input terminal p1, and the end of the fourth switch S4 side is connected to the ground.

A first capacitor C1 is provided between a connection point of the first switch S1 and the third switch S3 and a connection point of the second switch S2 and the fourth switch S4. The output terminal p2 is connected to the ground via the output capacitor C2, and further connected to the pixel electrode q1 of the liquid crystal 42. That is, one end of the first capacitor C1 is connected to the first switch S1 and the third switch S3, and the other end of the first capacitor C1 is connected to the second switch S2 and the fourth switch S4. As described above, the common electrode q2 of the liquid crystal 42 is a transparent electrode provided on a transparent glass. A common electrode voltage is applied to the transparent electrode.

The liquid crystal 42 is driven according to a potential difference between a driving voltage applied from the pixel circuit 21 to the pixel electrode q1 and a common electrode applied to the common electrode q2. Therefore, the incident light incident into the liquid crystal 42 is phase-modulated according to the potential difference and reflected.

In the second embodiment as well, the relationship between the angle of the incident light incident into the reflection pixel 20 corresponding to the pixel circuit 21 provided on the reflection substrate 11 and the angle of the reflected light reflected by the reflection pixel 20 is the same as that described in the first embodiment with reference to FIG. 5, and therefore the description thereof is omitted.

As shown in FIG. 3, the horizontal scanning circuit 23 provided in the control circuit 22 includes a shift register circuit 26 and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronization signal and the clock signal for horizontal scanning to generate switching signals (i.e. referred to as "SD1 to SDm") to be output to the switch circuit 27 in a period of 1 horizontal scanning period.

The switch circuit 27 includes m number of switches SW1 to SWm for switching on/off of the column data lines (D1 to Dm). The switches SW1 to SWm are controlled to be on or off based on switching signals (SD1 to SDm) outputted from the shift register circuit 26. The switches SW1 to SWm are provided corresponding to the column data lines (D1 to Dm), and the control voltage "d" corresponding to each column data line is sequentially inputted.

The switches SW1 to SWm selectively apply control voltages corresponding to respective column data lines (D1 to Dm) to the column data lines. For example, the switch SW1 is turned on when the switching signal SD1 is at a high level, selects a control voltage corresponding to the column data line D1, and outputs the selected control voltage to the column data line D1.

The control voltage "d" supplied from the voltage supply line X1 to each column data line (D1 to Dm) is an analog voltage ranging from "0" (minimum voltage) to "VLC" (maximum voltage). In the second embodiment, a double voltage (2×VLC), which is a voltage twice the maximum voltage VLC, is set, and further, a voltage of k gradations (where k is an integer equal to or greater than 3) is set within a range from the voltage "0" to the double voltage "2×VLC". By switching between driving and stopping of the charge pump 31, control is performed so that the control voltage (voltage in the range of 0 to VLC) supplied from the column data line becomes the above-described voltage of k gradation (Voltage in the range of 0 to 2×VLC).

Figure 11A:
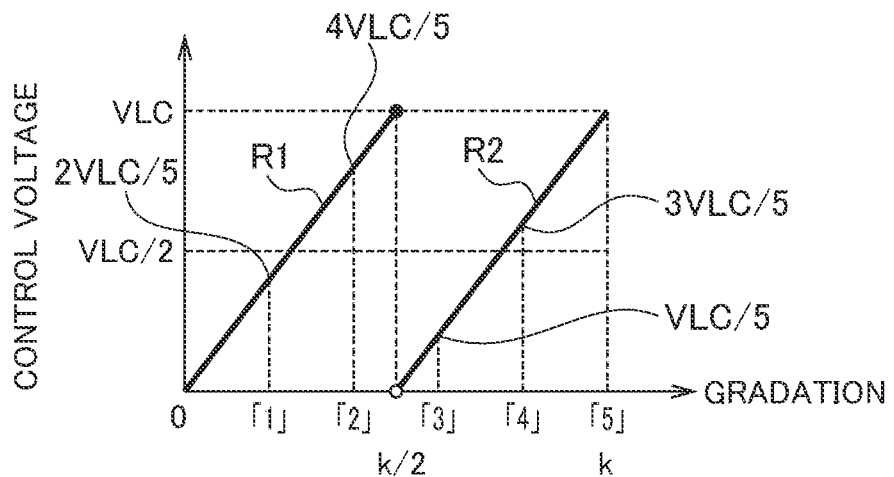
FIG. 11A is a graph showing a relationship between a gradation to be set in a liquid crystal layer and a control voltage to be supplied to each pixel circuit in the phase modulator according to the second and third embodiments.

Hereinafter, with reference to FIG. 11A, the relationship between the gradation to be set in the liquid crystal and the control voltage to be supplied to the pixel circuit in the phase modulator according to the second embodiment will be described in detail. FIG. 11A is a graph in which the horizontal axis represents the above-described k gradations (five gradations in this example), and the vertical axis represents the control voltage supplied from the voltage supply line X1 to the pixel circuit 21 via the column data line.

The graph R1 shown in FIG. 11A shows characteristics when the driving voltage supplied to the liquid crystal 42 is not higher than the maximum voltage VLC, and the graph R2 shows characteristics when the driving voltage supplied to the liquid crystal 42 is equal to or higher than the maximum voltage VLC. Although the graphs R1 and R2 show examples in which the voltage changes linearly, it is not limited to this, and it may be a change that monotonically increases in the range of 0 to VLC.

In FIG. 11A, for example, when the number of gradations of the driving voltage supplied to the liquid crystal 42 is set to "5" (i.e. k=5), the above-described double voltage (2×VLC) is divided into 5 equal parts to set the gradations 1 to 5. Therefore, the double voltage (2×VLC) is divided into 5 equal parts, and the voltage of (1/5)×2×VLC as gradation 1, the voltage of (2/5)×2×VLC as gradation 2, the voltage of (3/5)×2×VLC as gradation 3, the voltage of (4/5)×2×VLC as gradation 4, and the voltage of (5/5)×2× VLC as gradation 5 may be supplied to the pixel circuit 21 as a control voltage.

However, since the control voltage corresponding to the gradations 3 to 5 exceeds the maximum voltage VLC, the control voltage corresponding to the gradations 3 to 5 cannot be supplied from the voltage supply line X1 shown in FIG. 3 to the pixel circuit 21. In the second embodiment, for the gradations 3 to 5, a voltage obtained by subtracting the voltage VLC from each control voltage is outputted, and then the voltage VLC is added by the charge pump 31. That is, the control voltages (1/5)×VLC for the gradation 3, (3/5)×VLC for the gradation 4, and VLC for the gradation 5 are outputted, and the voltage VLC is added by the charge pump 31 provided in each pixel circuit 21 and outputted to the liquid crystal 42.

That is, when the control voltage for obtaining a desired gradation is not higher than the maximum voltage VLC (for the gradations 1 and 2), as shown in the graph R1 of FIG. 11A, the control voltage is outputted as a driving voltage to the liquid crystal 42 without amplified.

On the other hand, when the voltage for obtaining the desired gradation exceeds the maximum voltage VLC (for the gradations 3, 4, and 5), as shown in the graph R2 in FIG. 11A, a voltage obtained by subtracting the voltage VLC from this voltage is supplied as a control voltage to the pixel circuit 21, and then the voltage VLC is added by the charge pump 31 to obtain the desired driving voltage. Therefore, the inclination of the graph R2 is the same as the inclination of the graph R1.

That is, the charge pump controller 25 outputs the control voltage to the liquid crystal without amplifying when the voltage corresponding to any one of the plurality of gradations is not higher than the maximum voltage (VLC). On the other hand, when a voltage corresponding to an arbitrary gradation exceeds a maximum voltage (VLC) among the plurality of gradations, a voltage obtained by subtracting the maximum voltage (VLC) from the voltage corresponding to the gradation is outputted as a control voltage, and thereafter, the charge pump 31 adds the voltage VLC (maximum voltage) and outputs it to the liquid crystal 42.

In this manner, by controlling on/off of each switch SW1 to SWm provided in the switch circuit 27 and controlling driving of the charge pump 31, the pixel circuit 21 can generate a driving signal corresponding to k gradations (five gradations in this example) and supply it to the liquid crystal 42. That is, as shown in the graph R3 of FIG. 11B, it is possible to output the driving voltage of the gradations 1 to 5 obtained by dividing the double voltage (2×VLC) into 5 equal parts to the liquid crystal 42.

As shown in FIG. 3, the vertical scanning circuit 24 is connected to row scanning lines (G1 to Gn). The vertical scanning circuit 24 receives a vertical synchronization signal (VST) and clock signals (VCK1, VCK2) for vertical scanning. The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The charge pump controller 25 outputs a drive signal to each driving line (L1 to Ln) shown in FIG. 3. Specifically, when the voltage corresponding to any one of a plurality of gradations is not higher than the maximum voltage (VLC), a signal of "H" level is outputted to the driving line. When the voltage corresponding to any one of the plurality of gradations exceeds the maximum voltage (VLC), an "L" level signal is outputted to the driving line.

Further, the charge pump controller 25 performs control so as not to drive the charge pump 31 when a signal of "H" level is supplied to the driving line, but to drive the charge pump 31 when a signal of "L" level is supplied to the driving line. The operation of the charge pump 31 will be described below.

When the charge pump controller 25 drives the charge pump 31, the charge pump controller 25 outputs control signals for controlling on/off of the switches S1 to S4 shown in FIG. 10 to the first control line K1-1 and the second control line K1-2. Specifically, when the charge pump 31 is driven and a control voltage is input from the column data line D1, the first switch S1 and the fourth switch S4 are turned on and the second switch S2 and the third switch S3 are turned off.

Therefore, the control voltage supplied from the column data line D1 is stored in the first capacitor C1. After the lapse of a predetermined time, the first switch S1 and the fourth switch S4 are turned off, and the second switch S2 and the third switch S3 are turned on. At this time, the first transistor Q1 is turned off and the third transistor Q3 is turned on. As a result, the maximum voltage supplied from the third transistor Q3 (VLC) and the voltage stored in the first capacitor C1 are added, and the added voltage is stored in the output capacitor C2. Therefore, the voltage obtained by adding the maximum voltage (VLC) to the control voltage supplied from the column data line D1 is accumulated in the output capacitor C2, and is outputted to the pixel electrode q1.

Then, in the phase modulator 101 according to the second embodiment, among the (n×m) pixel circuits 21 shown in FIG. 3, a block composed of several pixel circuits is set. For example, in the second embodiment as well, as in the first embodiment, as shown in FIG. 6A, a block including (5 rows×6 columns) pixel circuits 21 is set.

In FIG. 6A, the same voltage is supplied to each of the 6 pixel circuits 21-11 to 21-16 in the same row. For example, the pixel circuits 21-11 to 21-16 are supplied with a voltage of gradation 1 of gradation 1 to gradation 5. In the vertical direction, the gradation is set to gradually increase from the top to the bottom in FIG. 6A, and the voltage of the gradation 5 is supplied to the lowermost pixel circuits 21-51 to 21-56.

Specifically, as shown in FIG. 6B, in each of the pixel circuits 21-11 to 21-51 arranged in the vertical direction, the driving voltage supplied to the liquid crystal 42 is set to change stepwise in accordance with the gradations 1 to 5. Therefore, the 6 pixel circuits 21 are made into one group, and the phase can be changed in 5 levels, and thus the reflected light phase-modulated in 5 levels can be obtained.

Description of Operation of Second Embodiment

Figure 11B:
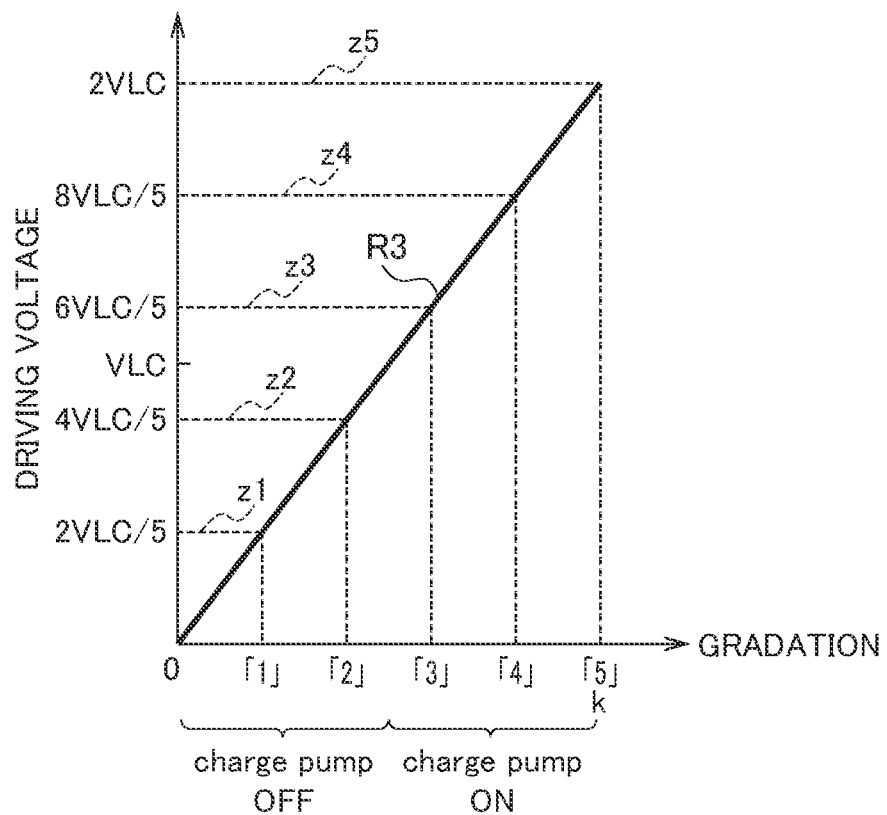
FIG. 11B is a graph showing a relationship between the gradation to be set in the liquid crystal layer and a driving voltage to be supplied to the liquid crystal layer in the phase modulator according to the second and third embodiments.

Next, the operation of the phase modulator 101 according to the second embodiment will be described with reference to graphs shown in FIGS. 11A and 11B and a timing chart shown in FIG. 12. FIG. 11B is a graph showing the relationship between the gradation set to 5 levels and the driving voltage supplied to the liquid crystal 42. In the following, as shown in FIG. 6A, an example in which the pixel circuits 21 arranged in a 6×5 matrix and the reflection pixels corresponding to the pixel circuits 21 are provided will be described.

The horizontal scanning circuit 23 shown in FIG. 3 controls on/off of the switches SW1 to SWm (where m=6) provided in the switching circuit 27, thereby supplying the control voltage supplied from the voltage supply line X1 to the desired column data line.

Further, by driving the vertical scanning circuit 24, the scanning line corresponding to the desired pixel circuit 21 is selected from the respective scanning lines (G1 to Gn) (where n=5). As a result, a control voltage can be supplied to the desired pixel circuit 21.

That is, as described above, the range from "0" to the doubling voltage "0 to 2×VLC" is divided into 5 gradations, and the pixel circuits 21-11 to 21-16 in the first row shown in FIG. 6A are supplied with the voltage "(1/5)×2×VLC" of gradation 1, and the pixel circuits 21-21 to 21-26 in the second row are supplied with the voltage "(2/5)×2×VLC" of gradation 2.

Further, a voltage of gradation 3 is supplied to the pixel circuits 21-31 to 21-36 of the third row. In this case, since the voltage supplied to the pixel circuit becomes "(3/5)×2×VLC" and exceeds the maximum voltage VLC, as shown in the graph R2 of FIG. 11A, "(1/5)×VLC" which is the voltage obtained by subtracting VLC from the above voltage is outputted as the control voltage.

Similarly, for the pixel circuits 21-41 to 21-46 in the fourth row and the pixel circuits 21-51 to 21-56 in the fifth row, the voltage obtained by subtracting the voltage VLC is outputted as the control voltage. Thereafter, the charge pump 31 adds the voltage VLC to generate the voltage of the gradations 3 to 5.

Next, the operation of the pixel circuit 21 will be described with reference to the timing chart shown in FIG. 12. As an example, the operation of the charge pump 31 in the pixel circuit 21a connected to the column data line D1 and the row scanning line G1 will be described.

When the pixel circuit 21a is set to gradations 1 and 2, the charge pump 31 is not operated. In this case, as shown at times t0 to t1 in FIG. 12, the charge pump controller 25 outputs an H level signal to the driving line L1. Further, all the switches S1 to S4 are controlled to be off, and the third transistor Q3 is controlled to be off. The first transistor Q1 is turned on. As a result, the second transistor Q2 shown in FIG. 10 is turned on, the third transistor Q3 is turned off, and the input terminal p1 and the output terminal p2 of the charge pump 31 are short-circuited, so that the control voltage supplied from the column data line D1 is outputted to the liquid crystal 42 without amplified by the charge pump 31. Therefore, as shown by reference sign z1 and z2 in FIG. 11B, a desired driving voltage can be supplied to the liquid crystal 42.

On the other hand, when the pixel circuit 21 is set to gradation 3, a voltage "(1/5)×VLC" obtained by subtracting the voltage VLC from a voltage corresponding to gradation 3 "(6/5)×VLC" is outputted to the column data line D1 as a control voltage. Further, the voltage VLC is added to the control voltage by the charge pump 31.

Figure 12:
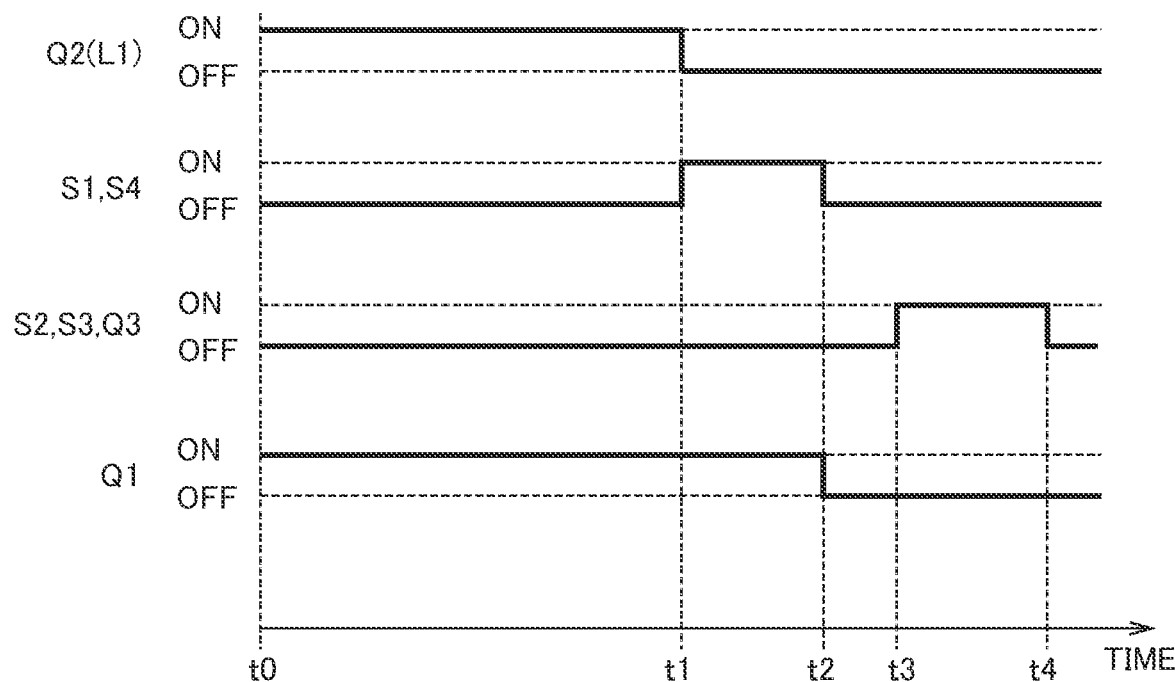
FIG. 12 is a timing chart showing operations of transistors Q1, Q2, Q3 and switches S1 to S4 provided in each pixel circuit of the phase modulator according to the second embodiment.

Specifically, at time t1 in FIG. 12, the charge pump controller 25 switches the signal supplied to the driving line L1 from H level to L level. As a result, the second transistor Q2 is turned off. Further, at time t1, the charge pump controller 25 outputs a control signal for turning on the first switch S1 and the fourth switch S4 shown in FIG. 10 and turning off the second switch S2 and the third switch S3 to the control lines K1 (K1-1, K1-2).

As a result, the control voltage supplied from the column data line is accumulated in the first capacitor C1. Thereafter, at time t2, the first switch S1, the fourth switch S4, and the first transistor Q1 are turned off, and at time t3, the second switch S2, the third switch S3, and the third transistor Q3 are turned on. As a result, the output capacitor C2 accumulates a voltage obtained by adding the maximum voltage (VLC) to the control voltage. Therefore, as shown by reference sign z3 to z5 in FIG. 11B, a driving voltage of gradation 3 can be supplied to the liquid crystal 42.

Explanation of the Effects of Second Embodiment

In the phase modulator 101 according to the second embodiment, each pixel circuit 21 includes a charge pump 31. When any one of a plurality of gradations set in advance in a range from "0" to a doubling voltage (2×VLC) is set, and the voltage corresponding to the arbitrary gradation is not more than the maximum voltage (VLC), the control voltage supplied from the column data line to the pixel circuit 21 is outputted to the liquid crystal 42 without amplification.

When the voltage corresponding to any one of the plurality of gradations exceeds the maximum voltage (VLC), the charge pump 31 outputs a voltage obtained by adding the maximum voltage (VLC) to the control voltage to the liquid crystal 42.

Therefore, when the maximum value of the control voltage supplied from the column data line to the pixel circuit 21 is the maximum voltage (VLC), the driving voltage supplied to the liquid crystal 42 can be set within the range of the double voltage which is twice the maximum voltage (2×VLC). Therefore, the refractive index of the liquid crystal 42 can be varied in a wider range, and an increase in the thickness of the liquid crystal layer 12 can be suppressed and the accuracy of phase modulation can be improved.

Further, since gradation can be set in a wide voltage range without increasing the maximum voltage VLC of the control voltage supplied to the pixel circuit 21, it is not necessary to increase the breakdown voltage of each component constituting the control circuit 22, and the device can be miniaturized and lightened.

Further, since the voltage range for setting the driving voltage of the liquid crystal 42 is set to a voltage which is twice the maximum voltage VLC, a desired driving voltage can be obtained by a simple process of amplifying the control voltage by twice, thereby simplifying the circuit configuration.

In the second embodiment, the refractive index of the liquid crystal 42 is set to change in one of the column direction and the row direction shown in FIG. 3, which are perpendicular to each other, and driving lines (L1 to Ln) for switching the charge pumps on and off are arranged in the other direction. Therefore, it is possible to prevent the alignment of the liquid crystal from being disturbed due to the change in the refractive index.

In the second embodiment, the range of the driving voltage is set to a voltage which is twice the maximum voltage (2×VLC), but the range is not limited to this, and the range may be larger than the maximum voltage VLC.

Description of Modified Example of Second Embodiment

Figure 13:
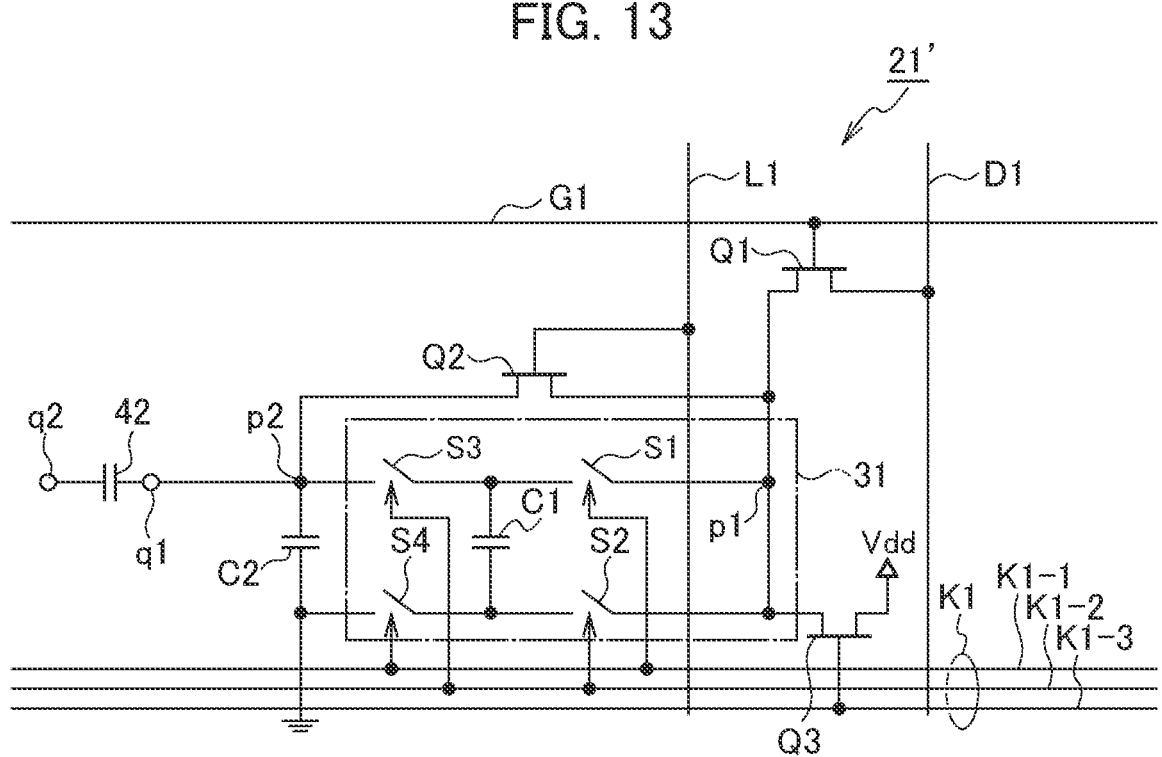
FIG. 13 is an explanatory diagram showing a modification of a pixel circuit provided in the phase modulator according to the second embodiment.

Next, a modification of the second embodiment will be described. FIG. 13 is a circuit diagram showing a configuration of a pixel circuit 21' according to the modification of the second embodiment. As shown in FIG. 13, in the pixel circuit 21', the driving line L1 is arranged in the vertical direction. Therefore, the charge pump 31 can be turned on or off in the vertical direction of the pixel circuits 21' arranged in a matrix. Therefore, the direction in which the refractive index changes becomes the lateral direction.

That is, in the example shown in FIGS. 6A and 6B, the refractive index of the liquid crystal 42 changes in the vertical direction, while in the modification of the second embodiment shown in FIG. 13, the refractive index of the liquid crystal 42 changes in the horizontal direction. In this case, in the 1 vertical scanning period, the voltage supplied to the pixel circuit 21' is set so that the control voltage reaches the maximum voltage VLC.

Description of Third Embodiment

The basic configuration of a phase modulator according to a third embodiment is the same as the basic configuration of the respective embodiments shown in FIGS. 1 and 2 described in the first embodiment, and therefore the description thereof is omitted.

Figure 14:
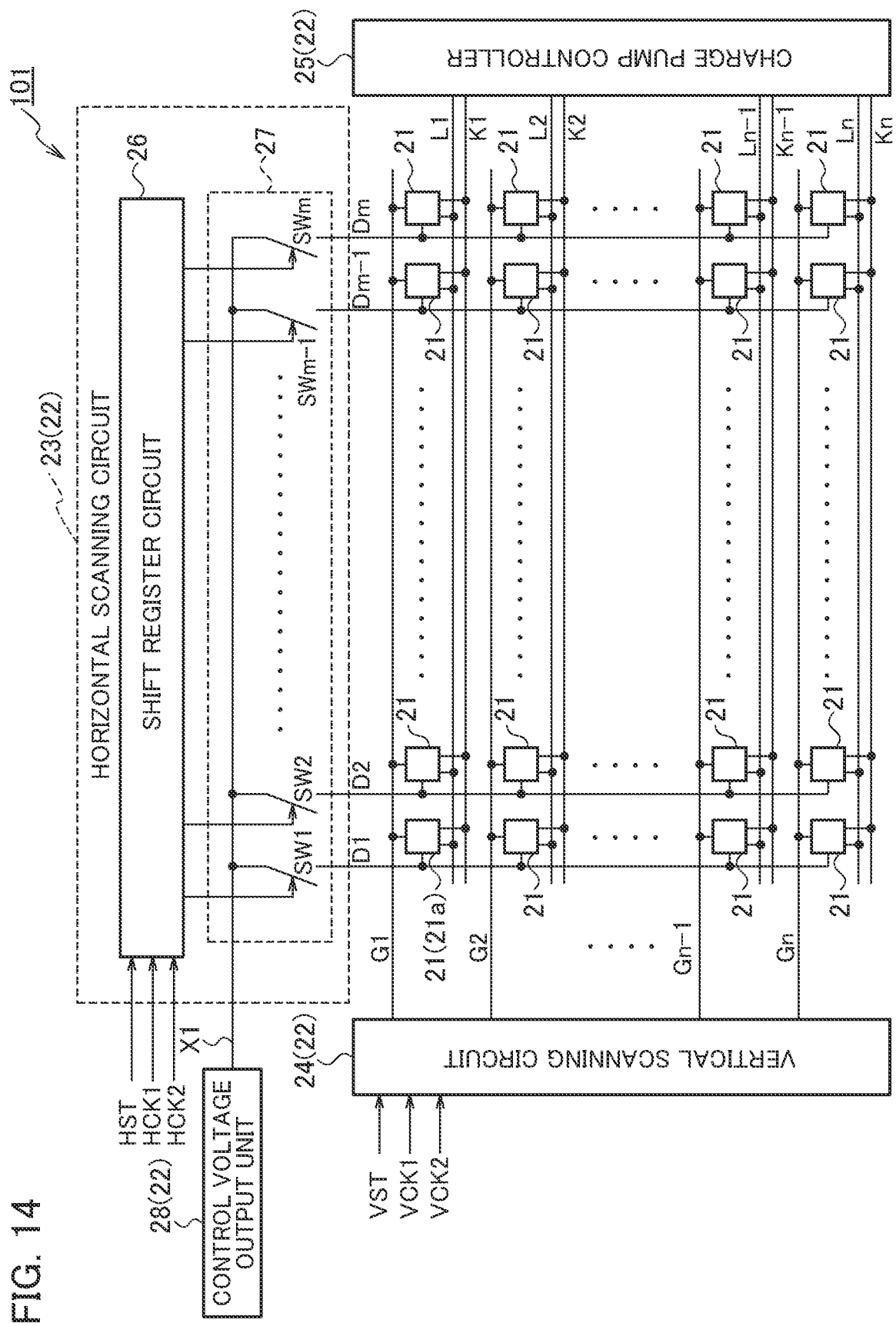
FIG. 14 is a circuit diagram of a phase modulator according to a third embodiment.

In the phase modulator 101 according to the third embodiment, the configuration of each pixel circuit 21 and a control circuit 22 for controlling each pixel circuit 21 will be described with reference to the block diagram shown in FIG. 14 and the circuit diagram shown in FIG. 4. In FIG. 14, the control circuit 22 includes a plurality (m columns, n rows) of pixel circuits 21 arranged in a matrix, a horizontal scanning circuit 23, a vertical scanning circuit 24, a charge pump controller 25, and a control voltage output unit 28. Then, the control circuit 22 outputs an electric signal to each pixel circuit 21 to drive each pixel circuit 21, and each pixel circuit 21 applies a driving voltage to the liquid crystal 42. Accordingly, the refractive index of the liquid crystal 42 on each reflection pixel to the incident light is controlled to be a desired value.

The plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), driving lines (L1 to Ln) and control lines (K1 to Kn) are provided. The driving lines (L1 to Ln) and the control lines (K1 to Kn) are connected to the charge pump controller 25.

The driving lines (L1 to Ln) are lines for transmitting control signals for switching on/off each second transistor Q2 (short-circuit switch; see FIG. 4) provided in each pixel circuit 21. The control lines (K1 to Kn) are lines for transmitting control signals for switching on/off the switches S1 to S4 (see FIG. 4) provided in each pixel circuit 21. As shown in FIG. 4, each of the plurality of control lines (K1 to Kn) includes a plurality of lines (in FIG. 4, two lines K1-1, K1-2), but in FIG. 14, only one control line K1 is used.

The column data lines (D1 to Dm) are lines each for supplying an analog voltage (control voltage and maximum voltage VLC) outputted from the control voltage output unit 28 and supplied via the voltage supply line X1 to each pixel circuit 21. The row scanning lines (G1 to Gn) are lines for outputting row selection signals (scanning signals) to each pixel circuit 21. As described later, "control voltage" indicates a voltage in a range from "0" (minimum voltage) to "VLC" (maximum voltage), and the maximum voltage VLC indicates the maximum voltage outputted from the control voltage output unit 28.

FIG. 4 is a circuit diagram showing a detailed configuration of the pixel circuit 21 in the phase modulator 101 according to the third embodiment. (The configuration of the pixel circuit 21 in the phase modulator 101 according to the third embodiment is the same as the configuration of the pixel circuit 21 in the phase modulator 101 according to the first embodiment shown in FIG. 4, and therefore the description thereof is omitted.)

In the third embodiment as well, the relationship between the angle of the incident light incident into the reflection pixel 20 corresponding to the pixel circuit 21 provided on the reflection substrate 11 and the angle of the reflected light reflected by the reflection pixel 20 is the same as that described in the first embodiment with reference to FIG. 5, and therefore the description thereof is omitted.

As shown in FIG. 14, the horizontal scanning circuit 23 provided in the control circuit 22 includes a shift register circuit 26 and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronization signal and the clock signal for horizontal scanning to generate switching signals (i.e. referred to as "SD1 to SDm") to be output to the switch circuit 27 in a period of 1 horizontal scanning period.

The switch circuit 27 includes m number of switches SW1 to SWm for switching on/off of the column data lines (D1 to Dm). The switches SW1 to SWm are controlled to be on or off based on switching signals (SD1 to SDm) outputted from the shift register circuit 26. The switches SW1 to SWm are provided corresponding to the column data lines (D1 to Dm), and the control voltage "d" corresponding to each column data line is sequentially inputted.

The switches SW1 to SWm selectively apply control voltages corresponding to respective column data lines (D1 to Dm) to the column data lines. For example, the switch SW1 is turned on when the switching signal SD1 is at a high level, selects a control voltage corresponding to the column data line D1, and outputs the selected control voltage to the column data line D1.

The control voltage output unit 28 outputs an analog voltage ranging from "0" (minimum voltage) to "VLC" (maximum voltage) (i.e. control voltage) and a maximum voltage VLC in time division. Specifically, as shown in a chart (e) of FIG. 15 to be described later, either the control voltage Vh, which is a voltage between "0" and "VLC", or the maximum voltage VLC is outputted. As will be described later, when the driving voltage supplied to the liquid crystal 42 is not higher than the maximum voltage VLC, the control voltage Vh is continuously output as shown at times t0 to t1 in the chart (e) of FIG. 15. When the driving voltage exceeds the maximum voltage VLC, the control voltage Vh and the maximum voltage VLC ted in time division as shown in times t1 to t4 in the chart (e) of FIG. 15.

The voltage outputted from the control voltage output unit 28 (control voltage or maximum voltage) is supplied from the voltage supply line X1 to each column data line (D1 to Dm).

In the third embodiment, a double voltage (2×VLC), which is twice the maximum voltage VLC, is set, and further, a voltage of k gradations (where k is an integer equal to or greater than 3) is set within a range from the voltage "0" to the double voltage "2×VLC". By switching between driving and stopping of the charge pump 31, control is performed so that the control voltage (voltage in the range of 0 to VLC) supplied from the column data line becomes the above-described voltage of k gradation (voltage in the range of 0 to 2×VLC).

Referring to FIG. 11A, the relationship between the gradation to be set in the liquid crystal and the control voltage to be supplied to the pixel circuit in the phase modulator according to the third embodiment will be described in detail. FIG. 11A is a graph in which the horizontal axis represents the above-described k gradations (five gradations in this example) and the vertical axis represents the control voltage (control voltage outputted from the control voltage output unit 28) supplied from the voltage supply line X1 to the pixel circuit 21 via the column data line.

The graph R1 shown in FIG. 11A shows characteristics when the driving voltage supplied to the liquid crystal 42 is not higher than the maximum voltage VLC, and the graph R2 shows characteristics when the driving voltage supplied to the liquid crystal 42 is equal to or higher than the maximum voltage VLC. Although the graphs R1 and R2 show examples in which the voltage changes linearly, it is not limited to this, and it may be a change that monotonically increases in the range of 0 to VLC.

For example, when the number of gradations of the driving voltage supplied to the liquid crystal 42 is set to "5" (i.e. k=5), the above-described double voltage (2×VLC) is divided into 5 equal parts to set the gradations 1 to 5. Therefore, the double voltage (2×VLC) is divided into 5 equal parts, and the voltage of (1/5)×2×VLC as gradation 1, the voltage of (2/5)×2×VLC as gradation 2, the voltage of (3/5)×2×VLC as gradation 3, the voltage of (4/5)×2×VLC as gradation 4, and the voltage of (5/5)×2×VLC as gradation 5 may be supplied to the pixel circuit 21 as a control voltage.

However, since the control voltage corresponding to the gradations 3 to 5 exceeds the maximum voltage VLC, the voltage supply line X1 shown in FIG. 14 cannot supply the control voltage corresponding to the gradations 3 to 5 to the pixel circuit 21. In the third embodiment, for the gradations 3 to 5, a voltage obtained by subtracting the maximum voltage VLC from each voltage is outputted as a control voltage, and then the maximum voltage VLC is added by the charge pump 31. That is, the control voltages of (1/5)×VLC as the gradation 3, (3/5)×VLC as the gradation 4, and VLC as the gradation 5 are outputted, and the maximum voltage VLC is added by the charge pump 31 provided in each pixel circuit 21 and outputted to the liquid crystal 42.

That is, when the control voltage for obtaining a desired gradation is not higher than the maximum voltage VLC (for the gradations 1 and 2), as shown in the graph R1 of FIG. 11A, the control voltage is outputted as a driving voltage to the liquid crystal 42 without amplified. In this case, the control voltage output unit 28 outputs only the control voltage Vh as shown at times t0 to t1 in the chart (e) of FIG. 15.

On the other hand, when the voltage for obtaining a desired gradation exceeds the maximum voltage VLC (for the gradations 3, 4, and 5), as shown in the graph R2 in FIG. 11A, a voltage obtained by subtracting the maximum voltage VLC from this voltage is supplied as a control voltage to the pixel circuit 21, and then the maximum voltage VLC is added by the charge pump 31 to obtain a desired driving voltage (summing voltage). In this case, the control voltage output unit 28 outputs the control voltage Vh and the maximum voltage VLC in time division as shown in times t1 to t4 in the chart of (e) of FIG. 15.

In other words, the charge pump controller 25 outputs the control voltage to the liquid crystal 42 without amplifying when the voltage corresponding to any one of the plurality of gradations is not higher than the maximum voltage (VLC). On the other hand, when the voltage corresponding to any one of the plurality of gradations exceeds the maximum voltage VLC, the control voltage is amplified by the charge pump 31 (by adding the maximum voltage VLC) and is outputted to the liquid crystal 42.

In this manner, by controlling on/off of each switch SW1 to SWm provided in the switch circuit 27 and controlling driving of the charge pump 31, the pixel circuit 21 can generate a driving signal corresponding to k gradations (five gradations in this example) and supply to the liquid crystal 42. That is, as shown in the graph R3 of FIG. 11B, it is possible to output the driving voltage of the gradations 1 to 5 obtained by dividing the double voltage (2×VLC) into 5 equal parts to the liquid crystal 42.

As shown in FIG. 14, the vertical scanning circuit 24 is connected to row scanning lines (G1 to Gn). The vertical scanning circuit 24 receives a vertical synchronization signal (VST) and clock signals (VCK1, VCK2) for vertical scanning. The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The charge pump controller 25 outputs a drive signal to each driving line shown (L1 to Ln) in FIG. 14. Specifically, when the voltage corresponding to any one of the plurality of gradations is not higher than the maximum voltage VLC (e.g. in the case of the gradation levels 1 and 2 described above), a signal of "H" level is outputted to the driving line. When the voltage corresponding to any one of the plurality of gradations exceeds the maximum voltage VLC (e.g. in the case of the gradations 3 to 5 described above), an L level signal is outputted to the driving line.

Further, the charge pump controller 25 performs control so as not to drive the charge pump 31 when a signal of "H" level is supplied to the driving line, but to drive the charge pump 31 when a signal of "L" level is supplied to the driving line. The operation of the charge pump 31 will be described below.

When driving the charge pump 31, the charge pump controller 25 outputs a control signal for controlling on/off of each of the switches S1 to S4 shown in FIG. 4 to the control line K1 (K1-1, K1-2). Specifically, when the charge pump 31 is driven, the first switch S1 and the fourth switch S4 are turned on and the second switch S2 and the third switch S3 are turned off when the control voltage outputted from the control voltage output unit 28 is supplied.

Therefore, the supplied control voltage is stored in the first capacitor C1. Thereafter, when the maximum voltage VLC is supplied from the control voltage output unit 28, the first switch S1 and the fourth switch S4 are turned off, and the second switch S2 and the third switch S3 are turned on. As a result, the maximum voltage VLC supplied from the column data line D1 is added to the control voltage stored in the first capacitor C1, and the added voltage is stored in the output capacitor C2. Then, the voltage after the addition is outputted to the pixel electrode q1. That is, it is possible to obtain the driving voltage of the gradation 1 to 5 of 5 levels to be supplied to the liquid crystal 42.

Then, in the phase modulator 101 according to the third embodiment, among the (n×m) pixel circuits 21 shown in FIG. 14, a block composed of several pixel circuits is set. For example, in the third embodiment as well, as in the first embodiment, as shown in FIG. 6A, a block including (5 rows×6 columns) pixel circuits 21 is set.

In FIG. 6A, the same voltage is supplied to each of the 6 pixel circuits 21-11 to 21-16 in the same row. For example, the pixel circuits 21-11 to 21-16 are supplied with a control voltage corresponding to gradation 1 of gradation 1 to gradation 5. In the vertical direction, the gradation is gradually increased from the top to the bottom in FIG. 6A, and the control voltage corresponding to the gradation 5 is supplied to the lowermost pixel circuits 21-51 to 21-56.

Specifically, as shown in FIG. 6B, in each of the pixel circuits 21-11 to 21-51 arranged in the vertical direction, the driving voltage supplied to the liquid crystal 42 is set so as to change stepwise in accordance with the gradation 1 to gradation 5. Therefore, the 6 pixel circuits 21 are made into one group, and the phase can be changed in 5 levels, and thus the reflected light phase-modulated in 5 levels can be obtained.

Description of Operation of Third Embodiment

Next, the operation of the phase modulator 101 according to the third embodiment will be described with reference to the graphs shown in FIGS. 11A and 11B and the timing chart shown in FIG. 15. FIG. 11B is a graph showing the relationship between the gradation set to 5 levels and the driving voltage supplied to the liquid crystal 42. In the following, as shown in FIG. 6A, an example in which the pixel circuits 21 arranged in a 6×5 matrix and the reflection pixels corresponding to the pixel circuits 21 are provided will be described.

As shown in FIG. 14, the control voltage output unit 28 outputs the control voltage and the maximum voltage VLC ranging from "0" to the maximum voltage "VLC" to the voltage supply line X1 in time division.

The horizontal scanning circuit 23 controls on/off of each of the switches SW1 to SWm (where m=6) provided in the switching circuit 27 to supply the control voltage or the maximum voltage VLC supplied from the voltage supply line X1 to the desired column data line.

Further, by driving the vertical scanning circuit 24, the scanning line corresponding to the desired pixel circuit 21 is selected from the respective scanning lines (G1 to Gn) (where n=5). As a result, the control voltage and the maximum voltage VLC can be supplied to the desired pixel circuit 21.

For example, a voltage in a range from "0" to a voltage that is twice the maximum voltage "0 to 2×VLC" is divided into 5 gradations (i.e. k=1 to 5), a voltage "(1/5)×2×VLC" of gradation 1 is supplied to the pixel circuits 21-11 to 21-16 in the first row shown in FIG. 6A, and a voltage "(2/5)×2×VLC" of gradation 2 is supplied to the pixel circuits 21-21 to 21-26 in the second row.

Further, a voltage of gradation 3 is supplied to the pixel circuits 21-31 to 21-36 of the third row. In this case, the voltage supplied to the pixel circuit becomes "(3/5)×2×VLC" and exceeds the maximum voltage VLC. Therefore, as shown in the graph R2 of FIG. 11A, a voltage obtained by subtracting the maximum voltage VLC from each voltage is outputted as a control voltage. Further, by driving the charge pump 31, the maximum voltage VLC is added to the control voltage to generate a voltage of "(3/5)×2×VLC" to obtain a voltage of gradation 3.

Similarly, for the pixel circuits 21-41 to 21-46 in the fourth row and the pixel circuits 21-51 to 21-56 in the fifth row, the voltage obtained by subtracting the maximum voltage VLC from the respective voltages is outputted as a control voltage, and then the maximum voltage VLC is added by the charge pump 31 to generate the voltages of the gradations 4 and 5.

Next, the operation of the pixel circuit 21 will be described with reference to the timing chart shown in FIG. 15. As an example, the operation of the charge pump 31 in the pixel circuit 21a connected to the column data line D1 and the row scanning line G1 will be described.

When the pixel circuit 21a is set to gradation 1, the charge pump 31 is not operated. In this case, as shown at times t0 to t1 in the charts (a), (b), and (c) of FIG. 15, the charge pump controller 25 outputs a signal of H level to the driving line L1 to turn on the second transistor Q2, and further controls so that all the switches S1 to S4 are turned off. As shown in the chart (d) of FIG. 15, the first transistor Q1 is turned on. Further, as shown in the chart (e) of FIG. 15, the control voltage output unit 28 outputs the control voltage Vh in the range of "0" to "VLC".

When the second transistor Q2 is turned on, the input terminal p1 and the output terminal p2 of the charge pump 31 are short-circuited, so that the control voltage supplied from the column data line D1 is not amplified by the charge pump 31 but is outputted to the liquid crystal 42. Therefore, as shown by reference sign z1 in FIG. 11B, a voltage of "(1/5)×2×VLC" can be supplied to the liquid crystal 42.

When the pixel circuit 21a is set to gradation 2, similarly, the charge pump 31 is not operated, and the control voltage supplied from the column data line D1 is outputted without amplified, as shown by reference sign z2 in FIG. 11B. As a result, a voltage of "(2/5)×2×VLC" can be applied to the liquid crystal 42.

When the pixel circuit 21 is set to gradation 3, the control voltage output unit 28 outputs a voltage corresponding to gradation 3 "(1/5)×VLC" to the column data line D1 as a control voltage. Further, the control voltage output unit 28 outputs the maximum voltage VLC. The control voltage and the maximum voltage VLC are added by a charge pump 31.

Figure 15:
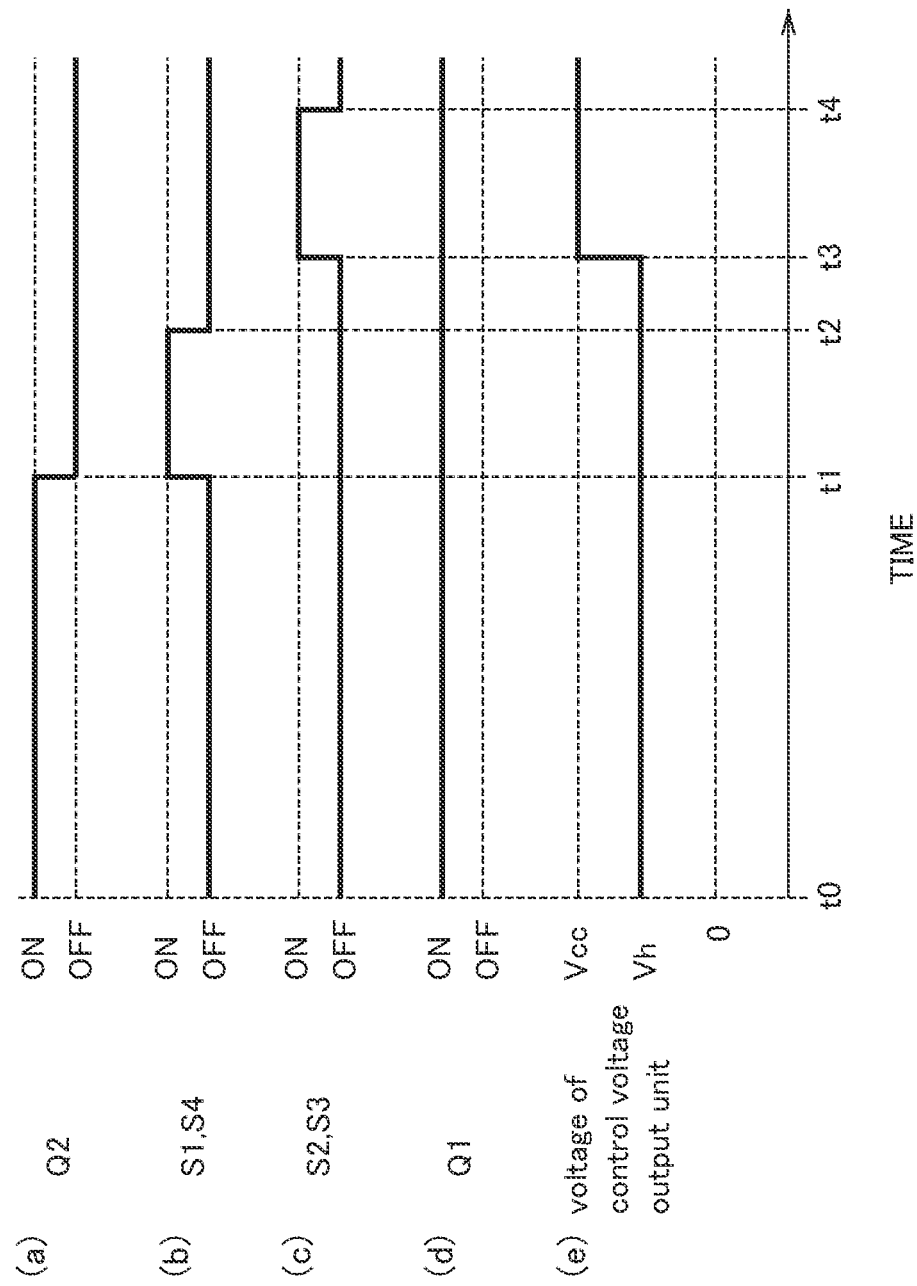
FIG. 15 is a timing chart showing operations of a second transistor Q2 and switches S1 to S4 provided in each pixel circuit of the phase modulator according to the third embodiment.

Specifically, as shown in chart (a) of FIG. 15, the charge pump controller 25 switches the signal supplied to the driving line L1 from the H level to the L level at time t1. As a result, the second transistor Q2 is turned off. As shown in the charts (b) and (c) of FIG. 15, at time t2, the charge pump controller 25 outputs a control signal for turning on the first switch S1 and the fourth switch S4 shown in FIG. 4 and turning off the second switch S2 and the third switch S3 to the control line K1 (K1-1, K1-2).

As a result, the control voltage "(1/5)×VLC" is accumulated in the first capacitor C1. At time t2, the first switch S1 and the fourth switch S4 are turned off, and at time t3, the second switch S2 and the third switch S3 are turned on. Further, as shown in the chart (e) of FIG. 15, at time t3, the voltage outputted from the control voltage output unit 28 switches from the control voltage to the maximum voltage VLC. As a result, the output capacitor C2 accumulates a voltage "(3/5)×2×VLC" obtained by adding the maximum voltage VLC to the control voltage. Therefore, as shown by reference sign z3 in FIG. 11B, the driving voltage of the gradation 3 "(3/5)×2×VLC" can be supplied to the liquid crystal 42.

When the pixel circuit 21a is set to gradation 4, by operating the charge pump 31 in the same manner, as shown by reference sign z4 in FIG. 11B, a driving voltage of "(4/5)×2×VLC" can be supplied to the liquid crystal.

Furthermore, in the case where the pixel circuit 21a is set to gradation 5, by operating the charge pump 31 in the same manner, as shown by reference sign z5 in FIG. 11B, the driving voltage of "2×VLC" can be supplied to the liquid crystal.

Explanation of Effects of Third Embodiment

In the phase modulator 101 according to the third embodiment, each pixel circuit 21 includes a charge pump 31. When any one of a plurality of gradations set in advance in a range from "0" to a voltage twice the maximum voltage (2×VLC) is set, and the voltage corresponding to the arbitrary gradation is equal to or less than the maximum voltage VLC, the control voltage supplied from the column data line to the pixel circuit 21 is outputted to the liquid crystal 42 without amplified.

When the voltage corresponding to any one of the plurality of gradations exceeds the maximum voltage VLC, the control voltage output unit 28 outputs the control voltage (Vh) and the maximum voltage (VLC) in a time-division manner. Then, the charge pump 31 adds the control voltage (Vh) and the maximum voltage (VLC). Specifically, in the chart (e) of FIG. 15, the control voltage (Vh) is outputted during the period from time t1 to time t2, and the maximum voltage (VLC) is outputted during the period from time t3 to time t4, and these voltages are added by the charge pump 31.

Therefore, when the maximum control voltage supplied from the column data line to the pixel circuit 21 is the maximum voltage VLC, the driving voltage for driving the liquid crystal 42 can be set within a range of a voltage that is twice the maximum voltage (2×VLC). Therefore, the refractive index of the liquid crystal 42 can be varied in a wider range, and an increase in the thickness of the liquid crystal layer 12 can be suppressed and the accuracy of phase modulation can be improved.

Further, since gradation can be set in a wide voltage range without increasing the maximum voltage VLC of the control voltage supplied to the pixel circuit 21, it is not necessary to increase the breakdown voltage of each component constituting the control circuit 22, and the device can be miniaturized and lightened.

Further, since the voltage range for setting the driving voltage of the liquid crystal 42 is set to a voltage which is twice the maximum voltage VLC, a desired driving voltage can be obtained by a simple process of amplifying the control voltage twice, thereby simplifying the circuit configuration.

In the third embodiment, the refractive index of the liquid crystal 42 is set to change in one of the column direction and the row direction shown in FIG. 14, which are perpendicular to each other, and the driving lines (L1 to Ln) for switching the charge pump on and off are arranged in the other direction. Therefore, it is possible to prevent the alignment of the liquid crystal from being disturbed due to the change in the refractive index.

In the third embodiment, the range of the driving voltage is set to a voltage which is twice the maximum voltage (2×VLC), but the range is not limited to this, and the range may be larger than the maximum voltage VLC.

Description of Modification of Third Embodiment

Next, a modification of the third embodiment will be described. FIG. 9 is a circuit diagram showing a configuration of a pixel circuit 21' according to the modification of the third embodiment. As shown in FIG. 9, in the pixel circuit 21', the driving line L1 is arranged in the vertical direction. Therefore, ON or OFF of the charge pump circuit can be set in the vertical direction of each pixel circuit 21' arranged in a matrix. Therefore, the direction in which the refractive index changes becomes the lateral direction.

That is, in the example shown in FIGS. 6A and 6B, the refractive index of the liquid crystal 42 changes in the vertical direction, while in the modification of the third embodiment shown in FIG. 9, the refractive index of the liquid crystal 42 changes in the horizontal direction. In this case, in the 1 vertical scanning period, the voltage supplied to the pixel circuit 21' is set so that the control voltage reaches the maximum voltage VLC.

Description of Fourth Embodiment

The basic configuration of a phase modulator according to a fourth embodiment is the same as the basic configuration of the respective embodiments shown in FIGS. 1 and 2 described in the first embodiment, and therefore the description thereof is omitted.

Figure 16:
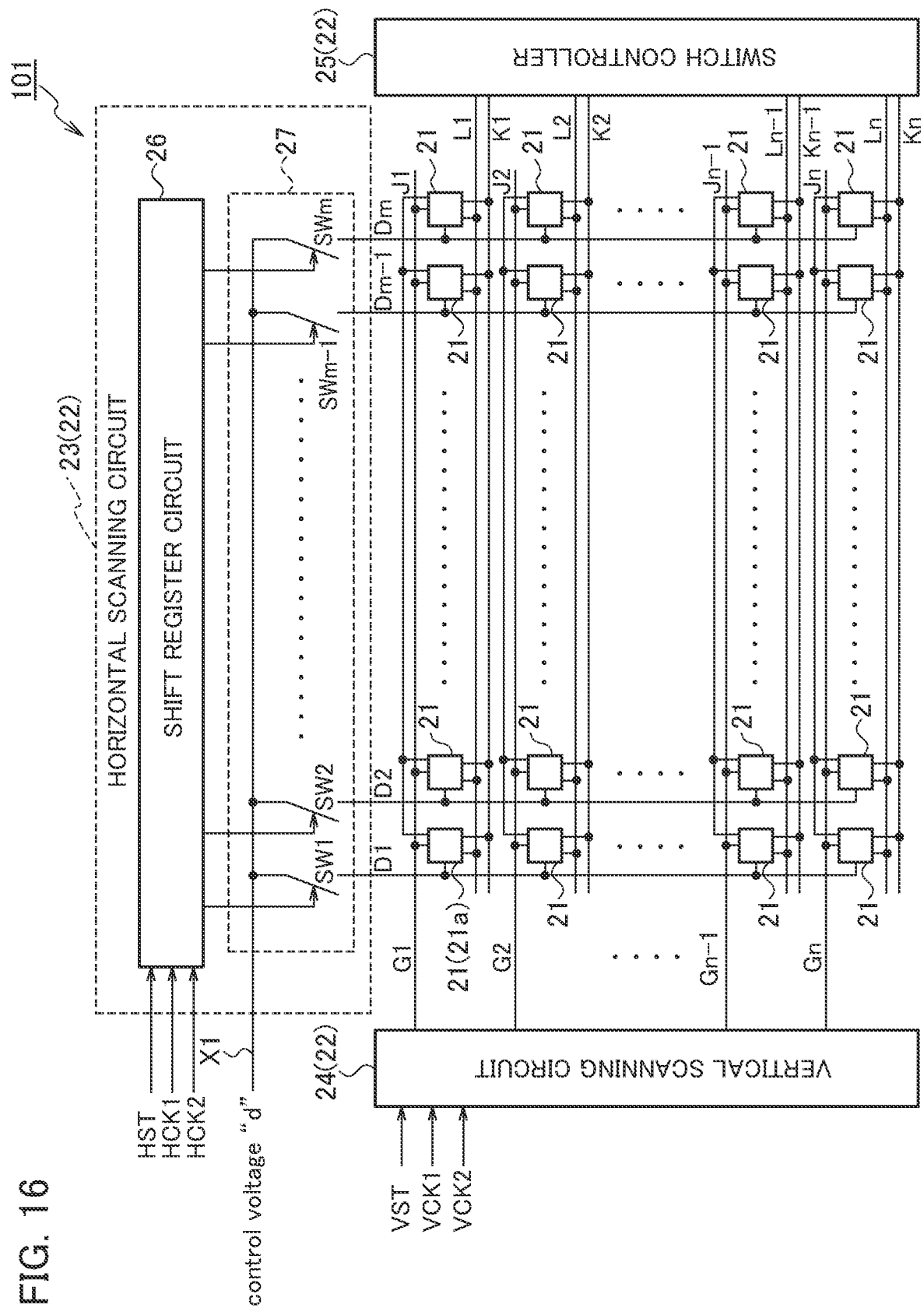
FIG. 16 is a circuit diagram of a phase modulator according to the fourth and sixth embodiments.

In the phase modulator 101 according to the fourth embodiment, the configuration of each pixel circuit 21 and a control circuit 22 for controlling each pixel circuit 21 will be described with reference to the block diagram shown in FIG. 16 and the circuit diagram shown in FIG. 17. In FIG. 16, the control circuit 22 includes a plurality of (m columns, n rows) pixel circuits 21 arranged in a matrix, a horizontal scanning circuit 23, a vertical scanning circuit 24, and a switch controller 25 (charge pump controller, selector switch controller). Then, the control circuit 22 outputs an electric signal to each pixel circuit 21 to drive each pixel circuit 21, and each pixel circuit 21 applies a driving voltage to each liquid crystal 42. Accordingly, the refractive index of each liquid crystal 42 on each reflection pixel to the incident light is controlled to be a desired value.

The plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), driving lines (L1 to Ln) and control lines (K1 to Kn) are provided. The driving lines (L1 to Ln) and the control lines (K1 to Kn) are connected to the switch controller 25.

In parallel with the row scanning lines (G1 to Gn), short circuit lines (J1 to Jn) are provided. As shown in FIG. 17, each of the short circuit lines (J1 to Jn) is provided with a first selector switch (S6, S6' in FIG. 17) for switching between short-circuiting and opening between pixel circuits 21 adjacent to each other.

In the example shown in FIG. 16, the refractive index of the light is controlled to change in the longitudinal direction (vertical direction in FIG. 16). Therefore, the short circuit lines (J1 to Jn) are provided in the lateral direction (horizontal direction in FIG. 16) which is a direction orthogonal to the longitudinal direction.

The driving lines (L1 to Ln) are lines for transmitting control signals for switching on/off each second transistor Q2 (short circuit switch; see FIG. 17) provided in each pixel circuit 21. The control lines (K1 to Kn) are lines for transmitting control signals for switching on/off the switches S1 to S4 (see FIG. 17) provided in each pixel circuit 21, and control signals for switching on/off the above-described first selector switch S6 and second selector switch S5 (see FIG. 17). As shown in FIG. 17, each of the plurality of control lines (K1 to Kn) includes a plurality of lines (in FIG. 17, four lines K1-1, K1-2, K1-3, and K1-4), but in FIG. 16, only one control line K1 is used.

Figure 17:
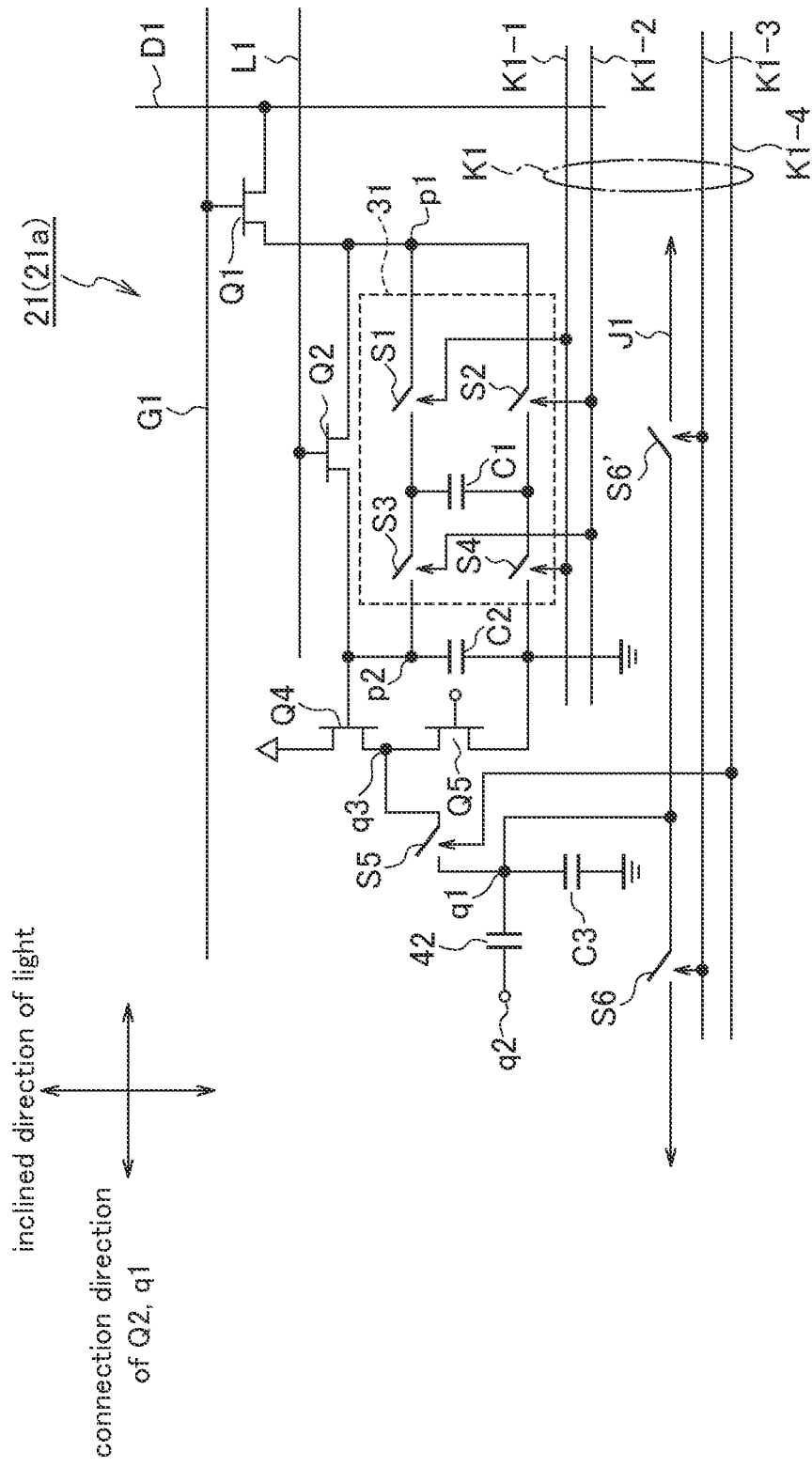
FIG. 17 is a circuit diagram showing a configuration of each pixel circuit provided in the phase modulator according to the fourth embodiment.

As shown in FIG. 17, the first control line K1-1 outputs a control signal for controlling on/off of the first switch S1 and the fourth switch S4 of the charge pump 31. The second control line K1-2 outputs a control signal for controlling ON/OFF of the second switch S2 and the third switch S3 of the charge pump 31. The third control line K1-3 outputs a control signal for controlling ON/OFF of the first selector switches S6 and S6'. S6' is a first selector switch provided in an adjacent pixel circuit. The fourth control line K1-4 outputs a control signal for controlling on/off of the second selector switch S5.

The column data lines (D1 to Dm) are lines for supplying analog voltages (hereinafter referred to as "control voltage") outputted from the voltage supply line X1 to each pixel circuit 21. The row scanning lines (G1 to Gn) are lines for outputting row selection signals (scanning signals) to each pixel circuit 21.

FIG. 17 is a circuit diagram showing a detailed configuration of the pixel circuit 21 in the phase modulator 101 according to the fourth embodiment. Here, the configuration of the pixel circuit 21 (i.e. referred to as a pixel circuit 21a) disposed at the intersection of the column data line D1 and the row scanning line G1 shown in FIG. 16 will be described. As shown in FIG. 17, the pixel circuit 21a includes a first transistor Q1, a second transistor Q2, a charge pump 31, an output capacitor C2, a source follower Q4 (first source follower), a load transistor Q5, a second selector switch S5, an additional capacitor C3, and a first selector switch S6.

The first transistor Q1 is a switching transistor, and is composed of, for example, an N-channel MOSFET (field effect transistor). A first terminal (e.g. drain) of the first transistor Q1 is connected to the column data line D1, and a second terminal (e.g. source) is connected to the input terminal p1 of the charge pump 31. A control terminal (e.g. gate) of the first transistor Q1 is connected to the row scanning line G1. Therefore, when the row scanning line G1 is selected and the control voltage is input from the column data line D1, this control voltage is supplied to the input terminal p1 of the charge pump 31.

The second transistor Q2 is a switching transistor in the same manner as the first transistor Q1 described above, and is formed of, for example, an N-channel MOSFET (field effect transistor). The second transistor Q2 has a first terminal (e.g. drain) connected to the input terminal p1 of the charge pump 31, and a second terminal (e.g. the source) connected to the output terminal p2 of the charge pump 31.

A control terminal (e.g. a gate) of the second transistor Q2 is connected to the driving line L1. Therefore, when a voltage of "H" level is supplied to the driving line L1, the second transistor Q2 is turned on, the input terminal p1 and the output terminal p2 of the charge pump 31 are short-circuited, and the function of the charge pump 31 can be stopped. On the contrary, when a voltage of "L" level is supplied to the driving line L1, the second transistor Q2 is turned off, the input terminal p1 and the output terminal p2 of the charge pump 31 are opened, and the charge pump 31 can be operated.

That is, the second transistor Q2 has a function as a short circuit switch for short-circuiting the input terminal p1 to which the control voltage is supplied to the charge pump 31 and the output terminal p2 to output the driving voltage from the charge pump 31 to the liquid crystal 42. When the driving voltage for setting the liquid crystal 42 to a desired refractive index is equal to or less than the maximum voltage VLC (maximum voltage) supplied from the column data line D1, the switch controller 25 (see FIG. 16) controls to short-circuit the second transistor Q2 and does not amplify the control voltage by the charge pump 31. When the driving voltage exceeds the maximum voltage VLC, the second transistor Q2 is opened to enable amplification of the control voltage by the charge pump 31.

The charge pump 31 includes four switches S1 to S4 and a first capacitor C1 for accumulating charge, and amplifies the control voltage supplied to the input terminal p1 and outputs it to the output terminal p2.

The first switch S1 and the third switch S3 are connected in series with each other, the end of the first switch S1 side is connected to the input terminal p1, and the end of the third switch S3 side is connected to the output terminal p2. The second switch S2 and the fourth switch S4 are connected in series with each other, and the end of the second switch S2 side is connected to the input terminal p1, and the end of the fourth switch S4 side is connected to the ground.

A first capacitor C1 is provided between a connection point of the first switch S1 and the third switch S3 and a connection point of the second switch S2 and the fourth switch S4. That is, one end of the first capacitor C1 is connected to the first switch S1 and the third switch S3, and the other end of the first capacitor C1 is connected to the second switch S2 and the fourth switch S4.

The output terminal p2 is connected to the ground via the output capacitor C2, and further connected to the gate of the source follower Q4. As described above, the common electrode q2 of the liquid crystal 42 is a transparent electrode provided on a transparent glass. A common electrode voltage is applied to the transparent electrode.

The first switch S1 and the fourth switch S4 are connected to a first control line K1-1, and the second switch S2 and the third switch S3 are connected to a second control line K1-2. Control signals supplied from the control lines K1-1 and K1-2 control on and off the switches S1 to S4.

The pixel circuit 21 is provided with a series connection circuit of a source follower Q4 and a load transistor Q5, the output terminal p2 of the charge pump 31 is connected to the gate of the source follower Q4, and the source of the load transistor Q5 is connected to the ground.

The load transistor Q5 is controlled to be turned on when a voltage (control voltage supplied via the first transistor Q1 or the output voltage of charge pump 31) is supplied to the gate of the source follower Q4. A control line for controlling the load transistor Q5 is not shown.

The connection point between the source follower Q4 and the load transistor Q5 (output point q3 of the source follower Q4) is connected to the pixel electrode q1 (supply point) via the second selector switch S5. Further, the pixel electrode q1 is connected to the ground via an additional capacitor C3 and to the short circuit line J1. The short circuit line J1 is provided with a first selector switch S6 for switching a short circuit (On) and an opening (Off) with respect to the pixel electrode of the adjacent pixel circuit.

The additional capacitor C3 accumulates the voltage outputted from the source follower Q4 via the second selector switch S5.

Since the source follower Q4, the load transistor Q5, the second selector switch S5, and the additional capacitor C3 are driven by the voltage after amplified by the charge pump 31, a high breakdown voltage element is used.

Each of the first selector switches S6 is turned on and off by a control signal outputted from the switch controller 25 via the third control line K1-3. The ON/OFF of the second selector switch S5 is controlled by a control signal outputted from the switch controller 25 via the fourth control line K1-4.

The liquid crystal 42 is driven according to a potential difference between a driving voltage applied from the pixel circuit 21 to the pixel electrode q1 and a common electrode applied to the common electrode q2. Therefore, the incident light incident into the liquid crystal 42 is phase-modulated according to the potential difference and reflected.

In the fourth embodiment as well, the relationship between the angle of the incident light incident into the reflection pixel 20 corresponding to the pixel circuit 21 provided on the reflection substrate 11 and the angle of the reflected light reflected by the reflection pixel 20 is the same as that described in the first embodiment with reference to FIG. 5, and therefore the description thereof is omitted.

As shown in FIG. 16, the horizontal scanning circuit 23 provided in the control circuit 22 includes a shift register circuit 26 and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronization signal and the clock signals for horizontal scanning to generate switching signals (i.e. referred to as "SD1 to SDm") to be output to the switch circuit 27 in a period of 1 horizontal scanning period.

The switch circuit 27 includes m number of switches SW1 to SWm for switching on/off of the column data lines (D1 to Dm). The switches SW1 to SWm are controlled to be on or off based on switching signals (SD1 to SDm) outputted from the shift register circuit 26. The switches SW1 to SWm are provided corresponding to the column data lines (D1 to Dm), and the control voltage "d" corresponding to each column data line is sequentially inputted.

The switches SW1 to SWm selectively apply control voltages corresponding to respective column data lines (D1 to Dm) to the column data lines. For example, the switch SW1 is turned on when the switching signal SD1 is at a high level, selects a control voltage corresponding to the column data line D1, and outputs the selected control voltage to the column data line D1.

The control voltage "d" supplied from the voltage supply line X1 to each column data line (D1 to Dm) is an analog voltage ranging from "0" (minimum voltage) to "VLC" (maximum voltage). In the fourth embodiment, a double voltage (2×VLC), which is twice the maximum voltage VLC, is set, and further, a voltage of k gradations (where k is an integer equal to or greater than 3) is set within a range from the voltage "0" to the double voltage "2×VLC". By switching between driving and stopping of the charge pump 31, control is performed so that the control voltage (voltage in the range of 0 to VLC) supplied from the column data line becomes the above-described voltage of k gradation (voltage in the range of 0 to 2×VLC).

Hereinafter, with reference to FIG. 7A, the relationship between the gradation set in the liquid crystal and the control voltage supplied to the pixel circuit in the phase modulator according to the fourth embodiment will be described in detail. FIG. 7A is a graph in which the horizontal axis represents the above-described k gradations (five gradations in this example), and the vertical axis represents the control voltage supplied from the voltage supply line X1 to the pixel circuit 21 via the column data line.

The graph R1 shown in FIG. 7A shows the characteristics when the driving voltage supplied to the liquid crystal 42 is not higher than the maximum voltage VLC, and the graph R2 shows the characteristics when the driving voltage supplied to the liquid crystal 42 is equal to or higher than the maximum voltage VLC. Although the graphs R1 and R2 show examples in which the voltage changes linearly, it is not limited to this, and it may be a change that monotonically increases in the range of 0 to VLC.

In FIG. 7A, for example, when the number of gradations of the driving voltage supplied to the liquid crystal 42 is set to "5" (i.e. k=5), the above-described double voltage (2×VLC) is divided into 5 equal parts to set the gradations 1 to 5. Therefore, the double voltage (2×VLC) is divided into 5 equal parts, and the voltage of (1/5)×2×VLC as gradation 1, the voltage of (2/5)×2×VLC as gradation 2, the voltage of (3/5)×2×VLC as gradation 3, the voltage of (4/5)×2×VLC as gradation 4, and the voltage of (5/5)×2×VLC as gradation 5 may be supplied to the pixel circuit 21 as a control voltage.

However, since the control voltage corresponding to the gradations 3 to 5 exceeds the maximum voltage VLC, the voltage supply line X1 shown in FIG. 16 cannot supply the control voltage corresponding to the gradations 3 to 5 to the pixel circuit 21. In the fourth embodiment, for the gradations 3 to 5, the control voltages of the respective halves are outputted, and then amplified by the charge pump 31 by a factor of 2. That is, the control voltage of (3/5)×VLC as the gradation 3, (4/5)×VLC as the gradation 4, and VLC as the gradation 5 is outputted, and is amplified by a factor of 2 by a charge pump 31 provided in each pixel circuit 21.

That is, when the control voltage for obtaining the desired gradation is not higher than the maximum voltage VLC (for the gradations 1 and 2), the driving voltage is obtained without amplifying the control voltage as shown in the graph R1 of FIG. 7A.

On the other hand, when the voltage for obtaining the desired gradation exceeds the maximum voltage VLC (for the gradations 3, 4, and 5), as shown in the graph R2 in FIG. 7A, a half of this voltage is supplied as a control voltage to the pixel circuit 21, and then amplified by the charge pump 31 by a factor of 2 to obtain the desired driving voltage. Therefore, the slope of the graph R2 is half the slope of the graph R1.

That is, the switch controller 25 outputs the control voltage to the source follower Q4 and the liquid crystal 42 without amplifying when the voltage corresponding to any one of the plurality of gradations is not higher than the maximum voltage (VLC). On the other hand, when the voltage corresponding to any one of the plurality of gradations exceeds the maximum voltage (VLC), the control voltage is amplified by the charge pump 31 and output to the source follower Q4 and the liquid crystal 42.

Thus, by controlling on/off of each switch SW1 to SWm provided in the switch circuit 27 and controlling driving of the charge pump 31, the pixel circuit 21 generates a driving signal corresponding to k gradations (five gradations in this example) and outputs it to the source follower Q4. That is, as shown in the graph R3 of FIG. 7B, it is possible to output the driving voltage of the gradations 1 to 5 obtained by dividing the double voltage (2×VLC) into 5 equal parts to the source follower Q4.

Further, since the driving voltage outputted to the output point q3 of the source follower Q4 is connected to the pixel electrode q1 via the second selector switch S5, the driving voltage outputted from the source follower Q4 can be supplied to the liquid crystal 42 when the second selector switch S5 is turned on.

The short circuit line J1 connected to the pixel circuit 21a (one pixel circuit) is provided with a first selector switch S6 for switching between short circuit and opening with respect to the short circuit line J1 connected to the pixel circuit (other pixel circuit) adjacent to the pixel circuit 21a. Therefore, by short-circuiting the first selector switch S6, the pixel electrode q1 of the pixel circuit 21a and the pixel electrode of the adjacent pixel circuit can be short-circuited. By turning on the first selector switch S6, the potential of the pixel electrode q1 between adjacent pixel circuits (pixel circuits for controlling same refractive index) can be made constant. On/off of the first selector switch S6 is performed by a control signal supplied from the third control line K1-3.

As shown in FIG. 16, the vertical scanning circuit 24 is connected to row scanning lines (G1 to Gn). The vertical scanning circuit 24 receives a vertical synchronization signal (VST) and clock signals (VCK1, VCK2) for vertical scanning. The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The switch controller 25 outputs a drive signal to each of the driving lines (L1 to Ln) shown in FIG. 16. Specifically, when a voltage corresponding to an arbitrary gradation (e.g. gradation 1) among a plurality of gradations (e.g. gradation 1 to gradation 5) is not higher than the maximum voltage (VLC), an "H" level signal is outputted to the driving line. When the voltage corresponding to any one of the plurality of gradations (e.g. gradation 3) exceeds the maximum voltage (VLC), an "L" level signal is outputted to the driving line.

That is, the switch controller 25 has a function as a charge pump controller for performing control of supplying the control voltage to the liquid crystal 42 as an output voltage when the driving voltage supplied to the liquid crystal 42 is equal to or less than the maximum voltage VLC, and supplying the voltage amplified by the charge pump 31 as an output voltage when the driving voltage supplied to the liquid crystal 42 exceeds the maximum voltage VLC.

Further, the switch controller 25 has a function as a switch controller which, when the output voltage of one pixel circuit 21 is supplied to the liquid crystal 42, opens the first selector switch S6 and performs control so as to short-circuit the first selector switch S6 at least in a part of time when the output voltage of one pixel circuit is not supplied to the liquid crystal 42.

Further, the switch controller 25 controls so as not to drive the charge pump 31 when the signal of "H" level is supplied to the driving line L1, but to drive the charge pump 31 when the signal of "L" level is supplied to the driving line L1. The operation of the charge pump 31 will be described below.

When the charge pump 31 is driven, the switch controller 25 outputs a control signal for controlling on/off of each of the switches S1 to S4 shown in FIG. 17 to the control line K1 (K1-1, K1-2). Specifically, when the charge pump 31 is driven and the control voltage is supplied from the column data line D1, the first switch S1 and the fourth switch S4 are turned on and the second switch S2 and the third switch S3 are turned off.

Therefore, the control voltage supplied from the column data line D1 is stored in the first capacitor C1. After the lapse of a predetermined time, the first switch S1 and the fourth switch S4 are turned off, and the second switch S2 and the third switch S3 are turned on. As a result, the control voltage supplied from the column data line D1 and the voltage stored in the first capacitor C1 are added, and the added voltage is stored in the output capacitor C2. Therefore, a voltage twice as large as the control voltage supplied from the column data line D1 is accumulated in the output capacitor C2 and outputted to the source follower Q4.

Then, in the phase modulator 101 according to the fourth embodiment, among the (n×m) pixel circuits 21 shown in FIG. 16, a block composed of several pixel circuits is set. For example, in the fourth embodiment as well, as in the first embodiment, as shown in FIG. 6A, a block including (5 rows×6 columns) pixel circuits 21 is set.

In FIG. 6A, the same voltage is supplied to each of the 6 pixel circuits 21-11 to 21-16 in the same row. For example, the pixel circuits 21-11 to 21-16 are supplied with a control voltage corresponding to gradation 1 of gradation 1 to gradation 5. In the vertical direction, the gradation is gradually increased from the top to the bottom in FIG. 6A, and the control voltage corresponding to the gradation 5 is supplied to the lowermost pixel circuits 21-51 to 21-56.

Specifically, as shown in FIG. 6B, in each of the pixel circuits 21-11 to 21-51 arranged in the vertical direction, the driving voltage supplied to the liquid crystal 42 is set to change stepwise in accordance with the gradations 1 to 5. Therefore, the 6 pixel circuits 21 are made into one group, and the phase can be changed in 5 levels, and thus the reflected light phase-modulated in 5 levels can be obtained.

Description of Operation of Fourth Embodiment

Next, the operation of the phase modulator 101 according to the fourth embodiment will be described with reference to graphs shown in FIGS. 7A and 7B and timing charts shown in FIGS. 18A and 18B. FIG. 7B is a graph showing the relationship between the gradation set to 5 levels and the driving voltage supplied to the liquid crystal 42. In the following, as shown in FIG. 6A, an example in which the pixel circuits 21 arranged in a 6×5 matrix and the reflection pixels corresponding to the pixel circuits 21 are provided will be described.

As shown in FIG. 16, the horizontal scanning circuit 23 controls on/off of the switches SW1 to SWm (where m=6) provided in the switching circuit 27 to supply the control voltage supplied from the voltage supply line X1 to the desired column data line.

Further, by driving the vertical scanning circuit 24, the scanning line corresponding to the desired pixel circuit 21 is selected from the respective scanning lines (G1 to Gn) (where n=5). As a result, a control voltage can be supplied to the desired pixel circuit 21.

For example, a voltage in a range from "0" to a voltage that is twice the maximum voltage "0 to 2×VLC" is divided into 5 gradations (i.e. k=1 to 5), a voltage "(1/5)×2×VLC" of gradation 1 is supplied to the pixel circuits 21-11 to 21-16 in the first row shown in FIG. 6A, and a voltage "(2/5)×2×VLC" of gradation 2 is supplied to the pixel circuits 21-21 to 21-26 in the second row.

Further, a voltage of gradation 3 is supplied to the pixel circuits 21-31 to 21-36 of the third row. In this case, the voltage supplied to the pixel circuit becomes "(3/5)×2×VLC" and exceeds the maximum voltage VLC. Therefore, as shown in FIG. 7A, the half voltage "(3/5)×VLC" is outputted as a control voltage, and the voltage is further amplified by the charge pump 31 by a factor of 2 to generate a voltage of "(3/5)×2×VLC" to obtain a voltage of gradation 3.

Similarly, for the pixel circuits 21-41 to 21-46 in the fourth row and the pixel circuits 21-51 to 21-56 in the fifth row, half of the respective voltages are outputted as control voltages, which are then amplified by a charge pump 31 by a factor of 2 to generate voltages of gradations 4 and 5.

Next, the operation of the pixel circuit 21 will be described with reference to timing charts shown in FIGS. 18A and 18B. As an example, the operation of the charge pump 31 in the pixel circuit 21a connected to the column data line D1 and the row scanning line G1 will be described.

When the pixel circuit 21a is set to gradations 1 and 2, the charge pump 31 is not operated. In this case, as shown at times t0 to t1 in the chart (a) of FIG. 18A, the switch controller 25 outputs a signal of H level to the driving line L1 and turns on the second transistor Q2.

Figure 18A:
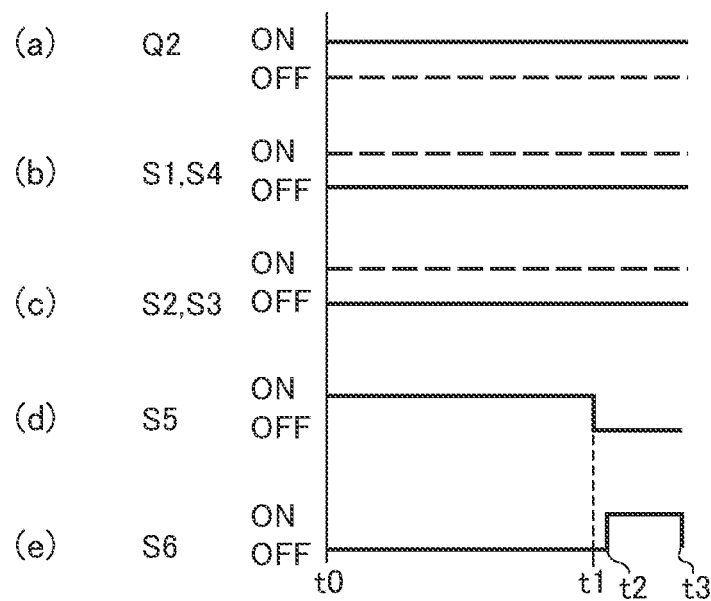
FIG. 18A is a timing chart showing operations of a second transistor Q2, switches S1 to S4, a first selector switch S6, and a second selector switch S5 provided in each pixel circuit when the charge pump is not operated in the phase modulator according to the fourth and sixth embodiments.

Further, as shown in the charts (b) and (c) of FIG. 18A, control is performed so that all the switches S1 to S4 are turned off. As a result, the second transistor Q2 shown in FIG. 17 is turned on, and the input terminal p1 and the output terminal p2 of the charge pump 31 are short-circuited, so that the control voltage supplied from the column data line D1 is supplied to the gate of the source follower Q4 without amplified by the charge pump 31. Further, it is amplified by the source follower Q4 and stored in the additional capacitor C3.

Thereafter, at time t1, the second selector switch S5 is turned off (opening), and at time t2, the first selector switch S6 is turned on (short circuit). That is, in a state where the pixel electrode q1 of the pixel circuit 21a is cut off from the source follower Q4, the pixel electrode q1 and the pixel electrode of the pixel circuit adjacent to the pixel circuit 21a (pixel circuit having the same refractive index) are short-circuited. Therefore, the potential of the pixel electrodes of the adjacent pixel circuits is controlled to be the same. As shown by reference sign z1 in FIG. 7B, a voltage of "(1/5)×2×VLC" can be supplied to the liquid crystal.

In this way, even when the threshold voltage (i.e. referred to as "Vth") between the gate and the source of the source follower Q4 provided in each pixel circuit 21 varies, the second selector switch S5 is turned off to separate the source follower Q4 from the pixel electrode q1. Further, a first selector switch S6 is turned on and connected to a pixel electrode of an adjacent pixel circuit 21. Therefore, variations in the voltages supplied to the pixel electrodes adjacent to each other can be reduced. Thereafter, at time t3, the first selector switch S6 is turned off.

In order to avoid the simultaneous ON (simultaneous short-circuiting) of the first selector switch S6 and the second selector switch S5, the time t2 shown in FIG. 18A is set to be slightly later than the time t1.

When the pixel circuit 21a is set to gradation 2, similarly, the charge pump 31 is not operated, and the control voltage supplied from the column data line D1 is outputted without amplified, as shown by reference sign z2 in FIG. 7B. As a result, a voltage of "(2/5)×2×VLC" can be applied to the liquid crystal 42, and variations in the potential of the pixel electrodes of the adjacent pixel circuits can be reduced.

When the pixel circuit 21 is set to gradation 3, a half voltage "(2/5)×VLC" of a voltage "(2/5)×2×VLC" corresponding to gradation 3 is outputted to the column data line D1 as a control voltage. Further, the control voltage is amplified by a charge pump 31 by a factor of 2.

Specifically, at time t18 shown in FIG. 10B, the switch controller 25 sets the signal supplied to the driving line L1 to the L level. As a result, as shown in the chart (a) of FIG. 18B, the second transistor Q2 is turned off. Further, at time t10 in the chart (b) of FIG. 18B, the switch controller 25 outputs a control signal for turning on the first switch S1 and the fourth switch S4 shown in FIG. 17 and turning off the second switch S2 and the third switch S3 to the control line K1 (K1-1, K1-2).

As a result, the control voltage "(3/5)×VLC" is accumulated in the first capacitor C1. Then, at time t11, the first switch S1 and the fourth switch S4 are turned off, and as shown in the chart (c) of FIG. 18B, at time t12, the second switch S2 and the third switch S3 are turned on. As a result, in the output capacitor C2, a voltage which is twice the control voltage "(3/5)×2×VLC" is accumulated and further supplied to the gate of the source follower Q4. Further, it is amplified by the source follower Q4 and stored in the additional capacitor C3.

Thereafter, at time t13, the second switch S2 and the third switch S3 are turned off, and at time t14 in the chart (d) of FIG. 18, the second selector switch S5 is turned off (opening), and at time t15 in the chart (e) of FIG. 18, the first selector switch S6 is turned on (short circuit). That is, in a state where the pixel electrode q1 of the pixel circuit 21a is cut off from the source follower Q4, the pixel electrode q1 and the pixel electrode of the pixel circuit adjacent to the pixel circuit 21a (pixel circuit having the same refractive index) are short-circuited. Therefore, the potential of the pixel electrodes of the adjacent pixel circuits is controlled to be the same. As shown by reference sign z3 in FIG. 7B, a voltage of "(3/5)×2×VLC" can be supplied to the liquid crystal 42.

Therefore, even when the threshold voltage (i.e. referred to as "Vth") between the gate and the source of the source follower Q4 provided in each pixel circuit 21 varies, the source follower Q4 and the pixel electrode q1 are separated from each other and connected to the pixel electrode of the adjacent pixel circuit 21, so that variations in the voltages supplied to the adjacent pixel electrodes can be reduced. Then, at time t16, the first selector switch S6 is turned off.

When the pixel circuit 21a is set to gradations 4 and 5, the charge pump 31 is similarly operated to amplify and output the control voltage supplied from the column data line D1, as shown by reference signs z4 and z5 in FIG. 7B. As a result, voltages of "(4/5)×2×VLC" and "2×VLC" can be applied to the liquid crystal 42, and variations in potential of pixel electrodes of adjacent pixel circuits can be reduced.

Explanation of Effects of Fourth Embodiment

In the phase modulator 101 according to the fourth embodiment, each pixel circuit 21 includes a charge pump 31. When any one of a plurality of gradations set in advance in a range from "0" to a voltage twice the maximum voltage (2×VLC) is set, and the voltage corresponding to the arbitrary gradation is not more than the maximum voltage (VLC), the control voltage supplied from the column data line to the pixel circuit 21 is outputted to the liquid crystal 42 without amplification.

When the voltage corresponding to any one of the plurality of gradations exceeds the maximum voltage (VLC), the charge pump 31 amplifies and outputs the control voltage. The output voltage is amplified by the source follower Q4, supplied to the pixel electrode q1, and then supplied to the liquid crystal 42.

Therefore, when the maximum control voltage supplied from the column data line to the pixel circuit 21 is the maximum voltage (VLC), the driving voltage for driving the liquid crystal 42 can be set within a range of a voltage that is twice the maximum (2×VLC). Therefore, the refractive index of the liquid crystal 42 can be varied in a wider range, and an increase in the thickness of the liquid crystal layer 12 can be suppressed and the accuracy of phase modulation can be improved.

Figure 21:
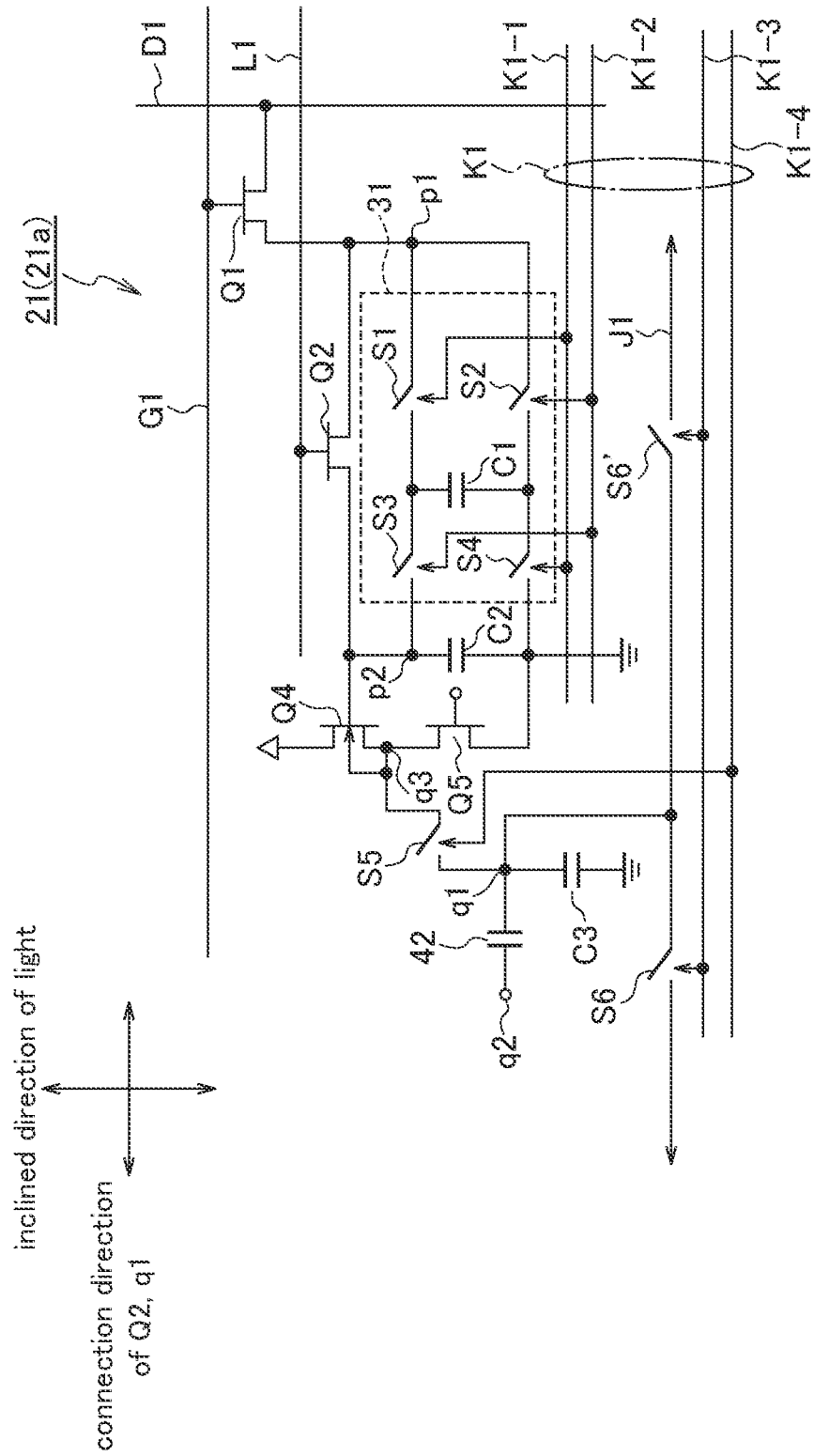
FIG. 21 is a circuit diagram showing a configuration of each pixel circuit provided in the phase modulator according to the sixth embodiment.

Further, since the gradation can be set in a wide voltage range without increasing the maximum voltage VLC of the control voltage supplied to the pixel circuit 21, it is not necessary to increase the breakdown voltage of each component constituting the control circuit 22, each component constituting the charge pump 31 shown in FIG. 21, and the first transistor Q1 and the second transistor Q2, and it is possible to reduce the size and weight of the device.

Further, since the voltage range for setting the driving voltage of the liquid crystal 42 is set to a voltage which is twice the maximum voltage VLC, a desired driving voltage can be obtained by a simple process of amplifying the control voltage by twice, thereby simplifying the circuit configuration.

In the fourth embodiment, the refractive index of the liquid crystal 42 is set to change in one direction out of the column direction and the row direction shown in FIG. 16, and driving lines (L1 to Ln) each for switching the charge pump 31 on and off are arranged in the other direction. Therefore, it is possible to prevent the alignment of the liquid crystal from being disturbed due to the change in the refractive index.

Further, by turning off the second selector switch S5 provided between the output point q3 of the source follower Q4 and the pixel electrode q1 (supply point) and turning on the first selector switch S6, the pixel electrode q1 and the pixel electrode of the adjacent pixel circuit 21 are connected. Therefore, variations in the threshold voltage of the source follower Q4 of each pixel circuit 21 can be reduced, thereby preventing the generation of noise.

In the fourth embodiment, the range of the driving voltage is set to a voltage which is twice the maximum voltage (2×VLC), but the range is not limited to this, and the range may be larger than the maximum voltage VLC.

In the fourth embodiment, the load transistor Q5 is connected to the source follower Q4, but a load resistor may be provided instead of the load transistor Q5.

Description of Fifth Embodiment

Figure 19:
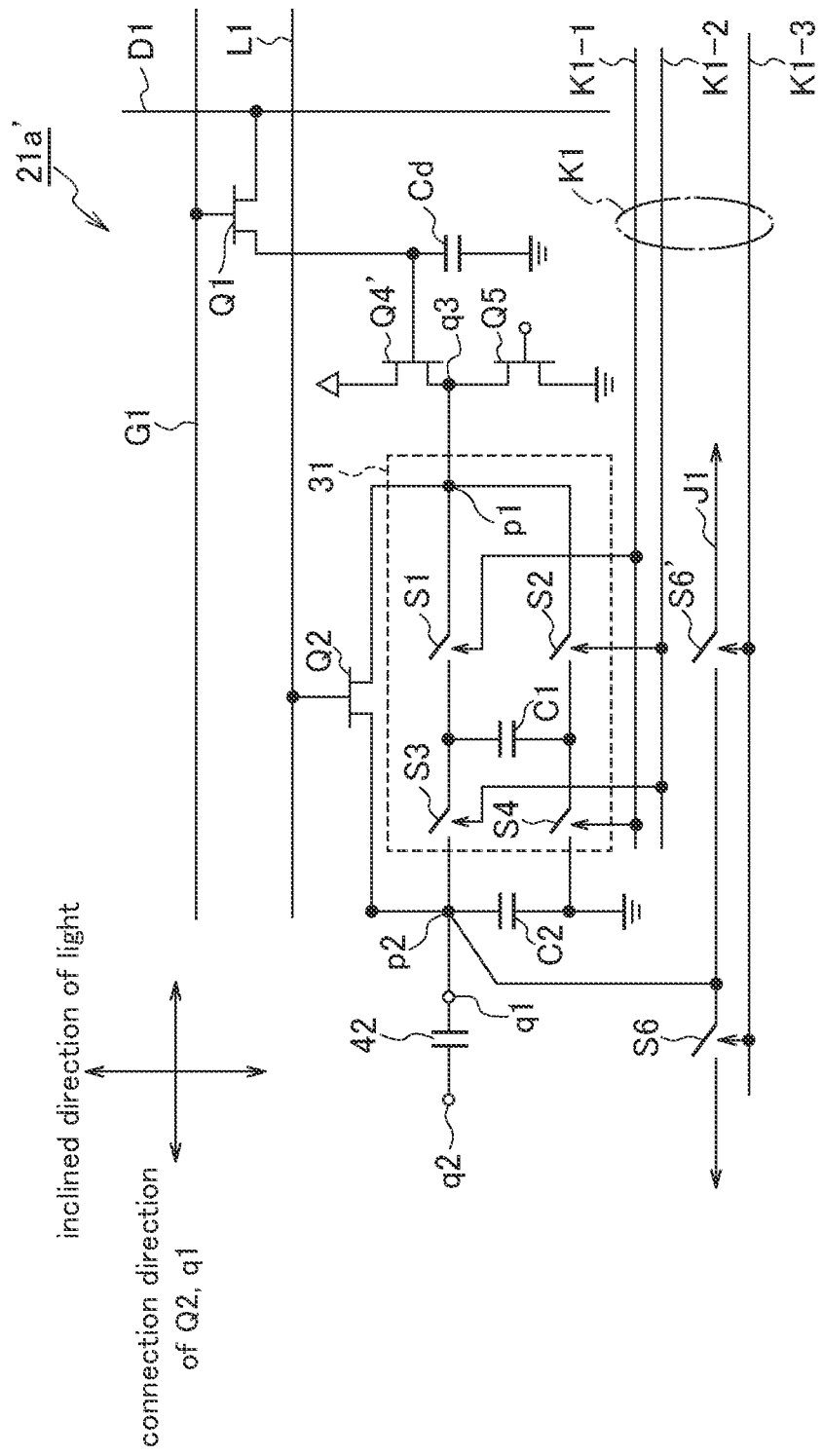
FIG. 19 is a circuit diagram showing a configuration of each pixel circuit provided in the phase modulator according to the fifth embodiment.

Next, a fifth embodiment will be described. The overall configuration of the apparatus of the fifth embodiment is the same as that of FIGS. 1 and 2. Further, since the circuit diagram of the entire apparatus of the fifth embodiment is the same as that of FIG. 16 of the fourth embodiment, the description thereof is omitted. The configuration of the pixel circuit in the fifth embodiment is different from that in the fourth embodiment. Referring to FIG. 19, the pixel circuit 21a' according to the fifth embodiment will be described below.

As shown in FIG. 19, a pixel circuit 21a' according to the fifth embodiment is different from the fourth embodiment in that the source follower Q4 shown in FIG. 17 is provided between the first transistor Q1 and the charge pump 31. That is, in the fifth embodiment, between the first transistor Q1 and the input terminal p1 of the charge pump 31, there are provided a series connection circuit of a source follower Q4' (second source follower) and a load transistor Q5, and a capacitor Cd provided between a gate of the source follower Q4' and the ground.

The output terminal (source) of the first transistor Q1 is branched into 2 systems, and one branch line is connected to the ground via a capacitor Cd. The other branch line is connected to the gate of the source follower Q4'. The output portion (connection point q3) of the source follower Q4' is connected to the charge pump 31. The connection point q3 is connected to the ground via the load transistor Q5.

The output terminal p2 of the charge pump 31 is connected to the pixel electrode q1 and further to the short circuit line J1. As in the case of the fourth embodiment, the short circuit line J1 is provided with a first selector switch S6 for switching the short circuit and the opening with respect to the pixel electrodes of the adjacent pixel circuits 21.

In the pixel circuit 21a' according to the fifth embodiment, the control voltage supplied via the column data line D1 and the first transistor Q1 is amplified by the source follower Q4' and then supplied to the charge pump 31 and the second transistor Q2. Similarly to the fourth embodiment, the control voltage is not amplified by the charge pump 31 when outputting the driving voltages of the gradations 1 and 2, but is amplified by the charge pump 31 when outputting the driving voltages of the gradations 3, 4 and 5.

The pixel circuit 21a' according to the fifth embodiment does not include the second selector switch S5 shown in FIG. 17 and the fourth control line K1-4 for outputting a control signal to the second selector switch S5. Instead, on/off of the second transistor Q2 and the switches S1 to S4 provided in the charge pump 31 are controlled to cut off the input terminal p1 of the charge pump 31 and the output terminal p2 (pixel electrode q1).

Figure 20A:
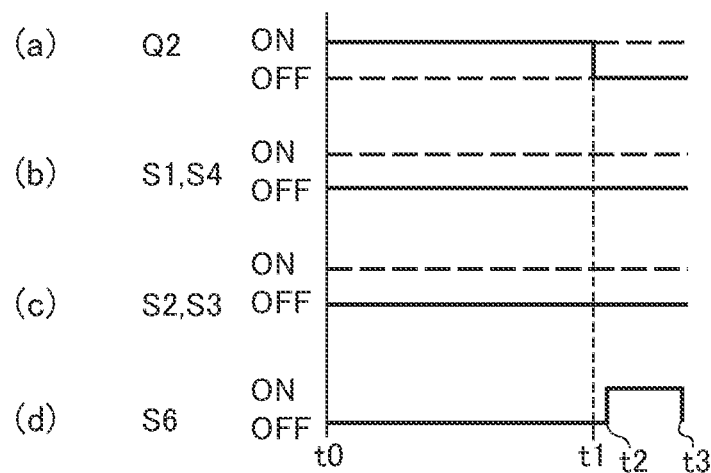
FIG. 20A is a timing chart showing operations of a second transistor Q2, switches S1 to S4, and a first selector switch S6 provided in each pixel circuit when the charge pump is not operated in the phase modulator according to the fifth and seventh embodiments.

The following will be described in detail with reference to FIGS. 20A and 20B. FIG. 20A is a timing chart showing the operation of the second transistor Q2, the switches S1 to S4, and the first selector switch S6 provided in the pixel circuit 21 when the charge pump 31 is not operated.

When the pixel circuit 21a' is set to gradations 1 and 2, the charge pump 31 is not operated. In this case, as shown at times t0 to t1 in the chart (a) of FIG. 20A, the switch controller 25 outputs a signal of H level to the driving line L1 and turns on the second transistor Q2.

Further, as shown in the charts (b) and (c) of FIG. 20A, control is performed so that all the switches S1 to S4 are turned off. As a result, the second transistor Q2 shown in FIG. 19 is turned on, and the input terminal p1 and the output terminal p2 of the charge pump 31 are short-circuited. Therefore, the control voltage supplied from the column data line D1 is amplified by the source follower Q4' and then supplied to the pixel electrode q1 without amplified by the charge pump 31.

Thereafter, at time t1, the second transistor Q2 is turned off (opening), and at time t2, the first selector switch S6 is turned on (short circuit). That is, in a state where the input terminal p1 and the output terminal p2 of the charge pump 31 are cut off, the pixel electrode q1 and the pixel electrode of the pixel circuit adjacent to the pixel circuit 21a' (pixel circuit having the same refractive index) are short-circuited. Therefore, as in the fourth embodiment, the potential of the pixel electrodes of the adjacent pixel circuits is controlled to be the same. As shown by reference signs z1 and z2 in FIG. 7B, a desired driving voltage can be supplied to the liquid crystal 42.

As described above, even when a variation occurs in the threshold voltage Vth between the gate and the source of the source follower Q4' provided in the pixel circuit 21a', with the input terminal p1 and the output terminal p2 cut off, the first selector switch S6 is turned on and connected to the pixel electrode of the adjacent pixel circuit 21. Therefore, variations in the voltages supplied to the pixel electrodes adjacent to each other can be reduced. Thereafter, at time t3, the first selector switch S6 is turned off. Short circuits are prevented by slightly delaying the time t2 shown in FIG. 20A from the time t1.

On the other hand, when the pixel circuit 21a' is set to gradations 3, 4, and 5, the control voltage supplied from the column data line D1 is amplified by the charge pump 31 by a factor of 2.

Figure 20B:
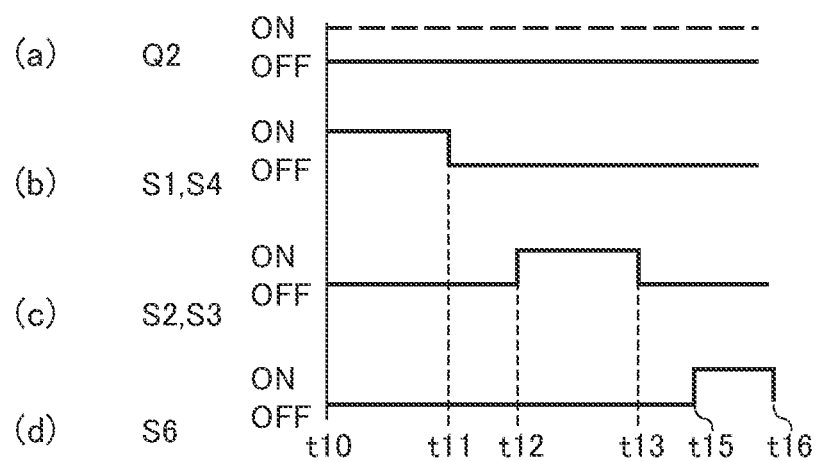
FIG. 20B is a timing chart showing operations of the second transistor Q2, the switches S1 to S4, and the first selector switch S6 provided in each pixel circuit when the charge pump is operated in the phase modulator according to the fifth and seventh embodiments.

Specifically, at time t10 shown in FIG. 20B, the switch controller 25 sets the signal supplied to the driving line L1 to the L level. As a result, as shown in the chart (a) of FIG. 20B, the second transistor Q2 is turned off. Further, at time t10 in chart (b) of FIG. 20B, the switch controller 25 turns on the first switch S1 and the fourth switch S4, and turns off the second switch S2 and the third switch S3.

As a result, the control voltage is accumulated in the first capacitor C1. Then, at time t11, the first switch S1 and the fourth switch S4 are turned off, and as shown in the chart (c) of FIG. 20B, at time t12, the second switch S2 and the third switch S3 are turned on. As a result, a voltage twice as large as the control voltage is accumulated in the output capacitor C2, supplied to the output terminal p2, and supplied to the pixel electrode q1.

Then, at time t13, the second switch S2 and the third switch S3 are turned off. That is, since the second transistor Q2 and the switches S1 to S4 are all turned off, the input terminal p1 and the output terminal p2 are cut off. Further, in the chart (d) of FIG. 20B, at time t15, the first selector switch S6 is turned on (short circuit). That is, in a state where the input terminal p1 and the output terminal p2 are cut off, the pixel electrode q1 and the pixel electrode of the pixel circuit adjacent to the pixel circuit 21a' (pixel circuit having the same refractive index) are short-circuited. Therefore, the potential of the pixel electrodes of the adjacent pixel circuits is controlled to be the same.

Therefore, even if the threshold voltage Vth between the gate and the source of the source follower Q4' provided in each pixel circuit 21 varies, since the input terminal p1 and the output terminal p2 are connected to the pixel electrodes of the adjacent pixel circuits 21 while being cut off, variations in the voltages supplied to the adjacent pixel electrodes can be reduced. Then, at time t16, the first selector switch S6 is turned off. Then, as shown by reference signs z3 to z5 in FIG. 7B, a desired driving voltage can be supplied to the liquid crystal 42.

As described above, in the phase modulator according to the fifth embodiment, similarly to the fourth embodiment, when the maximum control voltage supplied to the pixel circuit 21 from the column data line is the maximum voltage (VLC), the driving voltage for driving the liquid crystal 42 can be set within the range of the voltage that is twice the maximum (2×VLC). Therefore, the refractive index of the liquid crystal 42 can be varied in a wider range, and an increase in the thickness of the liquid crystal layer 12 can be suppressed and the accuracy of phase modulation can be improved.

Further, since gradation can be set in a wide voltage range without increasing the maximum voltage VLC of the control voltage supplied to the pixel circuit 21, it is not necessary to increase the breakdown voltage of each component constituting the control circuit 22. In addition, as compared with the fourth embodiment, since the source follower Q4' is provided in the front stage of the charge pump 31, the source follower Q4', the load transistor Q5, and the capacitor Cd can be composed of low breakdown voltage components. Therefore, the circuit configuration can be simplified, and the size and weight can be reduced.

Further, since short-circuiting and opening of the input terminal p1 and the output terminal p2 are switched by controlling on/off of the second transistor Q2 and the switches S1 to S4, it is not necessary to provide the second selector switch S5 and the fourth control line K1-4 shown in FIG. 17 in the fourth embodiment. Therefore, the phase modulator according to the fifth embodiment can further simplify the circuit configuration.

Description of Sixth Embodiment

The basic configuration of a phase modulator according to a sixth embodiment is the same as the basic configuration of the respective embodiments shown in FIGS. 1 and 2 described in the first embodiment, and therefore the description thereof is omitted.

In the phase modulator 101 according to the sixth embodiment, the configuration of each pixel circuit 21 and a control circuit 22 for controlling each pixel circuit 21 will be described with reference to the block diagram shown in FIG. 16 and the circuit diagram shown in FIG. 21. In FIG. 16, the control circuit 22 includes a plurality of (m columns, n rows) pixel circuits 21 arranged in a matrix, a horizontal scanning circuit 23, a vertical scanning circuit 24, and a switch controller 25 (charge pump controller, selector switch controller). Then, the control circuit 22 outputs an electric signal to each pixel circuit 21 to drive each pixel circuit 21, and each pixel circuit 21 applies a driving voltage to each liquid crystal 42. Accordingly, the refractive index of each liquid crystal 42 on each reflection pixel to the incident light is controlled to be a desired value.

The plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), driving lines (L1 to Ln) and control lines (K1 to Kn) are provided. The driving lines (L1 to Ln) and the control lines (K1 to Kn) are connected to the switch controller 25.

In parallel with the row scanning lines (G1 to Gn), short circuit lines (J1 to Jn) are provided. As shown in FIG. 21, each of the short circuit lines (J1 to Jn) is provided with a first selector switch (S6, S6' in FIG. 21) for switching between short-circuiting and opening between pixel circuits 21 adjacent to each other.

In the example shown in FIG. 16, the refractive index of the light is controlled to change in the longitudinal direction (vertical direction in FIG. 16). Therefore, the short circuit lines (J1 to Jn) is provided in the lateral direction (horizontal direction in FIG. 16) which is a direction orthogonal to the longitudinal direction.

The driving lines (L1 to Ln) are lines for transmitting control signals for switching on/off each second transistor Q2 (short circuit switch; see FIG. 21) provided in each pixel circuit 21. The control lines (K1 to Kn) are lines for transmitting control signals for switching on/off the switches S1 to S4 (see FIG. 21) provided in each pixel circuit 21, and control signals for switching on/off the above-described first selector switch S6 and second selector switch S5 (see FIG. 21). As shown in FIG. 21, each of the plurality of control lines (K1 to Kn) includes a plurality of lines (in FIG. 21, four lines K1-1, K1-2, K1-3, and K1-4), but in FIG. 16, only one control line K1 is used.

As shown in FIG. 21, the first control line K1-1 outputs a control signal for controlling on/off of the first switch S1 and the fourth switch S4 of the charge pump 31. The second control line K1-2 outputs a control signal for controlling ON/OFF of the second switch S2 and the third switch S3 of the charge pump 31. The third control line K1-3 outputs a control signal for controlling ON/OFF of the first selector switches S6 and S6'. S6' is a first selector switch provided in an adjacent pixel circuit. The fourth control line K1-4 outputs a control signal for controlling on/off of the second selector switch S5.

The column data lines (D1 to Dm) are lines for supplying the analog control voltage outputted from the voltage supply line X1 to each pixel circuit 21. The row scanning line (G1 to Gn) is a line for outputting a row selection signal (scanning signal) to each pixel circuit 21.

FIG. 21 is a circuit diagram showing a detailed configuration of the pixel circuit 21. Here, the configuration of the pixel circuit 21 (i.e. referred to as a pixel circuit 21a) disposed at the intersection of the column data line D1 and the row scanning line G1 shown in FIG. 16 will be described. As shown in FIG. 21, the pixel circuit 21a includes a first transistor Q1, a second transistor Q2, a charge pump 31, an output capacitor C2, a source follower Q4 (first source follower), a load transistor Q5, a second selector switch S5, an additional capacitor C3, and a first selector switch S6.

The first transistor Q1 is a switching transistor, and is composed of, for example, an N-channel MOSFET (field effect transistor). The first terminal (e.g. drain) of the first transistor Q1 is connected to the column data line D1, and the second terminal (e.g. the source) is connected to the input terminal p1 of the charge pump 31. The control terminal (e.g. a gate) of the first transistor Q1 is connected to the row scanning line G1. Therefore, when the row scanning line G1 is selected and the control voltage is input from the column data line D1, this control voltage is supplied to the input terminal p1 of the charge pump 31.

The second transistor Q2 is a switching transistor in the same manner as the first transistor Q1, and is composed of, for example, an N-channel MOSFET (field effect transistor). The second transistor Q2 has a first terminal (e.g. drain) connected to the input terminal p1 of the charge pump 31, and a second terminal (e.g. the source) connected to the output terminal p2 of the charge pump 31.

The control terminal (e.g. a gate) of the second transistor Q2 is connected to the driving line L1. Therefore, when a voltage of "H" level is supplied to the driving line L1, the second transistor Q2 is turned on, the input terminal p1 and the output terminal p2 of the charge pump 31 are short-circuited, and the function of the charge pump 31 can be stopped. On the contrary, when a voltage of "L" level is supplied to the driving line L1, the second transistor Q2 is turned off, the input terminal p1 and the output terminal p2 of the charge pump 31 are opened, and the charge pump 31 can be operated.

That is, the second transistor Q2 has a function as a short circuit switch for short-circuiting the input terminal p1 to which the control voltage is supplied to the charge pump 31 and the output terminal p2 to output the driving voltage from the charge pump 31 to the liquid crystal 42. When the driving voltage for setting the liquid crystal 42 to a desired refractive index is equal to or less than the maximum voltage VLC (maximum voltage) supplied from the column data line D1, the switch controller 25 (see FIG. 16) controls to short-circuit the second transistor Q2 and does not amplify the control voltage by the charge pump 31. When the driving voltage exceeds the maximum voltage VLC, the second transistor Q2 is opened so that the control voltage can be amplified by the charge pump 31.

The charge pump 31 includes 4 switches S1 to S4 and a first capacitor C1 for accumulating charge, and amplifies the control voltage supplied to the input terminal p1 and outputs it to the output terminal p2.

The first switch S1 and the third switch S3 are connected in series with each other, the end of the first switch S1 side is connected to the input terminal p1, and the end of the third switch S3 side is connected to the output terminal p2. The second switch S2 and the fourth switch S4 are connected in series with each other, and the end of the second switch S2 side is connected to the input terminal p1, and the end of the fourth switch S4 side is connected to the ground.

A first capacitor C1 is provided between a connection point of the first switch S1 and the third switch S3 and a connection point of the second switch S2 and the fourth switch S4. That is, one end of the first capacitor C1 is connected to the first switch S1 and the third switch S3, and the other end of the first capacitor C1 is connected to the second switch S2 and the fourth switch S4.

The output terminal p2 is connected to the ground via an output capacitor (second capacitor) C2, and further connected to the gate of the source follower Q4. The common electrode q2 of the liquid crystal 42 is a transparent electrode provided on a transparent glass. A common electrode voltage is applied to the transparent electrode.

The first switch S1 and the fourth switch S4 are connected to a first control line K1-1. The second switch S2 and the third switch S3 are connected to a second control line K1-2. Control signals supplied from the control lines K1-1 and K1-2 control on and off the switches S1 to S4.

The pixel circuit 21 is provided with a series connection circuit of the source follower Q4 and the load transistor Q5, the output terminal p2 of the charge pump 31 is connected to the gate of the source follower Q4, and the source of the load transistor Q5 is connected to the ground.

The load transistor Q5 is controlled to be turned on when a voltage (control voltage supplied via the first transistor Q1 or the output voltage of the charge pump 31) is supplied to the gate of the source follower Q4. A control line for controlling the load transistor Q5 is not shown.

The connection point between the source follower Q4 and the load transistor Q5 (output point q3 of the source follower Q4) is connected to the pixel electrode q1 (supply point) via the second selector switch S5. Further, the pixel electrode q1 is connected to the ground via an additional capacitor C3 and to the short circuit line J1. The short circuit line J1 is provided with a first selector switch S6 for switching a short circuit (ON) and an opening (OFF) with respect to the pixel electrode of the adjacent pixel circuit.

The additional capacitor C3 accumulates the voltage outputted from the source follower Q4 via the second selector switch S5.

Since the source follower Q4, the load transistor Q5, the second selector switch S5, and the additional capacitor C3 are driven by the voltage after amplified by the charge pump 31, a high breakdown voltage element is used.

Each of the first selector switches S6 is turned on and off by a control signal outputted from the switch controller 25 via the third control line K1-3. The ON/OFF of the second selector switch S5 is controlled by a control signal outputted from the switch controller 25 via the fourth control line K1-4.

The source follower Q4 may be a P-channel MOSFET or an N-channel MOSFET. The well region of the source follower Q4 is separated from the surrounding well and the source is connected. Therefore, the well potential and the source potential are at the same potential. With such a configuration, since the depletion layer immediately below the gate of the source follower Q4 is held at a voltage between the gate voltage Vin and the source voltage Vout, no substrate bias effect occurs.

Figure 22A:
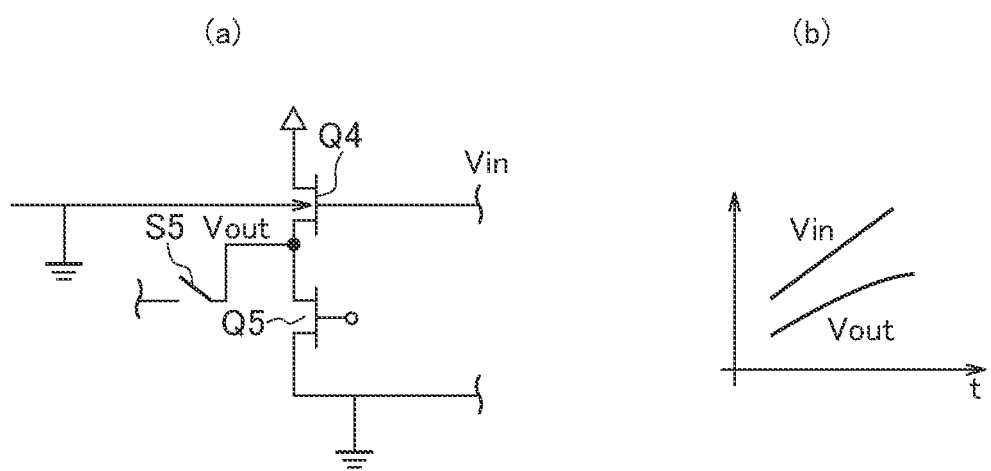
In FIG. 22A, (a) is a circuit diagram when a well of a source follower Q4 of FIG. 21 is connected to the ground, and (b) is a graph showing a relationship between Vin and Vout of (a).

The following will be described in detail. A circuit diagram (a) of FIG. 22A shows a circuit in the case where the source follower Q4 is an N-channel MOSFET and the substrate potential is the ground (i.e. when the well region and the source are not connected). When the voltage Vin inputted to the gate of the source follower Q4 increases, the voltage between the gate and the substrate of the source follower Q4 increases, the depletion layer formed directly under the gate increases, and the threshold voltage Vth (gate-to-source threshold) of the source follower Q4 increases.

On the other hand, since the load transistor Q5 is connected to the source follower Q4 and the load transistor Q5 provides a constant current load, it is necessary to increase the voltage Vgs between the gate voltage Vin and the source voltage Vout by an amount corresponding to an increase in the threshold voltage Vth. That is, as shown in a graph (b) of FIG. 22A, the threshold voltage Vth substantially varies depending on the input gate voltage Vin (substrate bias effect). Therefore, the source voltage Vout does not change linearly with the change of the gate voltage Vin, and it becomes impossible to supply a voltage of an accurate gradation to the liquid crystal 42.

Figure 22B:
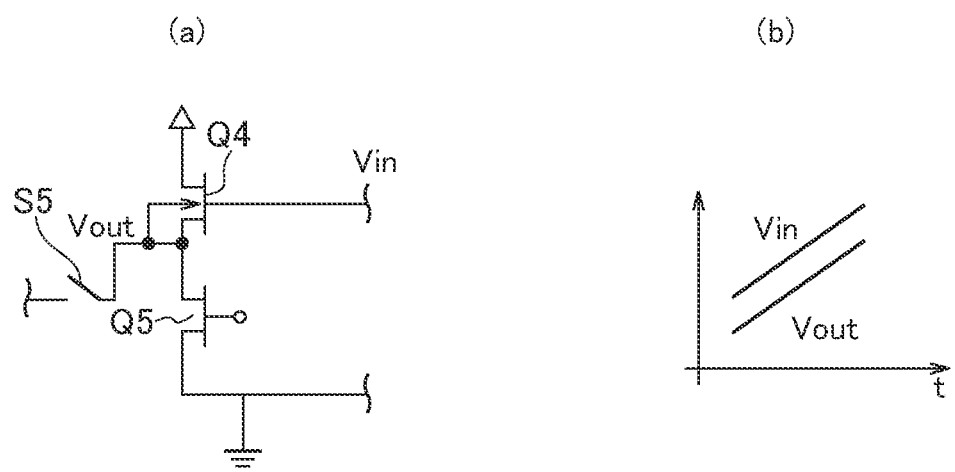
In FIG. 22B, (a) is a circuit diagram when the well of the source follower Q4 of FIG. 21 is connected to a source, and (b) is a graph showing a relationship between Vin and Vout of (a).

On the other hand, in the sixth embodiment, as shown in a circuit diagram (a) of FIG. 22B, the well region of the source follower Q4 is separated from the surrounding well and connected to the source. Therefore, the well potential and the source potential are at the same potential. With such a configuration, since the depletion layer immediately below the gate of the source follower Q4 is held at a voltage between the gate voltage Vin and the source voltage Vout, the substrate bias effect is not generated. That is, as shown in a graph (b) of FIG. 22B, the source voltage Vout linearly changes at substantially the same inclination with respect to the change in the gate voltage Vin. Therefore, the source voltage Vout linearly changing with the change of the gate voltage Vin of the source follower Q4 is obtained. That is, in the sixth embodiment, the well region of the source follower Q4 is connected to the source, and the well potential and the source potential are set to the same potential, so that a stable driving voltage can be supplied to the liquid crystal 42.

Figure 27:
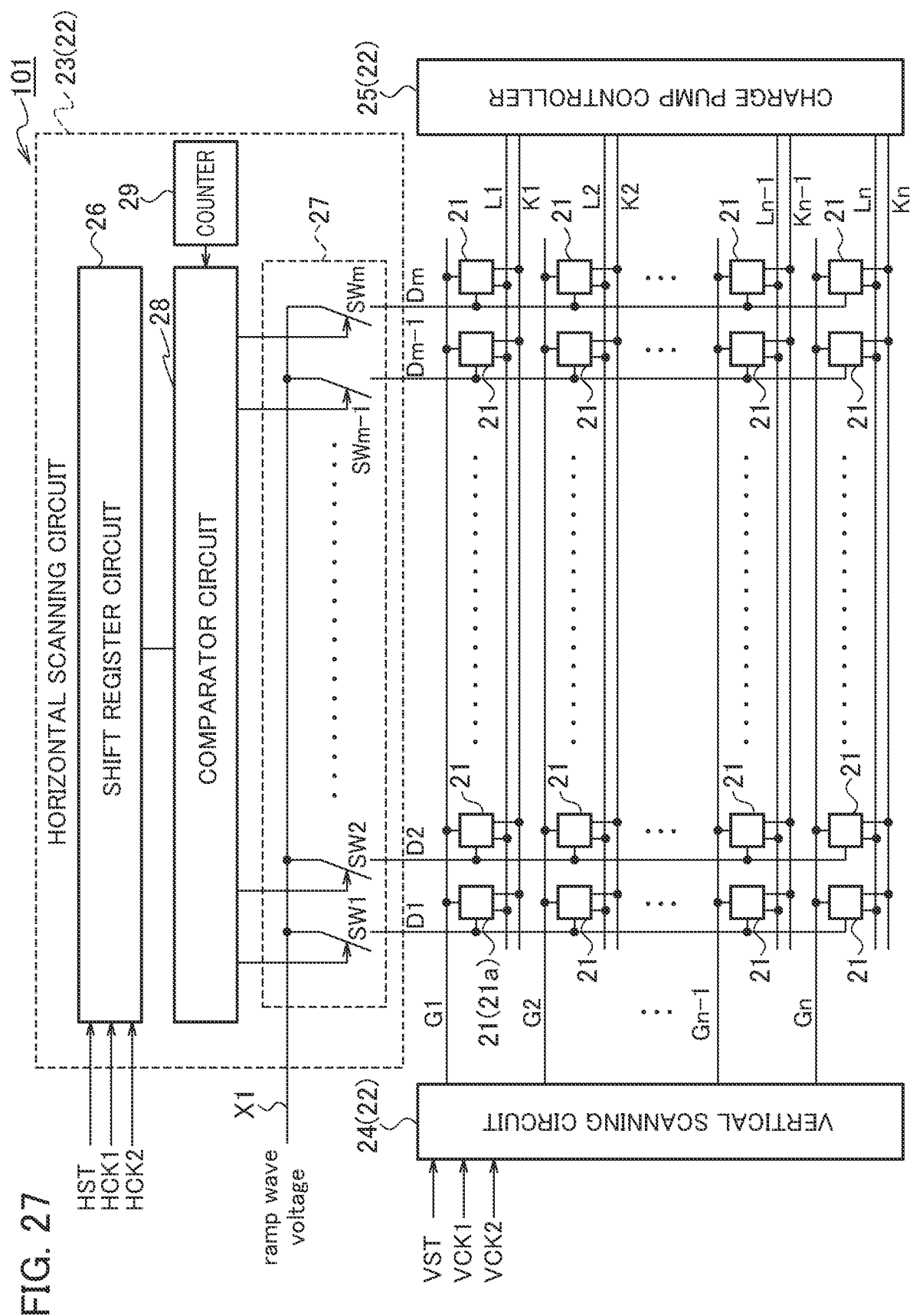
FIG. 27 is a circuit diagram of a phase modulator according to a ninth embodiment.

As shown in FIG. 27, the liquid crystal 42 is driven in accordance with a potential difference between a driving voltage applied from the pixel circuit 21 to the pixel electrode q1 and a common electrode applied to the common electrode q2. Therefore, the incident light incident into the liquid crystal 42 is phase-modulated according to the potential difference and reflected.

In the sixth embodiment as well, the relationship between the angle of the incident light incident into the reflection pixel 20 corresponding to the pixel circuit 21 provided on the reflection substrate 11 and the angle of the reflected light reflected by the reflection pixel 20 is the same as that described in the first embodiment with reference to FIG. 5, and therefore the description thereof is omitted.

As shown in FIG. 16, the horizontal scanning circuit 23 provided in the control circuit 22 includes a shift register circuit 26 and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronization signal and the clock signal for horizontal scanning to generate switching signals (i.e. referred to as "SD1 to SDm") to be output to the switch circuit 27 in a period of 1 horizontal scanning period.

The switch circuit 27 includes m number of switches SW1 to SWm for switching on/off of the column data lines (D1 to Dm). The switches SW1 to SWm are controlled to be on or off based on switching signals (SD1 to SDm) outputted from the shift register circuit 26. The switches SW1 to SWm are provided corresponding to the column data lines (D1 to Dm), and the control voltage "d" corresponding to each column data line is sequentially inputted.

The switches SW1 to SWm selectively apply control voltages corresponding to respective column data lines (D1 to Dm) to the column data lines. For example, the switch SW1 is turned on when the switching signal SD1 is at a high level, selects a control voltage corresponding to the column data line D1, and outputs the selected control voltage to the column data line D1.

The control voltage "d" supplied from the voltage supply line X1 to each column data line (D1 to Dm) is an analog voltage ranging from "0" (minimum voltage) to "VLC" (maximum voltage). In the sixth embodiment, a double voltage (2×VLC), which is twice the maximum voltage VLC, is set, and further, a voltage of k gradations (where k is an integer equal to or greater than 3) is set within a range from the voltage "0" to the double voltage "2×VLC". By switching between driving and stopping of the charge pump 31, control is performed so that the control voltage (voltage in the range of 0 to VLC) supplied from the column data line becomes the above-described voltage (voltage in the range of 0 to 2×VLC) of k gradation.

Hereinafter, with reference to FIG. 7A, the relationship between the gradation set in the liquid crystal and the control voltage supplied to the pixel circuit in the phase modulator according to the sixth embodiment will be described in detail. FIG. 7A is a graph in which the horizontal axis represents the above-described k gradations (five gradations in this example), and the vertical axis represents the control voltage supplied from the voltage supply line X1 to the pixel circuit 21 via the column data line.

The graph R1 shown in FIG. 7A shows the characteristics when the driving voltage supplied to the liquid crystal 42 is not higher than the maximum voltage VLC, and the graph R2 shows the characteristics when the driving voltage supplied to the liquid crystal 42 is equal to or higher than the maximum voltage VLC. Although the graphs R1 and R2 show examples in which the voltage changes linearly, it is not limited to this, and it may be a change that monotonically increases in the range of 0 to VLC.

In FIG. 7A, for example, when the number of gradations of the driving voltage supplied to the liquid crystal 42 is set to "5" (i.e. k=5), the above-described double voltage (2×VLC) is divided into 5 equal parts to set the gradations 1 to 5. Therefore, the double voltage (2×VLC) is divided into 5 equal parts, and the voltage (1/5)×2×VLC of gradation 1, the voltage (2/5)×2×VLC of gradation 2, the voltage (3/5)×2×VLC of gradation 3, the voltage (4/5)×2×VLC of gradation 4, and the voltage (5/5)×2×VLC of gradation 5 may be supplied to the pixel circuit 21 as a control voltage.

However, since the control voltage corresponding to the gradations 3 to 5 exceeds the maximum voltage VLC, the voltage supply line X1 shown in FIG. 16 cannot supply the control voltage corresponding to the gradations 3 to 5 to the pixel circuit 21. In the sixth embodiment, for the gradations 3 to 5, the control voltages of the respective halves are outputted and then amplified by the charge pump 31 by a factor of 2. That is, the control voltage (3/5)×VLC of the gradation 3, the control voltage (4/5)×VLC of the gradation 4, and the control voltage VLC of the gradation 5 are outputted, and are amplified by a factor of 2 by a charge pump 31 provided in each pixel circuit 21. That is, when the control voltage for obtaining the desired gradation is not higher than the maximum voltage VLC (for the gradations 1 and 2), the driving voltage is obtained without amplifying the control voltage as shown in the graph R1 of FIG. 7A.

On the other hand, when the voltage for obtaining the desired gradation exceeds the maximum voltage VLC (for the gradations 3, 4, and 5), as shown in the graph R2 in FIG. 7A, a half of this voltage is supplied as a control voltage to the pixel circuit 21, and then amplified by the charge pump 31 by a factor of 2 to obtain the desired driving voltage. Therefore, the slope of the graph R2 is half the slope of the graph R1.

That is, the switch controller 25 outputs the control voltage to the source follower Q4 and the liquid crystal 42 without amplifying when the voltage corresponding to any one of the plurality of gradations is not higher than the maximum voltage (VLC). On the other hand, when the voltage corresponding to any one of the plurality of gradations exceeds the maximum voltage (VLC), the control voltage is amplified by the charge pump 31 and output to the source follower Q4 and the liquid crystal 42.

Thus, by controlling on/off of each switch SW1 to SWm provided in the switch circuit 27 and controlling driving of the charge pump 31, the pixel circuit 21 generates a driving signal corresponding to k gradations (five gradations in this example) and outputs it to the source follower Q4. That is, as shown in the graph R3 of FIG. 7B, it is possible to output the driving voltage of the gradations 1 to 5 obtained by dividing the double voltage (2×VLC) into 5 equal parts to the source follower Q4.

Further, since the driving voltage outputted to the output point q3 of the source follower Q4 is connected to the pixel electrode q1 via the second selector switch S5, the driving voltage outputted from the source follower Q4 can be supplied to the liquid crystal 42 when the second selector switch S5 is turned on.

In addition, the short circuit line J1 connected to the pixel circuit 21a (one pixel circuit) is provided with a first selector switch S6 for switching between short circuit and opening with respect to the short circuit line J1 connected to the pixel circuit (other pixel circuit) adjacent to the pixel circuit 21a. Therefore, by short-circuiting the first selector switch S6, the pixel electrode q1 of the pixel circuit 21a and the pixel electrode of the adjacent pixel circuit can be short-circuited. By turning on the first selector switch S6, the potential of the pixel electrode q1 between adjacent pixel circuits (pixel circuits for controlling same refractive index) can be made constant. ON/OFF of the first selector switch S6 is performed by a control signal supplied from the third control line K1-3.

As shown in FIG. 16, the vertical scanning circuit 24 is connected to row scanning lines (G1 to Gn). The vertical scanning circuit 24 receives a vertical synchronization signal (VST) and clock signals (VCK1, VCK2) for vertical scanning.

The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The switch controller 25 outputs a drive signal to each of the driving lines (L1 to Ln) shown in FIG. 16. Specifically, when a voltage corresponding to an arbitrary gradation (e.g. gradation 1) among a plurality of gradations (e.g. gradations 1 to 5) is not higher than the maximum voltage (VLC), an "H" level signal is outputted to the driving line. When the voltage corresponding to any one of the plurality of gradations (e.g. gradation 3) exceeds the maximum voltage (VLC), an "L" level signal is outputted to the driving line.

That is, the switch controller 25 has a function as a charge pump controller for performing control of supplying the control voltage to the liquid crystal 42 as an output voltage when the driving voltage supplied to the liquid crystal 42 is equal to or less than the maximum voltage VLC, and supplying the voltage amplified by the charge pump 31 as an output voltage when the driving voltage supplied to the liquid crystal 42 exceeds the maximum voltage VLC.

Further, the switch controller 25 has a function as a switch controller which, when the output voltage of one pixel circuit 21 is supplied to the liquid crystal 42, opens the first selector switch S6 and performs control so as to short-circuit the first selector switch S6 at least in a part of time when the output voltage of one pixel circuit is not supplied to the liquid crystal 42.

Further, the switch controller 25 controls so as not to drive the charge pump 31 when the signal of "H" level is supplied to the driving line L1, but to drive the charge pump 31 when the signal of "L" level is supplied to the driving line L1. The operation of the charge pump 31 will be described below.

When the charge pump 31 is driven, the switch controller 25 outputs a control signal for controlling on/off of each of the switches S1 to S4 shown in FIG. 21 to the control line K1 (K1-1, K1-2). Specifically, when the charge pump 31 is driven and the control voltage is supplied from the column data line D1, the first switch S1 and the fourth switch S4 are turned on and the second switch S2 and the third switch S3 are turned off.

Therefore, the control voltage supplied from the column data line D1 is stored in the first capacitor C1. After the lapse of a predetermined time, the first switch S1 and the fourth switch S4 are turned off, and the second switch S2 and the third switch S3 are turned on. As a result, the control voltage supplied from the column data line D1 and the voltage stored in the first capacitor C1 are added, and the added voltage is stored in the output capacitor C2. Therefore, a voltage twice as large as the control voltage supplied from the column data line D1 is accumulated in the output capacitor C2 and outputted to the source follower Q4.

Then, in the phase modulator 101 according to the sixth embodiment, among the (n×m) pixel circuits 21 shown in FIG. 16, a block composed of several pixel circuits is set. For example, in the sixth embodiment as well, as in the first embodiment, as shown in FIG. 6A, a block including (5 rows×6 columns) pixel circuits 21 is set.

In FIG. 6A, the same voltage is supplied to each of the 6 pixel circuits 21-11 to 21-16 in the same row. For example, pixel circuits 21-11 to 21-16 are supplied with a control voltage corresponding to gradation 1 of gradations 1 to 5. In the vertical direction, the gradation is gradually increased from the top to the bottom in FIG. 6A, and the control voltage corresponding to the gradation 5 is supplied to the lowermost pixel circuits 21-51 to 21-56.

Specifically, as shown in FIG. 6B, in each of the pixel circuits 21-11 to 21-51 arranged in the vertical direction, the driving voltage supplied to the liquid crystal 42 is set to change stepwise in accordance with the gradations 1 to 5. Therefore, the 6 pixel circuits 21 are made into one group, and the phase can be changed in 5 levels, and thus the reflected light phase-modulated in 5 levels can be obtained.

Description of Operation of Sixth Embodiment

Next, the operation of the phase modulator 101 according to the sixth embodiment will be described with reference to graphs shown in FIGS. 7A and 7B and timing charts shown in FIGS. 18A and 18B. FIG. 7B is a graph showing the relationship between the gradation set to 5 levels and the driving voltage supplied to the liquid crystal 42. In the following, as shown in FIG. 6A, an example in which the pixel circuits 21 arranged in a 6×5 matrix and the reflection pixels corresponding to the pixel circuits 21 are provided will be described.

As shown in FIG. 16, the horizontal scanning circuit 23 controls on/off of the switches SW1 to SWm (where m=6) provided in the switching circuit 27 to supply the control voltage supplied from the voltage supply line X1 to the desired column data line.

Further, by driving the vertical scanning circuit 24, the scanning line corresponding to the desired pixel circuit 21 is selected from the respective scanning lines (G1 to Gn) (where n=5). As a result, a control voltage can be supplied to the desired pixel circuit 21.

For example, a voltage in a range from "0" to a voltage that is twice the maximum voltage "0 to 2×VLC" is divided into 5 gradations (i.e. k=1 to 5), a voltage "(1/5)×2×VLC" of gradation 1 is supplied to the pixel circuits 21-11 to 21-16 in the first row shown in FIG. 6A, and a voltage "(2/5)×2× VLC" of gradation 2 is supplied to the pixel circuits 21-21 to 21-26 in the second row.

Further, a voltage of gradation 3 is supplied to the pixel circuits 21-31 to 21-36 of the third row. In this case, the voltage supplied to the pixel circuit becomes "(3/5)×2× VLC" and exceeds the maximum voltage VLC. Therefore, as shown in FIG. 7A, the half voltage "(3/5)×VLC" is outputted as a control voltage, and the voltage is further amplified by the charge pump 31 by a factor of 2 to generate a voltage of "(3/5)×2×VLC" to obtain a voltage of gradation 3.

Similarly, for the pixel circuits 21-41 to 21-46 in the fourth row and the pixel circuits 21-51 to 21-56 in the fifth row, half of the respective voltages are outputted as control voltages, which are then amplified by a charge pump 31 by a factor of 2 to generate voltages of gradations 4 and 5.

Next, the operation of the pixel circuit 21 will be described with reference to timing charts shown in FIGS. 18A and 18B. As an example, the operation of the charge pump 31 in the pixel circuit 21a connected to the column data line D1 and the row scanning line G1 will be described.

When the pixel circuit 21a is set to gradations 1 and 2, the charge pump 31 is not operated. In this case, as shown at times t0 to t1 in the chart (a) of FIG. 18A, the switch controller 25 outputs a signal of H level to the driving line L1 and turns on the second transistor Q2.

Further, as shown in the charts (b) and (c) of FIG. 18A, control is performed so that all the switches S1 to S4 are turned off. As a result, the second transistor Q2 shown in FIG. 27 is turned on, and the input terminal p1 and the output terminal p2 of the charge pump 31 are short-circuited, so that the control voltage supplied from the column data line D1 is supplied to the gate of the source follower Q4 without amplified by the charge pump 31. Further, it is amplified by the source follower Q4 and stored in the additional capacitor C3.

Thereafter, at time t1, the second selector switch S5 is turned off (opening), and at time t2, the first selector switch S6 is turned on (short circuit). That is, in a state where the pixel electrode q1 of the pixel circuit 21a is cut off from the source follower Q4, the pixel electrode q1 and the pixel electrode of the pixel circuit adjacent to the pixel circuit 21a (pixel circuit having the same refractive index) are short-circuited. Therefore, the potential of the pixel electrodes of the adjacent pixel circuits is controlled to be the same. As shown by reference sign z1 in FIG. 7B, a voltage of "(1/5)×2×VLC" can be supplied to the liquid crystal.

In this way, even when the threshold voltage (i.e. referred to as "Vth") between the gate and the source of the source follower Q4 provided in each pixel circuit 21 varies, the second selector switch S5 is turned off to separate the source follower Q4 from the pixel electrode q1. Further, a first selector switch S6 is turned on and connected to a pixel electrode of an adjacent pixel circuit 21. Therefore, variations in the voltages supplied to the pixel electrodes adjacent to each other can be reduced. Thereafter, at time t3, the first selector switch S6 is turned off.

In order to avoid the simultaneous ON (simultaneous short-circuiting) of the first selector switch S6 and the second selector switch S5, the time t2 shown in FIG. 18A is set to be slightly later than the time t1.

When the pixel circuit 21a is set to gradation 2, similarly, the charge pump 31 is not operated, and the control voltage supplied from the column data line D1 is outputted without amplified, as shown by reference sign z2 in FIG. 7B. As a result, a voltage of "(2/5)×2×VLC" can be applied to the liquid crystal 42, and variations in the potential of the pixel electrodes of the adjacent pixel circuits can be reduced.

When the pixel circuit 21 is set to gradation 3, a half voltage "(2/5)×VLC" of a voltage "(2/5)×2×VLC" corresponding to gradation 3 is outputted to the column data line D1 as a control voltage. Further, the control voltage is amplified by a charge pump 31 by a factor of 2.

Specifically, at time t23 shown in FIG. 10B, the switch controller 25 sets the signal supplied to the driving line L1 to the L level. As a result, as shown in the chart (a) of FIG. 18B, the second transistor Q2 is turned off. Further, at time t10 in the chart (b) of FIG. 18B, the switch controller 25 outputs a control signal for turning on the first switch S1 and the fourth switch S4 shown in FIG. 21 and turning off the second switch S2 and the third switch S3 to the control line K1 (K1-1, K1-2).

As a result, the control voltage "(3/5)×VLC" is accumulated in the first capacitor C1. Then, at time t11, the first switch S1 and the fourth switch S4 are turned off, and as shown in the chart (c) of FIG. 18B, at time t12, the second switch S2 and the third switch S3 are turned on. As a result, in the output capacitor C2, a voltage which is twice the control voltage "(3/5)×2×VLC" is accumulated and further supplied to the gate of the source follower Q4. Further, it is amplified by the source follower Q4 and stored in the additional capacitor C3.

Figure 18B:
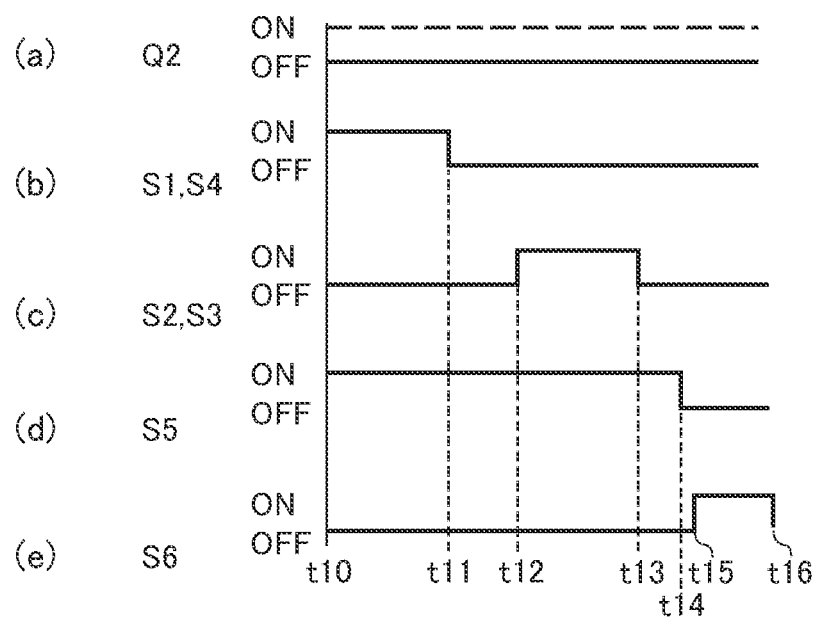
FIG. 18B is a timing chart showing operations of the second transistor Q2, the switches S1 to S4, the first selector switch S6, and the second selector switch S5 provided in each pixel circuit when the charge pump is operated in the phase modulator according to the fourth and sixth embodiments.

Thereafter, at time t13, the second switch S2 and the third switch S3 are turned off, and at time t14 in the chart (d) in FIG. 18B, the second selector switch S5 is turned off (opening), and at time t15 in the chart (e) in FIG. 18B, the first switch S6 is turned on (short circuit). That is, in a state where the pixel electrode q1 of the pixel circuit 21a is cut off from the source follower Q4, the pixel electrode q1 and the pixel electrode of the pixel circuit adjacent to the pixel circuit 21a (pixel circuit having the same refractive index) are short-circuited. Therefore, the potential of the pixel electrodes of the adjacent pixel circuits is controlled to be the same. As shown by reference sign z3 in FIG. 7B, a voltage of "(3/5)×2×VLC" can be supplied to the liquid crystal 42.

Therefore, even if the threshold voltage (i.e. referred to as "Vth") between the gate and the source of the source follower Q4 provided in each pixel circuit 21 varies, since the source follower Q4 and the pixel electrode q1 are separated and connected to the pixel electrode of the adjacent pixel circuit 21, the variation of the voltage supplied to the adjacent pixel electrode can be reduced. Then, at time t16, the first selector switch S6 is turned off.

When the pixel circuit 21a is set to gradations 4 and 5, the charge pump 31 is similarly operated to amplify and output the control voltage supplied from the column data line D1, as shown by reference signs z4 and z5 in FIG. 7B. As a result, voltages of "(4/5)×2×VLC" and "2×VLC" can be applied to the liquid crystal 42, and variations in potential of pixel electrodes of adjacent pixel circuits can be reduced.

Explanation of Effects of Sixth Embodiment

In the phase modulator 101 according to the sixth embodiment, each pixel circuit 21 includes a charge pump 31. When any one of a plurality of gradations set in advance in a range from "0" to a voltage twice the maximum voltage (2×VLC) is set, and the voltage corresponding to the arbitrary gradation is not more than the maximum voltage (VLC), the control voltage supplied from the column data line to the pixel circuit 21 is outputted to the liquid crystal 42 without amplification.

When the voltage corresponding to any one of the plurality of gradations exceeds the maximum voltage (VLC), the charge pump 31 amplifies and outputs the control voltage. The output voltage is amplified by the source follower Q4, supplied to the pixel electrode q1, and then supplied to the liquid crystal 42.

Therefore, when the maximum control voltage supplied from the column data line to the pixel circuit 21 is the maximum voltage (VLC), the driving voltage for driving the liquid crystal 42 can be set within a range of a voltage that is twice the maximum (2×VLC). Therefore, the refractive index of the liquid crystal 42 can be varied in a wider range, and an increase in the thickness of the liquid crystal layer 12 can be suppressed and the accuracy of phase modulation can be improved.

Further, since the well region of the source follower Q4 is connected to the source, and the well potential and the source potential are set to the same potential, as shown in the graph (b) of FIG. 22B, an output voltage which changes substantially linearly with respect to the voltage supplied to the gate of the source follower Q4 can be obtained. Therefore, even when the source follower Q4 is used, a stable voltage can be supplied to the liquid crystal 42, and thus the refractive index of the liquid crystal 42 can be set stably.

Further, since the gradation can be set in a wide voltage range without increasing the maximum voltage VLC of the control voltage supplied to the pixel circuit 21, it is not necessary to increase the breakdown voltage of each component constituting the control circuit 22, each component constituting the charge pump shown in FIG. 21, and the first transistor Q1 and the second transistor Q2, and it is possible to reduce the size and weight of the device.

Further, since the voltage range for setting the driving voltage of the liquid crystal 42 is set to a voltage which is twice the maximum voltage VLC, a desired driving voltage can be obtained by a simple process of amplifying the control voltage twice, thereby simplifying the circuit configuration.

In the sixth embodiment, the refractive index of the liquid crystal 42 is set to change in one direction out of the column direction and the row direction shown in FIG. 16, which are orthogonal to each other, and the driving lines (L1 to Ln) each for switching on and off the charge pump is arranged in the other direction. Therefore, it is possible to prevent the alignment of the liquid crystal from being disturbed due to the change in the refractive index.

Further, by turning off the second selector switch S5 provided between the output point q3 of the source follower Q4 and the pixel electrode q1 (supply point) and turning on the first selector switch S6, the pixel electrode q1 and the pixel electrode of the adjacent pixel circuit 21 are connected. Therefore, variations in the threshold voltage of the source follower Q4 of each pixel circuit 21 can be reduced, thereby preventing the generation of noise.

In the sixth embodiment, the range of the driving voltage is set to a voltage which is twice the maximum voltage (2×VLC), but the range is not limited to this, and the range may be larger than the maximum voltage VLC.

In the sixth embodiment, the load transistor Q5 is connected to the source follower Q4, but a load resistor may be provided instead of the load transistor Q5.

Description of Seventh Embodiment

Figure 23:
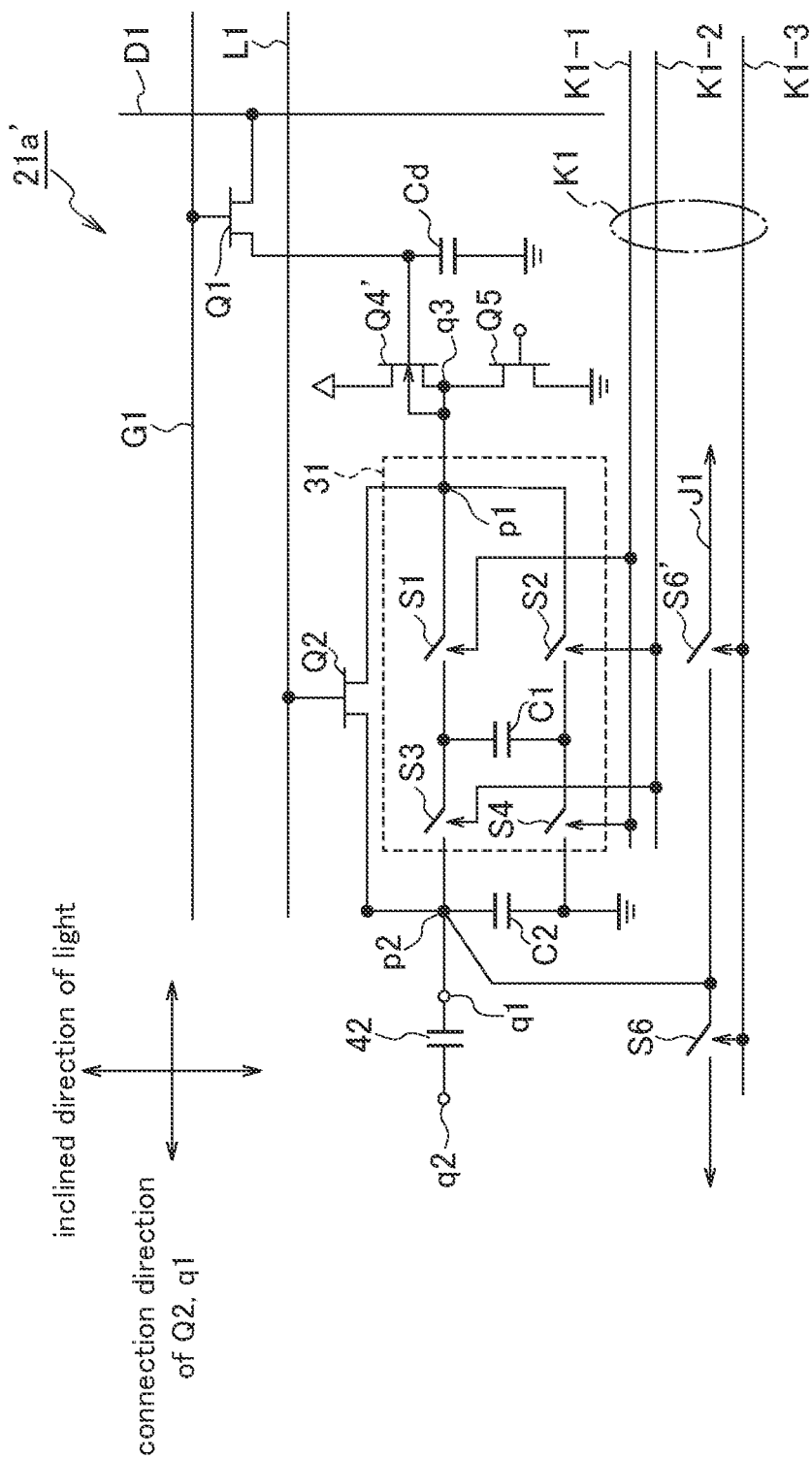
FIG. 23 is a circuit diagram showing a configuration of each pixel circuit provided in the phase modulator according to the seventh embodiment.

Next, a seventh embodiment will be described. The overall configuration of the apparatus of the seventh embodiment is the same as that of FIGS. 1 and 2. Further, since the circuit diagram of the entire apparatus of the seventh embodiment is the same as that of FIG. 16 of the sixth embodiment, the description thereof will be omitted. The seventh embodiment differs from the sixth embodiment in the configuration of the pixel circuit. Referring to FIG. 23, the pixel circuit 21a' according to the seventh embodiment will be described below.

As shown in FIG. 23, a pixel circuit 21a' according to the seventh embodiment is different from the sixth embodiment in that the source follower Q4 shown in FIG. 21 is provided between the first transistor Q1 and the charge pump 31. That is, in the seventh embodiment, a series connection circuit of the source follower Q4' (second source follower) and the load transistor Q5 is set between the first transistor Q1 and the input terminal p1 of the charge pump 31. Further, a capacitor Cd is provided between the gate of the source follower Q4' and the ground.

The output terminal (source) of the first transistor Q1 is branched into 2 systems, and one branch line is connected to the ground via a capacitor Cd. The other branch line is connected to the gate of the source follower Q4'. The output portion (connection point q3) of the source follower Q4' is connected to the charge pump 31. The connection point q3 is connected to the ground via the load transistor Q5.

As in the sixth embodiment, the well region of the source follower Q4' is separated from the surrounding well and the source is connected. Therefore, the well potential and the source potential are at the same potential.

The output terminal p2 of the charge pump 31 is connected to the pixel electrode q1 and further to the short circuit line J1. As in the case of the sixth embodiment, the short circuit line J1 is provided with a first selector switch S6 for switching the short-circuit and the opening with respect to the pixel electrode of the adjacent pixel circuit 21.

In the pixel circuit 21a' according to the seventh embodiment, the control voltage supplied via the column data line D1 and the first transistor Q1 is amplified by the source follower Q4' and then supplied to the charge pump 31 and the second transistor Q2. Similarly to the sixth embodiment, the control voltage is not amplified by the charge pump 31 when outputting the driving voltages of the gradations 1 and 2, but is amplified by the charge pump 31 when outputting the driving voltages of the gradations 3, 4 and 5.

Further, the pixel circuit 21a' according to the seventh embodiment does not include the second selector switch S5 shown in FIG. 21 and the fourth control line K1-4 for outputting a control signal to the second selector switch S5. Instead, on/off of the second transistor Q2 and the switches S1 to S4 provided in the charge pump 31 are controlled to cut off the input terminal p1 and the output terminal p2 (pixel electrode q1) of the charge pump 31.

The following will be described in detail with reference to FIGS. 20A and 20B.

FIG. 20A is a timing chart showing the operation of the second transistor Q2, the switches S1 to S4, and the first selector switch S6 provided in the pixel circuit 21 when the charge pump 31 is not operated.

When the pixel circuit 21a' is set to gradations 1 and 2, the charge pump 31 is not operated. In this case, as shown at times t0 to t1 in the chart (a) of FIG. 20A, the switch controller 25 outputs a signal of H level to the driving line L1 and turns on the second transistor Q2.

Further, as shown in the charts (b) and (c) of FIG. 20A, control is performed so that all the switches S1 to S4 are turned off. As a result, the second transistor Q2 shown in FIG. 23 is turned on, and the input terminal p1 and the output terminal p2 of the charge pump 31 are short-circuited. Therefore, the control voltage supplied from the column data line D1 is amplified by the source follower Q4' and then supplied to the pixel electrode q1 without amplified by the charge pump 31.

Thereafter, at time t1, the second transistor Q2 is turned off (opening), and at time t2, the first selector switch S6 is turned on (short circuit). That is, in a state where the input terminal p1 and the output terminal p2 of the charge pump 31 are cut off, the pixel electrode q1 and the pixel electrode of the pixel circuit adjacent to the pixel circuit 21a' (pixel circuit having the same refractive index) are short-circuited. Therefore, as in the sixth embodiment, the potential of the pixel electrodes of the adjacent pixel circuits is controlled to be the same. As shown by reference signs z1 and z2 in FIG. 7B, a desired driving voltage can be supplied to the liquid crystal 42.

As described above, even when a variation occurs in the threshold voltage Vth between the gate and the source of the source follower Q4' provided in the pixel circuit 21a', with the input terminal p1 and the output terminal p2 cut off, the first selector switch S6 is turned on and connected to the pixel electrode of the adjacent pixel circuit 21. Therefore, variations in the voltages supplied to the pixel electrodes adjacent to each other can be reduced. Thereafter, at time t3, the first selector switch S6 is turned off. Short circuits are prevented by slightly delaying the time t2 shown in FIG. 20A from the time t1.

On the other hand, when the pixel circuit 21a' is set to gradations 3, 4, and 5, the control voltage supplied from the column data line D1 is amplified by the charge pump 31 by a factor of 2.

Specifically, at time t25 shown in FIG. 10B, the switch controller 25 sets the signal supplied to the driving line L1 to the L level. As a result, as shown in the chart (a) of FIG. 20B, the second transistor Q2 is turned off. Further, at time 10 t in chart (b) of FIG. 20B, the switch controller 25 turns on the first switch S1 and the fourth switch S4, and turns off the second switch S2 and the third switch S3.

As a result, the control voltage is accumulated in the first capacitor C1. Then, at time t11, the first switch S1 and the fourth switch S4 are turned off, and as shown in the chart (c) of FIG. 20B, at time t12, the second switch S2 and the third switch S3 are turned on. As a result, a voltage twice as large as the control voltage is accumulated in the output capacitor C2, supplied to the output terminal p2, and supplied to the pixel electrode q1.

Then, at time t13, the second switch S2 and the third switch S3 are turned off. That is, since the second transistor Q2 and the switches S1 to S4 are all turned off, the input terminal p1 and the output terminal p2 are cut off. Further, in the chart (d) of FIG. 20B, at time t15, the first selector switch S6 is turned on (short circuit). That is, in a state where the input terminal p1 and the output terminal p2 are cut off, the pixel electrode q1 and the pixel electrode of the pixel circuit adjacent to the pixel circuit 21a' (pixel circuit having the same refractive index) are short-circuited. Therefore, the potential of the pixel electrodes of the adjacent pixel circuits is controlled to be the same.

Therefore, even if the threshold voltage Vth between the gate and the source of the source follower Q4' provided in each pixel circuit 21 varies, since the input terminal p1 and the output terminal p2 are connected to the pixel electrodes of the adjacent pixel circuits 21 while being cut off, variations in the voltages supplied to the adjacent pixel electrodes can be reduced. Then, at time t16, the first selector switch S6 is turned off. Then, as shown by reference signs z3 to z5 in FIG. 7B, a desired driving voltage can be supplied to the liquid crystal 42.

As described above, in the phase modulator according to the seventh embodiment, similarly to the sixth embodiment, when the maximum control voltage supplied to the pixel circuit 21 from the column data line is the maximum voltage (VLC), the driving voltage for driving the liquid crystal 42 can be set within a voltage range that is twice the maximum voltage (2×VLC). Therefore, the refractive index of the liquid crystal 42 can be varied in a wider range, and an increase in the thickness of the liquid crystal layer 12 can be suppressed and the accuracy of phase modulation can be improved.

Further, since the well region of the source follower Q4' is connected to the source, and the well potential and the source potential are set to the same potential, as shown in the graph (b) of FIG. 22B, an output voltage which changes substantially linearly with respect to the voltage supplied to the gate of the source follower Q4' can be obtained. Therefore, even when the source follower Q4' is used, a stable voltage can be supplied to the liquid crystal 42, and thus the refractive index of the liquid crystal 42 can be set stably.

Further, since gradation can be set in a wide voltage range without increasing the maximum voltage VLC of the control voltage supplied to the pixel circuit 21, it is not necessary to increase the breakdown voltage of each component constituting the control circuit 22. In addition, as compared with the sixth embodiment, since the source follower Q4' is provided in the front stage of the charge pump 31, the source follower Q4', the load transistor Q5, and the capacitor Cd can be composed of low breakdown voltage components. Therefore, the circuit configuration can be simplified, and the size and weight can be reduced.

Further, since short-circuiting and opening of the input terminal p1 and the output terminal p2 are switched by controlling on/off of the second transistor Q2 and the switches S1 to S4, it is not necessary to provide the second selector switch S5 and the fourth control line K1-4 shown in FIG. 27 in the fourth embodiment. Therefore, the phase modulator according to the seventh embodiment can further simplify the circuit configuration.

Description of Eighth Embodiment

The basic configuration of a phase modulator according to an eighth embodiment is the same as the basic configuration of the embodiments shown in FIGS. 1 and 2 described in the first embodiment, and therefore the description thereof is omitted.

Figure 24:
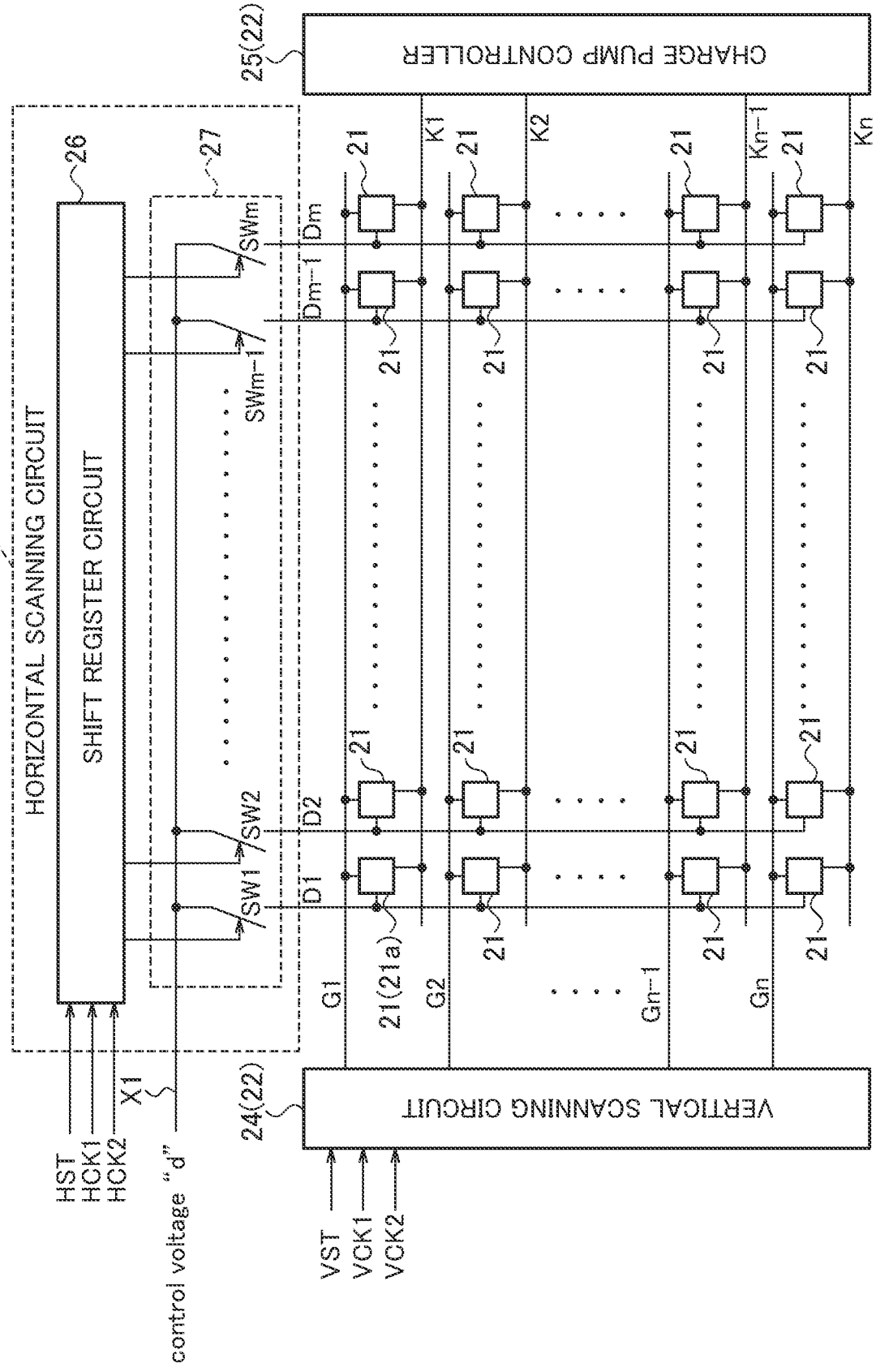
FIG. 24 is a circuit diagram of a phase modulator according to an eighth embodiment.

In the phase modulator 101 according to the eighth embodiment, the configuration of each pixel circuit 21 and a control circuit 22 for controlling each pixel circuit 21 will be described with reference to the block diagram shown in FIG. 24 and the circuit diagram shown in FIG. 25. In FIG. 24, the control circuit 22 includes a plurality of (m columns, n rows) pixel circuits 21 arranged in a matrix, a horizontal scanning circuit 23, a vertical scanning circuit 24, and a charge pump controller 25. Then, the control circuit 22 outputs an electric signal to each pixel circuit 21 to drive each pixel circuit 21, and each pixel circuit 21 applies a driving voltage to each liquid crystal 42. Accordingly, the refractive index of each liquid crystal 42 on each reflection pixel to the incident light is controlled to be a desired value.

A plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), control lines (K1 to Kn) are provided. The control lines (K1 to Kn) are connected to the charge pump controller 25.

The control lines (K1 to Kn) are lines for transmitting control signals for switching on/off the switches S1 to S4 (see FIG. 25) provided in each pixel circuit 21. As shown in FIG. 25, each of the plurality of control lines (K1 to Kn) includes a plurality of lines (in FIG. 25, four lines K1-1, K1-2, K1-3, and K1-4), but in FIG. 24, only one control line K1 is used.

The column data lines (D1 to Dm) are lines each for supplying an analog voltage (hereinafter referred to as "control voltage") outputted from the voltage supply line X1 to each pixel circuit 21. The row scanning line (G1 to Gn) is a line for outputting a row selection signal (scanning signal) to each pixel circuit 21.

Figure 25:
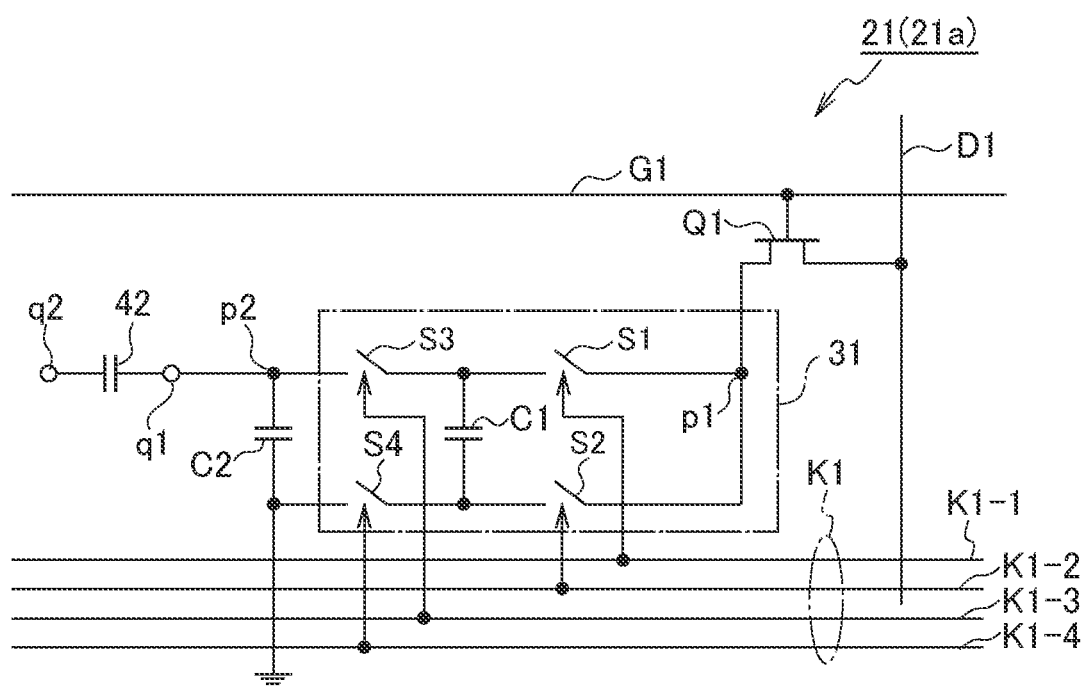
FIG. 25 is a circuit diagram showing a configuration of each pixel circuit provided in the phase modulator according to the eighth embodiment.

FIG. 25 is a circuit diagram showing a detailed configuration of the pixel circuit 21. Here, the configuration of the pixel circuit 21 (i.e. referred to as a pixel circuit 21a) disposed at the intersection of the column data line D1 and the row scanning line G1 shown in FIG. 24 will be described. As shown in FIG. 25, the pixel circuit 21a includes a first transistor Q1, a charge pump 31, and an output capacitor C2.

The first transistor Q1 is a switching transistor, and is composed of, for example, an N-channel MOSFET (field effect transistor). A first terminal (e.g. drain) of the first transistor Q1 is connected to the column data line D1, and a second terminal (e.g. source) is connected to the input terminal p1 of the charge pump 31. A control terminal (e.g. a gate) of the first transistor Q1 is connected to the row scanning line G1. Therefore, when the row scanning line G1 is selected and the control voltage is input from the column data line D1, this control voltage is supplied to the input terminal p1 of the charge pump 31.

The charge pump 31 includes 4 switches S1 to S4 and a first capacitor C1 for accumulating charge, and amplifies the control voltage supplied to the input terminal p1 and outputs it to the output terminal p2.

The first switch S1 and the third switch S3 are connected in series with each other, the end of the first switch S1 side is connected to the input terminal p1, and the end of the third switch S3 side is connected to the output terminal p2. The second switch S2 and the fourth switch S4 are connected in series with each other, and the end of the second switch S2 side is connected to the input terminal p1, and the end of the fourth switch S4 side is connected to the ground.

A first capacitor C1 is provided between a connection point of the first switch S1 and the third switch S3 and a connection point of the second switch S2 and the fourth switch S4. That is, one end of the first capacitor C1 is connected to the first switch S1 and the third switch S3, and the other end of the first capacitor C1 is connected to the second switch S2 and the fourth switch S4. As described above, the four switches S1 to S4 and the first capacitor C1 constitute a bridge circuit. That is, the charge pump 31 includes a bridge circuit comprising a plurality of switches S1 to S4. The control voltage can be amplified by controlling on (short circuit) and off (opening) of each switch S1 to S4. Further, by simultaneously turning on the first switch S1 and the third switch S3, the input terminal p1 and the output terminal p2 of the charge pump 31 can be short-circuited.

The output terminal p2 is connected to the ground via the output capacitor C2 and to the pixel electrode q1 of the liquid crystal 42. As described above, the common electrode q2 of the liquid crystal 42 is a transparent electrode provided on a transparent glass. A common electrode voltage is applied to the transparent electrode.

Further, the first switch S1 is connected to the first control line K1-1, the second switch S2 is connected to the second control line K1-2, the third switch S3 is connected to the third control line K1-3, and the fourth switch S4 is connected to the fourth control line K1-4. Control signals supplied from the control lines K1-1, K1-2, K1-1, and K1-2 control on and off of the switches S1 to S4.

Further, by outputting control signals for turning on the first switch S1 and the third switch S3 from the first control line K1-1 and the third control line K1-3, the first switch S1 and the third switch S3 are turned on at the same time, so that the operation of the charge pump 31 is stopped, and the control voltage supplied from the column data line can be supplied to the pixel electrode q1 and the liquid crystal 42. That is, the first control line K1-1 and the second control line K1-2 have functions as driving lines for switching the charge pump 31 on (short circuit) and off (opening). The first switch S1 and the third switch S3 serve as a short circuit switch for short-circuiting the input terminal p1 and the output terminal p2 of the charge pump 31.

The liquid crystal 42 is driven according to a potential difference between a driving voltage applied from the pixel circuit 21 to the pixel electrode q1 and a common electrode applied to the common electrode q2. Therefore, the incident light incident into the liquid crystal 42 is phase-modulated according to the potential difference and reflected. In the eighth embodiment as well, the relationship between the angle of the incident light incident into the reflection pixel 20 corresponding to the pixel circuit 21 provided on the reflection substrate 11 and the angle of the reflected light reflected by the reflection pixel 20 is the same as that described in the first embodiment with reference to FIG. 5, and therefore the description thereof is omitted.

As shown in FIG. 24, the horizontal scanning circuit 23 provided in the control circuit 22 includes a shift register circuit 26 and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronization signal and the clock signal for horizontal scanning to generate switching signals (i.e. referred to as "SD1 to SDm") to be output to the switch circuit 27 in a period of 1 horizontal scanning period.

The switch circuit 27 includes m number of switches SW1 to SWm for switching on/off of the column data lines (D1 to Dm). The switches SW1 to SWm are controlled to be on or off based on switching signals (SD1 to SDm) outputted from the shift register circuit 26. The switches SW1 to SWm are provided corresponding to the column data lines (D1 to Dm), and the control voltage "d" corresponding to each column data line is sequentially inputted.

The switches SW1 to SWm selectively apply control voltages corresponding to respective column data lines (D1 to Dm) to the column data lines. For example, the switch SW1 is turned on when the switching signal SD1 is at a high level, selects a control voltage corresponding to the column data line D1, and outputs the selected control voltage to the column data line D1.

The control voltage "d" supplied from the voltage supply line X1 to each column data line (D1 to Dm) is an analog voltage ranging from "0" (minimum voltage) to "VLC" (maximum voltage). In the eighth embodiment, a double voltage (2×VLC), which is twice the maximum voltage VLC, is set, and further, a voltage of k gradations (where k is an integer equal to or greater than 3) is set within a range from the voltage "0" to the double voltage "2×VLC". By switching between driving and stopping of the charge pump 31, control is performed so that the control voltage (voltage in the range of 0 to VLC) supplied from the column data line becomes the above-described voltage of k gradation (voltage in the range of 0 to 2×VLC).

Hereinafter, with reference to FIG. 7A, the relationship between the gradation set in the liquid crystal and the control voltage supplied to the pixel circuit in the phase modulator according to the eighth embodiment will be described in detail. FIG. 7A is a graph in which the horizontal axis represents the above-described k gradations (five gradations in this example), and the vertical axis represents the control voltage supplied from the voltage supply line X1 to the pixel circuit 21 via the column data line.

The graph R1 shown in FIG. 7A shows the characteristics when the driving voltage supplied to the liquid crystal 42 is not higher than the maximum voltage VLC, and the graph R2 shows the characteristics when the driving voltage supplied to the liquid crystal 42 is equal to or higher than the maximum voltage VLC. Although the graphs R1 and R2 show examples in which the voltage changes linearly, it is not limited to this, and it may be a change that monotonically increases in the range of 0 to VLC.

In FIG. 7A, for example, when the number of gradations of the driving voltage supplied to the liquid crystal 42 is set to "5" (i.e. k=5), the above-described double voltage (2×VLC) is divided into 5 equal parts to set gradations 1 to 5. Therefore, the double voltage (2×VLC) is divided into 5 equal parts, and the voltage (1/5)×2×VLC of gradation 1, the voltage (2/5)×2×VLC of gradation 2, the voltage (3/5)×2× VLC of gradation 3, the voltage (4/5)×2×VLC of gradation 4, and the voltage (5/5)×2×VLC of gradation 5 may be supplied to the pixel circuit 21 as a control voltage.

However, since the control voltage corresponding to the gradations 3 to 5 exceeds the maximum voltage VLC, the voltage supply line X1 shown in FIG. 24 cannot supply the control voltage corresponding to the gradations 3 to 5 to the pixel circuit 21. In the eighth embodiment, for the gradations 3 to 5, the control voltages of the respective halves are outputted and then amplified by the charge pump 31 by a factor of 2. That is, the control voltage (3/5)×VLC of the gradation 3, the control voltage (4/5)×VLC of the gradation 4, and the control voltage VLC of the gradation 5 is outputted, and is amplified by the charge pump 31 provided in each pixel circuit 21 by a factor of 2 and outputted to the liquid crystal 42.

That is, when the control voltage for obtaining the desired gradation is not higher than the maximum voltage VLC (for the gradations 1 and 2), as shown in the graph R1 of FIG. 7A, the control voltage is outputted to the liquid crystal 42 as the driving voltage without amplified.

On the other hand, when the voltage for obtaining the desired gradation exceeds the maximum voltage VLC (for the gradations 3, 4, and 5), as shown in the graph R2 in FIG. 7A, a half of this voltage is supplied as a control voltage to the pixel circuit 21, and then amplified by the charge pump 31 by a factor of 2 to obtain the desired driving voltage. Therefore, the slope of the graph R2 is half the slope of the graph R1.

That is, the charge pump controller 25 outputs the control voltage to the liquid crystal 42 without amplifying when the voltage corresponding to any one of the plurality of gradations is not higher than the maximum voltage (VLC) in a range up to a voltage (double voltage) larger than the maximum voltage (VLC). On the other hand, when the voltage corresponding to any one of the plurality of gradations exceeds the maximum voltage (VLC), the charge pump 31 amplifies the control voltage to output it to the liquid crystal 42.

In this manner, by controlling on/off of each switch SW1 to SWm provided in the switch circuit 27 and controlling driving of the charge pump 31, the pixel circuit 21 can generate a driving signal corresponding to k gradations (five gradations in this example) and supply it to the liquid crystal 42. That is, as shown in the graph R3 of FIG. 35B, it is possible to output the driving voltage of the gradations 1 to 5 obtained by dividing the double voltage (2×VLC) into 5 equal parts to the liquid crystal 42.

As shown in FIG. 24, the vertical scanning circuit 24 is connected to row scanning lines (G1 to Gn). The vertical scanning circuit 24 receives a vertical synchronization signal (VST) and clock signals (VCK1, VCK2) for vertical scanning. The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The charge pump controller 25 outputs control signals to control lines (K1-1, K1-3) for controlling ON/OFF of the first switch S1 and the third switch S3 shown in FIG. 25, and performs control for short-circuiting the input terminal p1 and the output terminal p2 of the charge pump 31. Specifically, when a voltage corresponding to an arbitrary gradation (e.g. gradation 1) among a plurality of gradations (e.g. gradations 1 to 5) is not higher than the maximum voltage (VLC), a control signal for simultaneously turning on the first switch S1 and the third switch S3 is outputted to the first control line K1-1 and the third control line K1-3. When the voltage corresponding to any one of the plurality of gradations (e.g. gradation 3) exceeds the maximum voltage (VLC), the first switch S1 and the third switch S3 are not simultaneously turned on, and a control signal corresponding to the operation of the normal charge pump 31 is outputted. Hereinafter, the operation of the charge pump 31 will be described in detail.

When driving the charge pump 31, the charge pump controller 25 outputs a control signal for controlling on/off of each of the switches S1 to S4 shown in FIG. 25 to the control line K1 (K1-1, K1-2, K1-3, K1-4). Specifically, when the control voltage is supplied from the column data line D1, the first switch S1 and the fourth switch S4 are turned on, and the second switch S2 and the third switch S3 are turned off. Thus, the control voltage supplied from the column data line D1 is stored in the first capacitor C1.

After the lapse of a predetermined time, the first switch S1 and the fourth switch S4 are turned off, and the second switch S2 and the third switch S3 are turned on. As a result, the control voltage supplied from the column data line D1 and the voltage stored in the first capacitor C1 are added, and the added voltage is stored in the output capacitor C2. Therefore, a voltage twice as large as the control voltage supplied from the column data line D1 is accumulated in the output capacitor C2 and is outputted to the pixel electrode q1.

Then, in the phase modulator 101 according to the eighth embodiment, among the (n×m) pixel circuits 21 shown in FIG. 24, a block composed of several pixel circuits is set. For example, in the eighth embodiment as well, as in the first embodiment, as shown in FIG. 6A, a block including (5 rows×6 columns) pixel circuits 21 is set. In FIG. 6A, the same voltage is supplied to each of the 6 pixel circuits 21-11 to 21-16 in the same row. For example, pixel circuits 21-11 to 21-16 are supplied with a control voltage corresponding to gradation 1 of gradations 1 to 5. In the vertical direction, the gradation is gradually increased from the top to the bottom in FIG. 6A, and the control voltage corresponding to the gradation 5 is supplied to the lowermost pixel circuits 21-51 to 21-56.

Specifically, as shown in FIG. 6B, in each of the pixel circuits 21-11 to 21-51 arranged in the vertical direction, the driving voltage supplied to the liquid crystal 42 is set to change stepwise in accordance with the gradations 1 to 5. Therefore, the 6 pixel circuits 21 are made into one group, and the phase can be changed in 5 levels, and thus the reflected light phase-modulated in 5 levels can be obtained.

Description of Operation of Eighth Embodiment

Next, the operation of the phase modulator 101 according to the eighth embodiment will be described with reference to graphs shown in FIGS. 7A and 7B and timing charts shown in FIGS. 26A and 26B. FIG. 7B is a graph showing the relationship between the gradation set to 5 levels and the driving voltage supplied to the liquid crystal 42. In the following, as shown in FIG. 6A, an example in which the pixel circuits 21 arranged in a 6×5 matrix and the reflection pixels corresponding to the pixel circuits 21 are provided will be described.

As shown in FIG. 24, the horizontal scanning circuit 23 controls on/off of the switches SW1 to SWm (where m=6) provided in the switching circuit 27 to supply the control voltage supplied from the voltage supply line X1 to the desired column data line.

Further, by driving the vertical scanning circuit 24, the scanning line corresponding to the desired pixel circuit 21 is selected from the respective scanning lines (G1 to Gn) (where n=5). As a result, a control voltage can be supplied to the desired pixel circuit 21.

For example, a voltage in a range from "0" to a voltage that is twice the maximum voltage "0 to 2×VLC" is divided into 5 gradations (i.e. k=1 to 5), a voltage "(1/5)×2×VLC" of gradation 1 is supplied to the pixel circuits 21-11 to 21-16 in the first row shown in FIG. 6A, and a voltage "(2/5)×2×VLC" of gradation 2 is supplied to the pixel circuits 21-21 to 21-26 in the second row.

Further, a voltage of gradation 3 is supplied to the pixel circuits 21-31 to 21-36 of the third row. In this case, the voltage supplied to the pixel circuit becomes "(3/5)×2×VLC" and exceeds the maximum voltage VLC. Therefore, as shown in FIG. 7A, "(3/5)×VLC", which is the half of the above voltage, is outputted as a control voltage, and this voltage is further amplified by a charge pump 31 by a factor of 2 to generate a voltage of "(3/5)×2×VLC" to obtain a voltage of gradation 3.

Similarly, for the pixel circuits 21-41 to 21-46 in the fourth row and the pixel circuits 21-51 to 21-56 in the fifth row, half of the respective voltages are outputted as control voltages, which are then amplified by a charge pump 31 by a factor of 2 to generate voltages of gradations 4 and 5.

Next, the operation of the pixel circuit 21 will be described with reference to timing charts shown in FIGS. 26A and 26B. As an example, the operation of the charge pump 31 in the pixel circuit 21a connected to the column data line D1 and the row scanning line G1 will be described.

When the pixel circuit 21a is set to gradation 1, the charge pump 31 is not operated. In this case, as shown at times t0 to t1 in FIG. 26A, the charge pump controller 25 simultaneously turns on the first switch S1 and the third switch S3. The second switch S2 and the fourth switch S4 are turned off. As a result, since the input terminal p1 and the output terminal p2 of the charge pump 31 are short-circuited via the first switch S1 and the third switch S3, the control voltage supplied from the column data line D1 is outputted to the liquid crystal 42 without amplified by the charge pump 31. Therefore, as shown by reference sign z1 in FIG. 7B, a voltage of "(1/5)×2×VLC" can be supplied to the liquid crystal.

When the pixel circuit 21a is set to gradation 2, similarly, the charge pump 31 is not operated, and the control voltage supplied from the column data line D1 is outputted without amplified, as shown by reference sign z2 in FIG. 7B. As a result, a voltage of "(2/5)×2×VLC" can be applied to the liquid crystal.

When the pixel circuit 21 is set to gradation 3, a half voltage "(2/5)×VLC" of a voltage "(2/5)×2×VLC" corresponding to gradation 3 is outputted to the column data line D1 as a control voltage. Further, the control voltage is amplified by a charge pump 31 by a factor of 2.

Figure 26A:
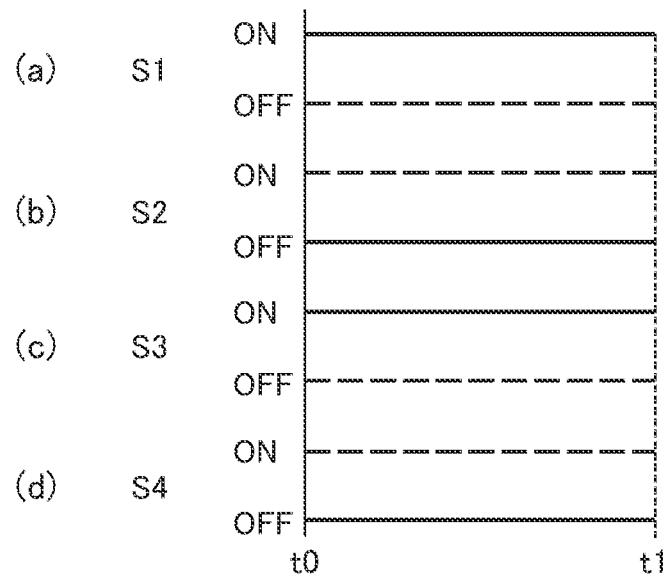
FIG. 26A is a timing chart showing ON/OFF states of switches S1 to S4 when the control voltage is not amplified by the charge pump in the phase modulator according to the eighth embodiment.

Specifically, when the pixel circuit 21a is set to gradations 1 and 2, as shown in the charts (a) to (d) of FIG. 26A, control is performed so that the first switch S1 is turned on, the second switch S2 is turned off, the third switch S3 is turned on, and the fourth switch S4 is turned off during a period from time t0 to time t1.

Figure 26B:
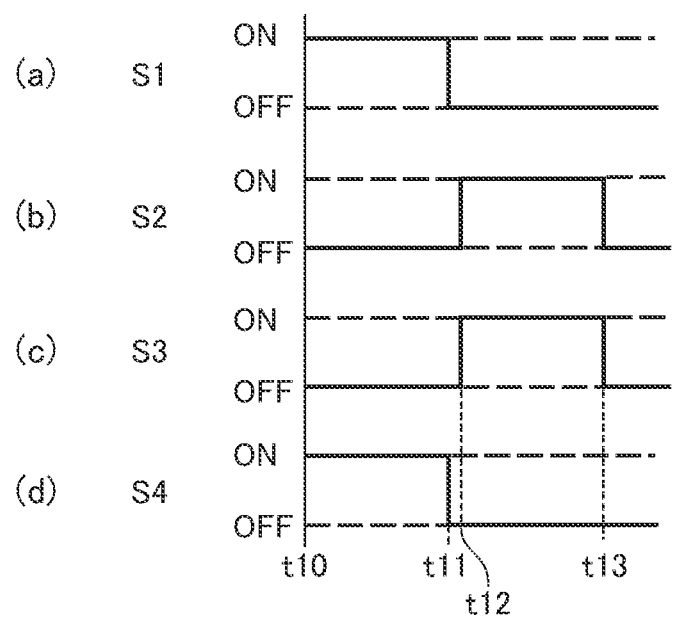
FIG. 26B is a timing chart showing ON/OFF states of the switches S1 to S4 when the control voltage is amplified by a charge pump in the phase modulator according to the eighth embodiment.

On the other hand, when the pixel circuit 21a is set to the gradations 3 to 5, as shown in the charts (a) and (d) of FIG. 26B, the first switch S1 and the fourth switch S4 are turned on and the second switch S2 and the third switch S3 are turned off during the period from time t10 to time t11. As a result, the control voltage "(3/5)×VLC" is accumulated in the first capacitor C1.

Thereafter, during a period from time t12 to time t13, the second switch S2 and the third switch S3 are turned on, and the first switch S1 and the fourth switch S4 are turned off. As a result, the output capacitor C2 accumulates a voltage that is twice the control voltage "(3/5)×2×VLC". Therefore, as shown by reference sign z3 in FIG. 7B, the driving voltage of the gradation 3 "(3/5)×2×VLC" can be supplied to the liquid crystal 42.

When the pixel circuit 21a is set to gradation 4, the charge pump 31 is similarly operated to supply a driving voltage of "(4/5)×2×VLC" to the liquid crystal as shown by reference sign z4 in FIG. 7B.

Furthermore, in the case where the pixel circuit 21a is set to the gradation 5, by similarly operating the charge pump 31, as shown by reference sign z5 in FIG. 7B, the driving voltage of "2×VLC" can be supplied to the liquid crystal.

Explanation of Effects of Eighth Embodiment

In the phase modulator 101 according to the eighth embodiment, each pixel circuit 21 includes a charge pump 31. When any one of a plurality of gradations set in advance in a range from "0" to a voltage twice the maximum voltage (2×VLC) is set, and the voltage corresponding to the arbitrary gradation is not more than the maximum voltage (VLC), the control voltage supplied from the column data line to the pixel circuit 21 is outputted to the liquid crystal 42 without amplification.

When the voltage corresponding to any one of the plurality of gradations exceeds the maximum voltage (VLC), the charge pump 31 amplifies the control voltage and outputs the amplified control voltage to the liquid crystal 42.

Therefore, when the maximum control voltage supplied from the column data line to the pixel circuit 21 is the maximum voltage (VLC), the driving voltage for driving the liquid crystal 42 can be set within a range of a voltage that is twice the maximum (2×VLC). Therefore, the refractive index of the liquid crystal 42 can be varied in a wider range, and an increase in the thickness of the liquid crystal layer 12 can be suppressed and the accuracy of phase modulation can be improved.

The control voltage supplied from the column data line is supplied to the liquid crystal 42 by simultaneously turning on the first switch S1 and the third switch S3 provided in the charge pump 31. Therefore, it is not necessary to separately provide wiring for connecting the column data line and the pixel electrode q1, and the circuit configuration can be simplified.

Further, since gradation can be set in a wide voltage range without increasing the maximum voltage VLC of the control voltage supplied to the pixel circuit 21, it is not necessary to increase the breakdown voltage of each component constituting the control circuit 22, and the device can be miniaturized and lightened.

Further, since the voltage range for setting the driving voltage of the liquid crystal 42 is set to a voltage which is twice the maximum voltage VLC, a desired driving voltage can be obtained by a simple process of amplifying the control voltage by twice, thereby simplifying the circuit configuration.

In the eighth embodiment, the refractive index of the liquid crystal 42 is set to change in one of the column direction and the row direction shown in FIG. 24, which are perpendicular to each other, and a driving line (i.e. control lines K1-1, K1-3) for switching the charge pump on and off is arranged in the other direction. Therefore, it is possible to prevent the alignment of the liquid crystal from being disturbed due to the change in the refractive index.

In the eighth embodiment, the range of the driving voltage is set to a voltage that is twice the maximum voltage (2×VLC), but the range is not limited to this, and the range may be larger than the maximum voltage VLC.

Description of Ninth Embodiment

The basic configuration of a phase modulator according to a ninth embodiment is the same as the basic configuration of the embodiments shown in FIGS. 1 and 2 described in the first embodiment, and therefore the description thereof is omitted. In the phase modulator 101 according to the ninth embodiment, the configuration of each pixel circuit 21 and a control circuit 22 for controlling each pixel circuit 21 will be described with reference to the block diagram shown in FIG. 27 and the circuit diagram shown in FIG. 28. In FIG. 27, the control circuit 22 includes a plurality of (m columns, n rows) pixel circuits 21 arranged in a matrix, a horizontal scanning circuit 23, a vertical scanning circuit 24, and a charge pump controller 25. Then, the control circuit 22 outputs an electric signal to each pixel circuit 21 to drive each pixel circuit 21, and a driving voltage is applied from each pixel circuit 21. The refractive index of each liquid crystal 42 on each reflection pixel to the incident light is controlled to be a desired value.

A plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), driving lines (L1 to Ln) and control lines (K1 to Kn) are provided. The driving lines (L1 to Ln) and the control lines (K1 to Kn) are connected to the charge pump controller 25.

Figure 28:
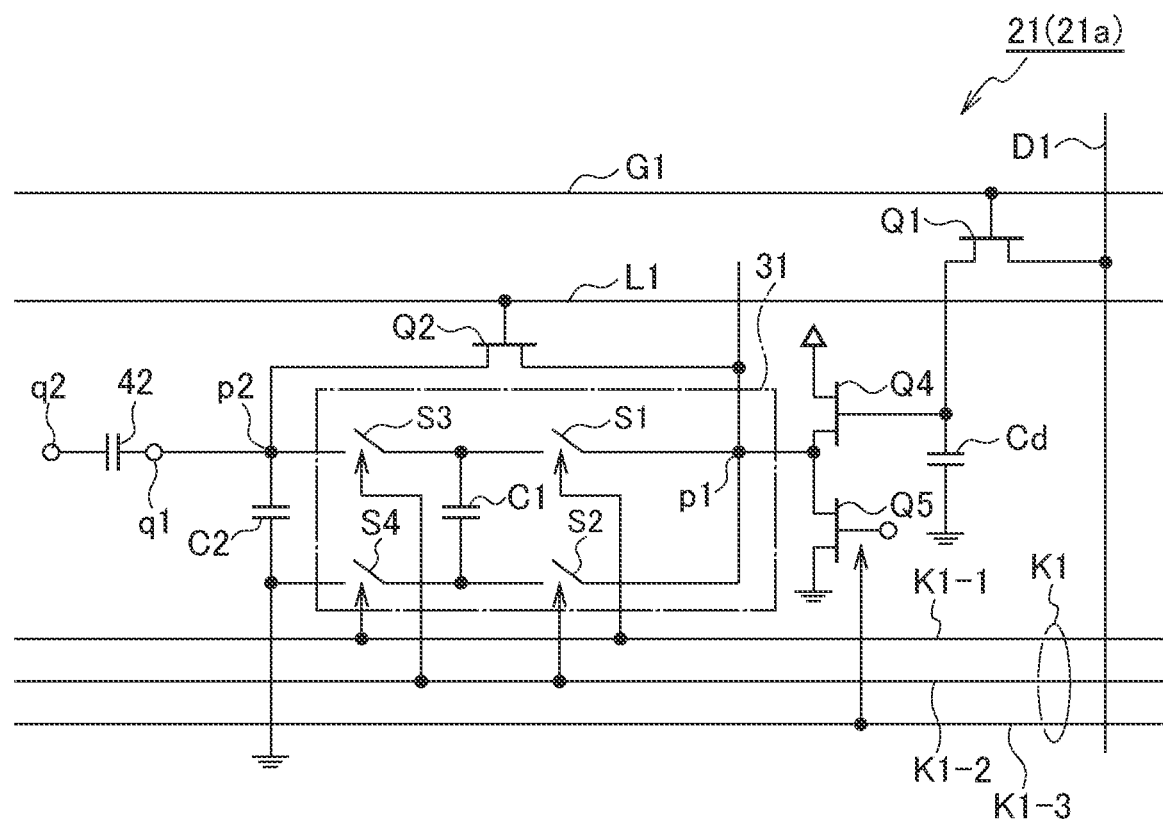
FIG. 28 is a circuit diagram showing a configuration of each pixel circuit provided in the phase modulator according to the ninth embodiment.

As described later, the driving lines (L1 to Ln) are wires for transmitting control signals for switching on/off each second transistor Q2 (short circuit switch; see FIG. 28) provided in each pixel circuit 21. The control lines (K1 to Kn) are lines for transmitting control signals for switching on/off the switches S1 to S4 (see FIG. 4) provided in each pixel circuit 21. As shown in FIG. 28, each of the plurality of control lines (K1 to Kn) includes a plurality of lines (in FIG. 28, three lines K1-1, K1-2, and K1-3), but in FIG. 3, only one control line K1 is used.

The column data lines (D1 to Dm) are lines for supplying a ramp waveform voltage (ramp shaped reference voltage) outputted from the voltage supply line X1 to each pixel circuit 21.

FIG. 28 is a circuit diagram showing a detailed configuration of the pixel circuit 21. Here, the configuration of the pixel circuit 21 (i.e. referred to as a pixel circuit 21a) disposed at the intersection of the column data line D1 and the row scanning line G1 shown in FIG. 27 will be described. As shown in FIG. 28, the pixel circuit 21a includes a capacitor Cd for storing a control voltage supplied from the column data line D1, and a series connection circuit of a source follower Q4 and a load transistor Q5. The pixel circuit 21a further includes a first transistor Q1, a second transistor Q2, a charge pump 31, and an output capacitor C2.

The capacitor Cd accumulates the control voltage supplied from the column data line D1 and outputs it to the gate of the source follower Q4. The output of the source follower Q4 is connected to the input terminal p1 of the charge pump 31.

The first transistor Q1 is a switching transistor, and is composed of, for example, an N-channel MOSFET (field effect transistor). A first terminal (e.g. drain) of the first transistor Q1 is connected to the column data line D1, and a second terminal (e.g. source) is connected to the input terminal p1 of the charge pump 31. A control terminal (e.g. gate) of the first transistor Q1 is connected to the row scanning line G1. Therefore, when the row scanning line G1 is selected and the control voltage is input from the column data line D1, this control voltage is supplied to the input terminal p1 of the charge pump 31.

The second transistor Q2 is a switching transistor in the same manner as the first transistor Q1 described above, and is formed of, for example, an N-channel MOSFET (field effect transistor). The second transistor Q2 has a first terminal (e.g. drain) connected to the input terminal p1 of the charge pump 31, and a second terminal (e.g. the source) connected to the output terminal p2 of the charge pump 31.

The control terminal (e.g. gate) of the second transistor Q2 is connected to the driving line L1. Therefore, when a voltage of "H" level is supplied to the driving line L1, the second transistor Q2 is turned on, the input terminal p1 and the output terminal p2 of the charge pump 31 are short-circuited, and the function of the charge pump 31 can be stopped. On the contrary, when a voltage of "L" level is supplied to the driving line L1, the second transistor Q2 is turned off, the input terminal p1 and the output terminal p2 of the charge pump 31 are opened, and the charge pump 31 can be operated.

That is, the second transistor Q2 has a function as a short circuit switch for short-circuiting the input terminal p1 to which the control voltage is supplied to the charge pump 31 and the output terminal p2 to output the voltage (driving voltage) from the charge pump 31 to the liquid crystal 42.

When the driving voltage for setting the liquid crystal 42 to a desired refractive index is not higher than the maximum voltage VLC, which is the maximum value of the voltage supplied from the column data line D1, the charge pump controller 25 (see FIG. 27) controls to short-circuit the second transistor Q2. When the driving voltage exceeds the maximum voltage VLC, the second transistor Q2 is opened to drive the charge pump 31.

The charge pump 31 includes 4 switches S1 to S4 and a first capacitor C1 for accumulating charge, and amplifies the control voltage supplied to the input terminal p1, that is, the control voltage obtained from the ramp waveform voltage and supplied via the source follower Q4, and outputs the amplified control voltage to the output terminal p2. In the charge pump 31, the first switch S1 and the third switch S3 are connected in series with each other, the end of the first switch S1 side is connected to the input terminal p1, and the end of the third switch S3 side is connected to the output terminal p2. The second switch S2 and the fourth switch S4 are connected in series with each other, and the end of the second switch S2 side is connected to the input terminal p1, and the end of the fourth switch S4 side is connected to the ground.

A first capacitor C1 is provided between a connection point of the first switch S1 and the third switch S3 and a connection point of the second switch S2 and the fourth switch S4. The output terminal p2 is connected to the ground via the output capacitor C2, and further connected to the pixel electrode q1 of the liquid crystal 42. That is, one end of the first capacitor C1 is connected to the first switch S1 and the third switch S3, and the other end of the first capacitor C1 is connected to the second switch S2 and the fourth switch S4. As described above, the common electrode q2 of the liquid crystal 42 is a transparent electrode provided on a transparent glass. A common electrode voltage is applied to the transparent electrode.

The liquid crystal 42 is driven according to a potential difference between a driving voltage applied from the pixel circuit 21 to the pixel electrode q1 and a common electrode applied to the common electrode q2. Therefore, the incident light incident into the liquid crystal 42 is phase-modulated according to the potential difference and reflected.

In the ninth embodiment as well, the relationship between the angle of the incident light incident into the reflection pixel 20 corresponding to the pixel circuit 21 provided on the reflection substrate 11 and the angle of the reflected light reflected by the reflection pixel 20 is the same as that described in the first embodiment with reference to FIG. 5, and therefore the description thereof is omitted.

As shown in FIG. 27, the horizontal scanning circuit 23 provided in the control circuit 22 includes a shift register circuit 26, a comparator circuit 28, a counter circuit 29, and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronizing signal and the clock signal for horizontal scanning to generate, for example, a p-bit digital signal to be output to the comparator circuit 28 in a period of 1 horizontal scanning period.

The shift register circuit 26 inputs digital signals up to $2^p$ (where $2^p$ is the power of 2 to the power of q) which are p-bit digital signals, latches digital signals corresponding to the respective pixel circuits 21, and outputs the latched digital signals to a comparator circuit 28. For example, in the case of supplying a driving voltage corresponding to 5 gradations from gradation 1 to gradation 5 to the liquid crystal 42 for control, respective digital signals of $(1/5) \times 2^p$, $(2/5) \times 2^p$, $(3/5) \times 2^p$, $(4/5) \times 2^p$ and $2^p$ are latched and outputted to a comparator circuit 28.

That is, the shift register circuit 26 has a function of outputting a plurality of preset digital signals in a range of digital signals that change in response to voltages in a range up to a predetermined maximum voltage (VLC).

The counter circuit 29 counts the above-described q-bit digital signal within 1 horizontal scanning period and outputs a count value. That is, the counter circuit 29 has a function of counting up to a maximum value of a predetermined digital gradation and outputting a count value.

The switch circuit 27 includes m number of switches SW1 to SWm for switching on/off of the column data lines (D1 to Dm). Each of the switches SW1 to SWm is controlled to an ON state or an OFF state based on a switching control signal outputted from the comparator circuit 28. When each switch SW1 to SWm is turned on, the voltage value of the ramp waveform voltage at that timing is supplied as a control voltage (See below for details) to each column data line (D1 to Dm).

The comparator circuit 28 is provided with a comparison circuit (D1 to Dm) for each column data line (not shown), and performs control for supplying a control voltage to each column data line (D1 to Dm). That is, for each of the switches SW1 to SWm provided in the switch circuit 27, a comparison circuit is provided for generating a switching control signal for switching the ON state and the OFF state of each of the switches SW1 to SWm. The digital signal corresponding to any one of the gradations (gradations 1 to 5) supplied from the shift register circuit 26 and the count value outputted from the counter circuit 29 are input to each comparison circuit. When both inputs coincide, a switching control signal is outputted.

That is, the comparator circuit 28 has a function of comparing the grayscale value corresponding to each pixel circuit 21 with the count value outputted from the counter circuit 29, and outputting a switching control signal when the comparison results in agreement.

Therefore, in the case of controlling the liquid crystal 42 to 5 gradations from gradation 1 to gradation 5, for example, when the respective digital signals of $(1/5) \times 2^q$, $(2/5) \times 2^q$, $(3/5) \times 2^q$, $(4/5) \times 2^q$, and $2^q$ are supplied to 5 comparison circuits or 5 grouped comparison circuits, respectively, the switching control signals are outputted from the respective comparison circuits when the count values outputted from the counter circuit 29 coincide with the digital signals.

That is, the comparator circuit 28 has a function of acquiring a ramp waveform voltage corresponding to a change in the count value of the counter circuit 29, and supplying the ramp waveform voltage as a control voltage to the column data line when the digital signal outputted from the shift register circuit 26 matches the count value outputted from the counter circuit 29.

Figure 29:
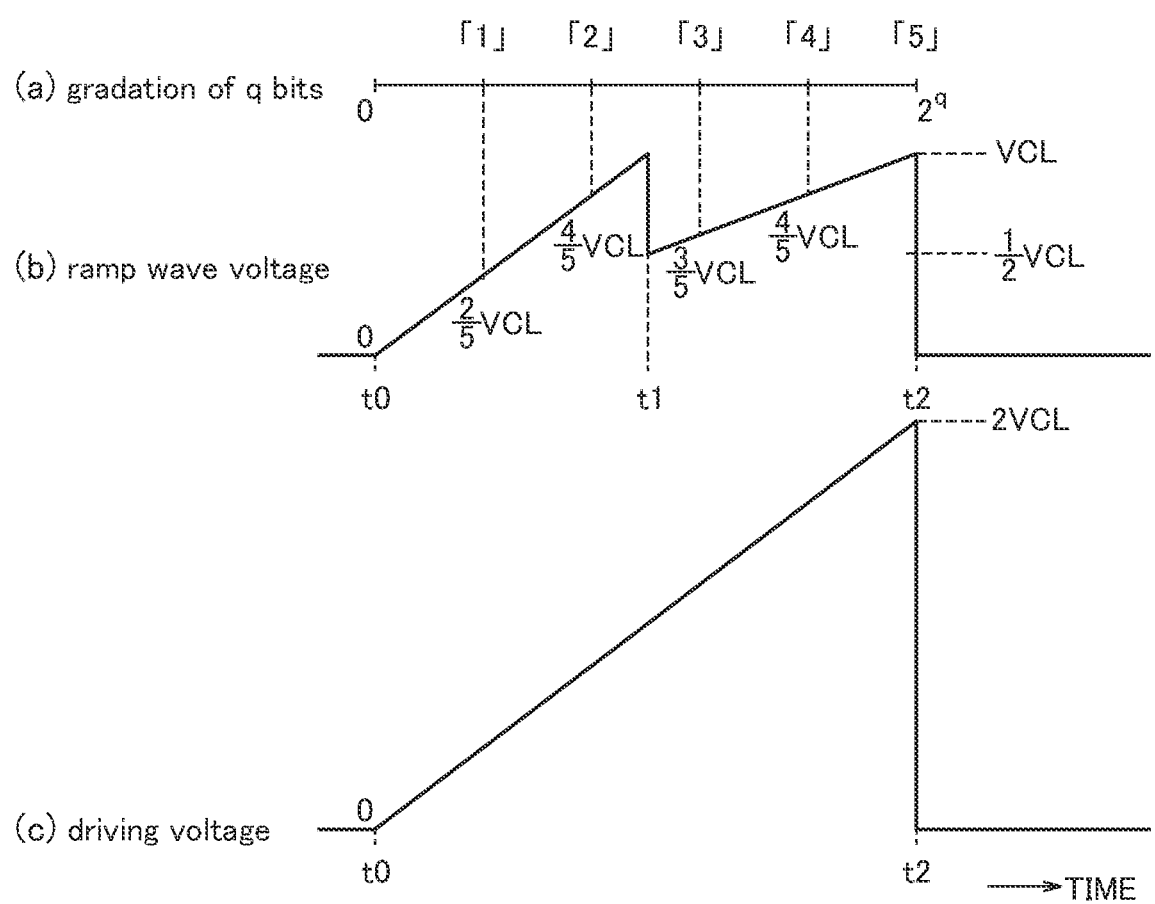
FIG. 29 is a graph showing a relationship between a gradation to be set in the liquid crystal layer, the ramp waveform voltage, and the driving voltage to be supplied to the liquid crystal layer in the phase modulator according to the ninth embodiment.

The ramp waveform voltage will be described below with reference to FIG. 29. A scale (a) of FIG. 29 shows gradation (gradations 1 to 5) corresponding to a digital signal of 0 to $2^q$. A graph (b) in FIG. 29 shows a ramp waveform voltage outputted in 1 horizontal scanning period in which a digital signal of 0 to $2^q$ is outputted. A graph (c) in FIG. 29 shows a driving voltage to be output to the liquid crystal 42 corresponding to each gradation.

The ramp waveform voltage is an analog voltage having 2 ramp waveforms in a cycle (1 horizontal scan period) of outputting a q-bit digital signal by the shift register circuit 26. Specifically, as shown in a scale (a) and a graph (b) of FIG. 29, in a period of time t0 to t2 (1 horizontal scan period), in a period of time t0 to t1 which is a half period (first half), the voltage monotonically increases from the minimum voltage "0" to the maximum voltage "VLC", and then, in a period of time t1 to t2 which is a half period (second half), the voltage monotonically increases from the intermediate voltage "VLC/2" to the maximum voltage "VLC".

In the ninth embodiment, a double voltage (2×VLC), which is a voltage twice the maximum voltage VLC of the ramp waveform voltage, is set, and further, a voltage of k gradations (where k is an integer equal to or greater than 3) is set within a range of a voltage "0" to a double voltage "2×VLC" (for FIG. 29, k=5). By switching between driving and stopping of the charge pump 31, control is performed so that the ramp waveform voltage (voltage in the range of 0 to VLC) supplied from the column data line becomes the above-described voltage of k gradation (voltage in the range of 0 to 2×VLC).

For example, when a voltage of gradation 1 is supplied to the liquid crystal 42 shown in FIG. 28, a voltage (2/5)×VLC is outputted. When the voltage of gradation 2 is supplied, the voltage (4/5)×VLC is outputted.

Further, when the voltage of the gradation 3 is supplied, it is necessary to output the voltage (6/5)×VLC. However, since it exceeds the maximum voltage "VLC", a half voltage (3/5)×VLC is input as a control voltage, amplified by a charge pump 31 by a factor of 2, and supplied to the liquid crystal 42. For the voltage "8/5×VLC" and voltage "2×VLC" of gradation 4, similarly, a half voltage (4/5)×

VLC and a half voltage VLC are inputted as control voltages, amplified by a charge pump 31 by a factor of 2, and supplied to a liquid crystal 42. Therefore, the slope of the graph (b) in FIG. 29 between times t1 and t2 is half the slope of the graph between times t0 and t1.

As a result, as shown in the graph (c) of FIG. 29, a driving voltage corresponding to the gradations 1 to 5 can be generated and supplied to the liquid crystal 42.

That is, when the driving voltage supplied to the liquid crystal 42 to obtain a desired gradation is not higher than the maximum voltage VLC, which is the maximum value of the ramp waveform voltage (in the above example, in the case of gradations 1 and 2), the control voltage is outputted to the liquid crystal 42 as the driving voltage without amplified, as shown in time t0 to t1 in the graph (b) of FIG. 29. On the other hand, when the driving voltage is larger than the maximum voltage VLC (in the above example, in the case of gradations 3, 4, and 5), as shown in time t1 to t2 in the graph (b) of FIG. 29, the control voltage which is half of the driving voltage is amplified by a factor of 2 to generate a desired driving voltage.

That is, the charge pump controller 25 outputs the control voltage to the liquid crystal without amplifying when the voltage corresponding to any one of the plurality of gradations is not higher than the maximum voltage (VLC). On the other hand, when the voltage corresponding to any one of the plurality of gradations exceeds the maximum voltage (VLC), the charge pump 31 controls so as to amplify the control voltage and output it to the liquid crystal 42.

In this manner, by controlling on/off of each switch SW1 to SWm provided in the switch circuit 27 and controlling driving of the charge pump 31, the pixel circuit 21 can generate a driving signal corresponding to k gradations (five gradations in this example) and supply it to the liquid crystal 42. That is, as shown in the graph (c) of FIG. 29, it is possible to output the driving voltages of the gradations 1 to 5 obtained by dividing the voltage (2×VLC) which is twice the maximum voltage VLC into 5 equal parts to the liquid crystal 42.

As shown in FIG. 27, the vertical scanning circuit 24 is connected to row scanning lines (G1 to Gn). The vertical scanning circuit 24 receives a vertical synchronization signal (VST) and clock signals (VCK1, VCK2) for vertical scanning. The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The charge pump controller 25 outputs a drive signal to each driving line (L1 to Ln) shown in FIG. 3. Specifically, when the voltage corresponding to any one of a plurality of gradations is not higher than the maximum voltage (VLC), an "H" level signal is outputted to the driving line. As a result, the second transistor Q2 is turned on.

When the voltage corresponding to any one of the plurality of gradations exceeds the maximum voltage (VLC), an "L" level signal is outputted to the driving line. As a result, the second transistor Q2 shown in FIG. 28 is turned off.

Further, the charge pump controller 25 performs control so as not to drive the charge pump 31 when a signal of "H" level is supplied to the driving line, but to drive the charge pump 31 when a signal of "L" level is supplied to the driving line.

Next, the operation of the charge pump 31 will be described. When driving the charge pump 31, the charge pump controller 25 outputs a control signal for controlling on/off of each of the switches S1 to S4 shown in FIG. 28 to the control line K1 (K1-1, K1-2). Specifically, when the charge pump 31 is driven and a control voltage is input from the column data line D1, the first switch S1 and the fourth switch S4 are turned on and the second switch S2 and the third switch S3 are turned off.

Therefore, the control voltage is accumulated in the first capacitor C1. After the lapse of a predetermined time, the first switch S1 and the fourth switch S4 are turned off, and the second switch S2 and the third switch S3 are turned on. As a result, the control voltage supplied from the column data line D1 and the voltage stored in the first capacitor C1 are added, and the added voltage is stored in the output capacitor C2. Therefore, a voltage twice as large as the control voltage supplied from the column data line D1 is accumulated in the output capacitor C2 and is outputted to the pixel electrode q1.

Then, in the phase modulator 101 according to the ninth embodiment, among the (n×m) pixel circuits 21 shown in FIG. 27, a block including some pixel circuits is set. For example, in the ninth embodiment as well, as in the first embodiment, as shown in FIG. 6A, a block including (5 rows×6 columns) pixel circuits 21 is set.

In FIG. 6A, the same voltage is supplied to each of the 6 pixel circuits 21-11 to 21-16 in the same row. For example, pixel circuits 21-11 to 21-16 are supplied with a control voltage corresponding to gradation 1 of gradations 1 to 5. In the vertical direction, the gradation is gradually increased from the top to the bottom in FIG. 6A, and the control voltage corresponding to the gradation 5 is supplied to the lowermost pixel circuits 21-51 to 21-56.

Specifically, as shown in FIG. 6B, in each of the pixel circuits 21-11 to 21-51 arranged in the vertical direction, the driving voltage supplied to the liquid crystal 42 is set to change stepwise in accordance with the gradations 1 to 5. Therefore, the 6 pixel circuits 21 are made into one group, and the phase can be changed in 5 levels, and thus the reflected light phase-modulated in 5 levels can be obtained.

Description of Operation of Ninth Embodiment

The operation of the phase modulator 101 according to the ninth embodiment will be described. Here, as shown in FIG. 6A, an example of setting the refractive index of the liquid crystal by controlling the pixel circuits 21 arranged in a 6×5 matrix will be described.

The comparator circuit 27 shown in FIG. 28 controls on/off of each of the switches SW1 to SWm (where m=6) provided in the switch circuit 27 to extract a desired voltage from the ramp waveform voltage supplied from the voltage supply line X1 and supply it as a control voltage to a desired column data line.

Further, by driving the vertical scanning circuit 24, the scanning line corresponding to the desired pixel circuit 21 is selected from the respective scanning lines (G1 to Gn) (where n=5). As a result, a control voltage can be supplied to the desired pixel circuit 21.

For example, the comparator circuit 28 sets the q-bit digital signal (0 to $2^q$) outputted from the shift register circuit 26 to 5-level gradation (gradations 1 to 5). When a digital signal corresponding to each gradation level 1 to 5 is outputted from the shift register circuit 26, a switching control signal is outputted to a desired switch in the switch circuit 27 when the count value outputted from the counter circuit 29 coincides with the digital signal. Therefore, the ramp waveform voltage at this point of time can be supplied to the pixel circuit 21 as a control voltage.

For example, as shown in FIG. 29, when a digital signal corresponding to gradation 1 is outputted, the ramp waveform voltage is (2/5)×VLC, and when a digital signal corresponding to gradation 2 is outputted, the ramp waveform voltage is (4/5)×VLC. When the digital signal corresponding to the gradation 3 is outputted, the ramp waveform voltage is (3/5)×VLC, when the digital signal corresponding to the gradation 4 is outputted, the ramp waveform voltage is (4/5)×VLC, and when the digital signal corresponding to the gradation 5 is outputted, the ramp waveform voltage is VLC. The voltage corresponding to each ramp waveform voltage is supplied to the pixel circuit 21 as a control voltage.

In this case, as described above, when the digital signal is equal to or less than half of the value of $2^q$ (for times t0 to t1 in FIG. 29), the control voltage is not amplified, and when the digital signal is equal to or more than half of the value (for times t1 to t2), the control voltage is amplified by the charge pump 31 to be a driving voltage to be output to the liquid crystal 42.

The control voltage supplied from the column data line is stored in the capacitor Cd via the first transistor Q1 shown in FIG. 28, and is further supplied via the source follower Q4 to the input terminal p1 of the charge pump 31.

Figure 30A:
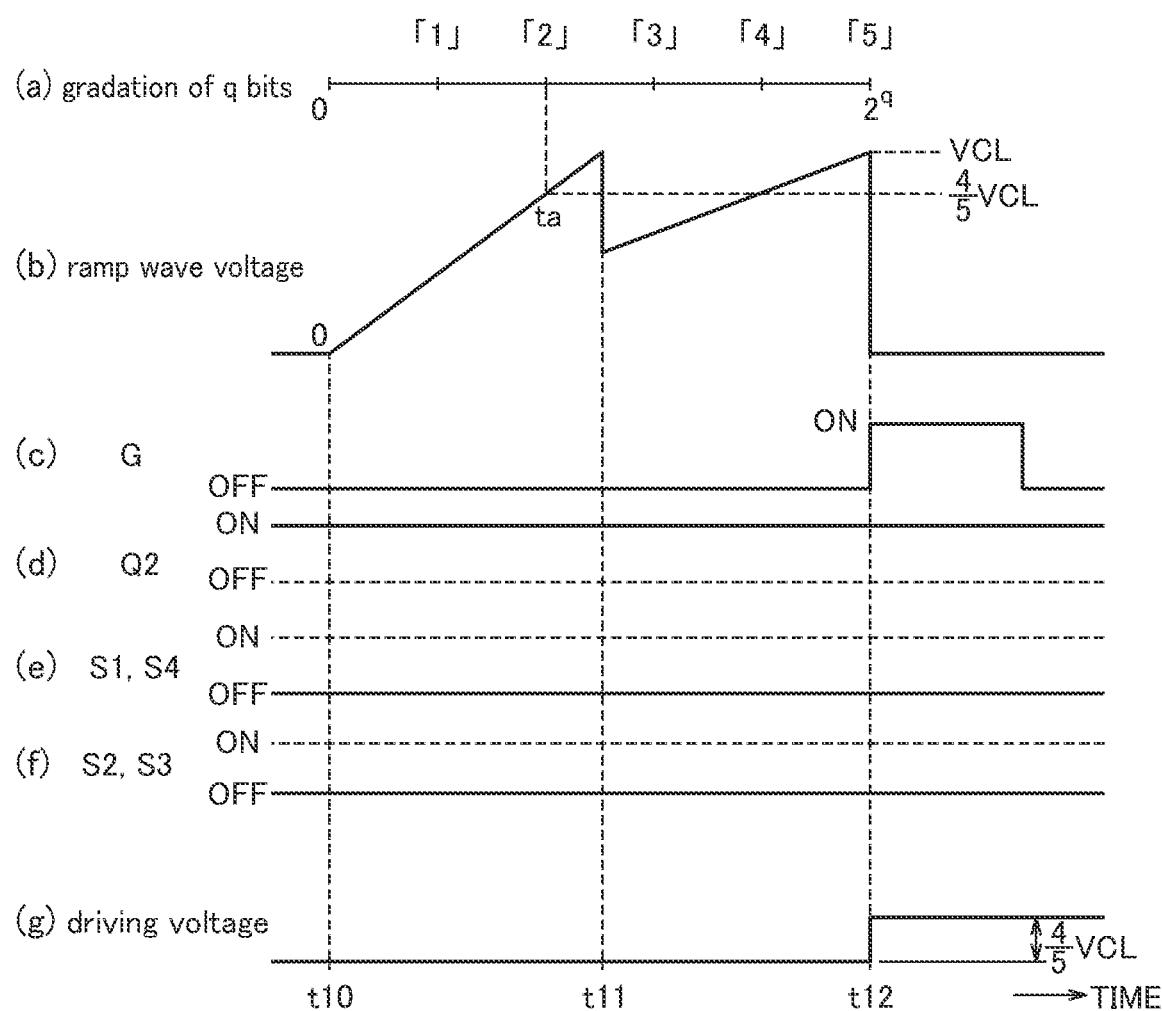
FIG. 30A is a graph showing a relationship between a gradation to be set in the liquid crystal layer, the control voltage to be supplied to the pixel circuit, and the driving voltage to be supplied to the liquid crystal layer in the phase modulator according to the ninth embodiment.
Figure 30B:
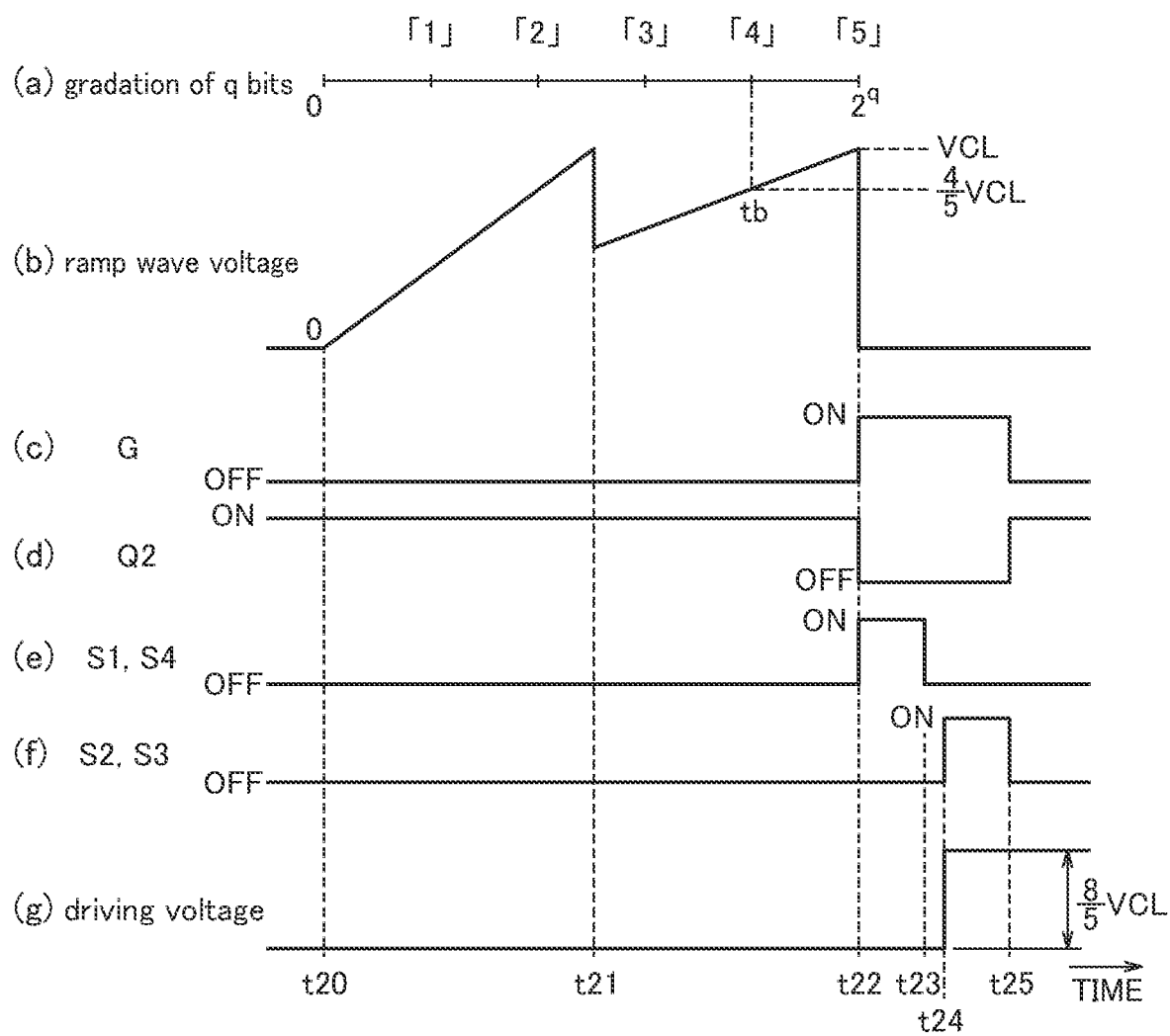
FIG. 30B is a graph showing a relationship between a gradation set in the liquid crystal layer, the control voltage supplied to the pixel circuit, and the driving voltage supplied to the liquid crystal layer in the phase modulator according to the ninth embodiment.

Referring to the timing charts shown in FIGS. 30A and 30B, the operation of the charge pump 31 will be described below. FIG. 30A is a timing chart showing changes in each signal when a driving voltage of gradation 2 is outputted to the liquid crystal 42 as an example. FIG. 30B is a timing chart showing changes in each signal when the driving voltage of the gradation 4 is outputted.

As shown by the scale (a) of FIG. 30A, the shift register circuit 26 (see FIG. 27) outputs a q-bit digital signal $2^q$. At this time, the p-bit digital signal is divided into 5 equal parts, and gradations 1 to 5 (from "1" to "5" in FIG. 30A) is assigned to each digital signal.

When the count value outputted from the counter circuit 29 coincides with the digital signal, a switching control signal is outputted from the comparator circuit 28 to a desired switch among a plurality of switches SW1 to SWm provided in the switch circuit 27, the switch is turned on, and a ramp waveform voltage is supplied to the column data line as a control voltage. As described above, as shown in the graph (b) of FIG. 30A, 2 waveforms (two serrated waveforms) of the ramp waveform voltage are outputted within 1 horizontal scanning period.

When the liquid crystal 42 is set to gradation 2, a ramp waveform voltage of (4/5)×VLC is supplied as a control voltage to the column data line at a time to at which a digital signal corresponding to gradation 2 is outputted. This control voltage is stored in the capacitor Cd and held until time t12.

As shown in the graph (d) of FIG. 30A, the second transistor Q2 continues to be in the ON state even after the time t12, and as shown in the graphs (e) and (f), all the switches S1 to S4 continue to be in the OFF state even after the time t12. Therefore, the charge pump 31 is not driven, and the ramp waveform voltage supplied to the pixel circuit 21 is not amplified. As shown in the graph (c) of FIG. 30A, since the row selection signal G in the vertical scanning circuit 24 is turned on at time t12, as shown in the graph (g), the control voltage (4/5)×VLC supplied from the column data line is outputted to the liquid crystal 42. Therefore, the second gradation driving voltage (4/5)×VLC can be supplied to the liquid crystal 42.

In the case of gradation 1, similarly to the above, the driving voltage (2/5)×VLC of gradation 1 can be supplied to the liquid crystal 42.

On the other hand, when the liquid crystal 42 is set to gradation 4, as shown in the scale (a) of FIG. 30B, at time tb at which the digital signal corresponding to gradation 4 is outputted, a ramp waveform voltage of (4/5)×VLC is supplied to the column data line as a control voltage. This control voltage is stored in the capacitor Cd and held until time t22.

As shown in the graph (d) of FIG. 30B, the second transistor Q2 turns off at time t22. Further, as shown in the graph (e), during the period from time t22 to time t23, the first switch S1 and the fourth switch S4 are turned on, and the voltage (4/5)×VLC is held in the first capacitor C1. Thereafter, as shown in the graph (f), at time t24, since the second switch S2 and the third switch S3 are turned on, as shown in the graph (g), the output capacitor C2 shown in FIG. 28 is provided with the voltage (8/5)×VLC multiplied the voltage (4/5)×VLC by 2. Therefore, the voltage of the gradation 4 can be supplied to the liquid crystal 42.

In the case of the gradations 3 and 5, similarly to the above, the driving voltage (6/5)×VLC of the gradation 3 and the driving voltage 2×VLC of the gradation 5 can be supplied to the liquid crystal 42.

As described above, by controlling the driving voltage supplied from each pixel circuit 21 to the liquid crystal 42, each liquid crystal 42 can be set to a desired gradation, and the refractive index of the liquid crystal 42 connected to each pixel circuit 21 can be set to a desired refractive index.

Explanation of Effects of Ninth Embodiment

In the phase modulator 101 according to the ninth embodiment, each pixel circuit 21 includes a charge pump 31. When the liquid crystal 42 is set to any one of a plurality of gradations set in advance in a range from "0" to a voltage (2×VLC) that is twice the maximum voltage, and the voltage corresponding to this arbitrary gradation is not more than the maximum voltage (VLC), the control voltage (voltage obtained from the ramp waveform voltage) supplied from the column data line to the pixel circuit 21 is outputted to the liquid crystal 42 without amplified.

When the voltage corresponding to any one of the plurality of gradations exceeds the maximum voltage (VLC), the control voltage supplied from the column data line to the pixel circuit 21 is amplified by the charge pump 31 and outputted to the liquid crystal 42.

Therefore, when the maximum control voltage supplied from the column data line to the pixel circuit 21 is the maximum voltage (VLC), the driving voltage for driving the liquid crystal 42 can be set within a range of a voltage (2×VLC) that is twice the maximum. Therefore, the refractive index of the liquid crystal 42 can be varied in a wider range, and an increase in the thickness of the liquid crystal layer 12 can be suppressed and the accuracy of phase modulation can be improved.

Further, since the gradation can be set in a wide voltage range without increasing the control voltage VLC supplied to the pixel circuit 21, it is not necessary to increase the breakdown voltage of each component constituting the control circuit 22, and the device can be miniaturized and lightened.

Further, since the voltage in the range of the voltage for setting the driving voltage of the liquid crystal 42 is set to a voltage which is twice the predetermined maximum voltage (VLC), a desired driving voltage can be obtained by a simple process of amplifying the control voltage twice, and the circuit configuration can be simplified.

In the ninth embodiment, the voltage range for setting the driving voltage of the liquid crystal 42 is set to a voltage which is twice the predetermined maximum voltage (VLC).

Description of First Modification of Ninth Embodiment

Figure 31:
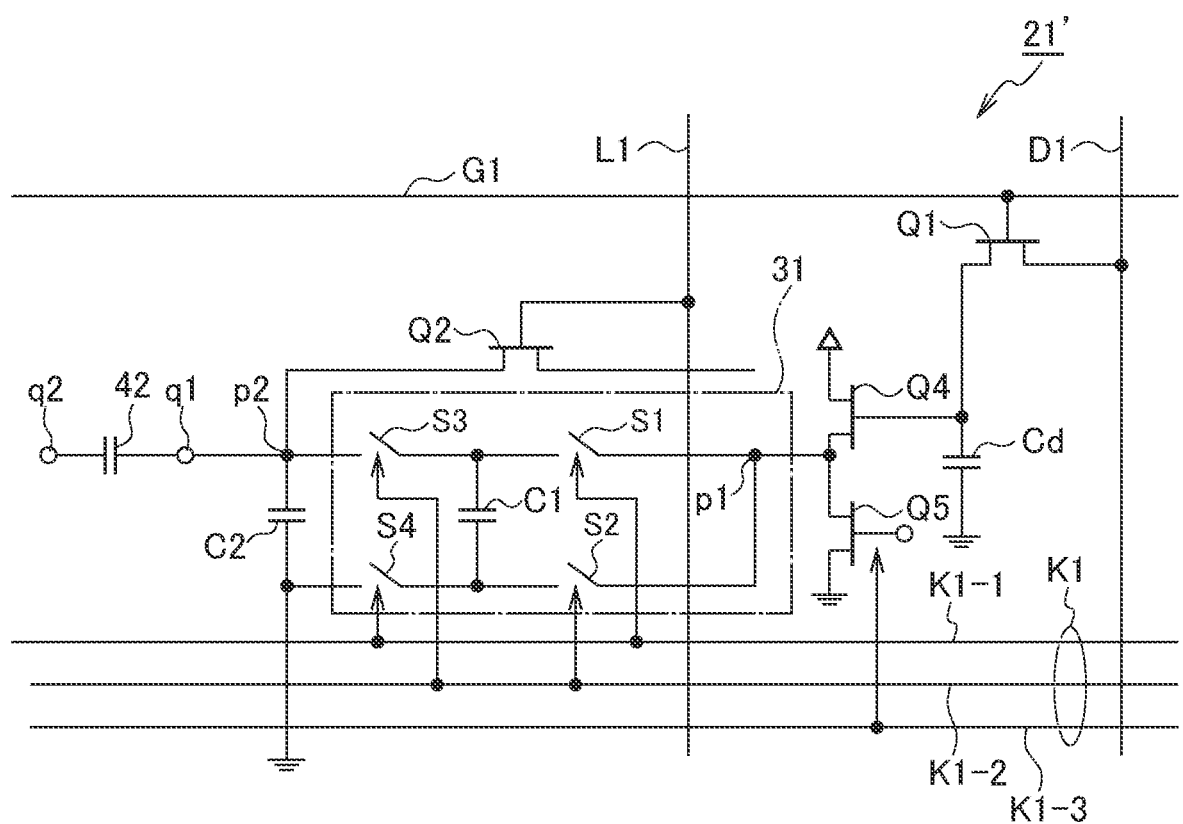
FIG. 31 is an explanatory diagram showing a first modification of a pixel circuit provided in the phase modulator according to the ninth embodiment.

Next, a first modification of the ninth embodiment will be described. FIG. 31 is a circuit diagram showing a configuration of a pixel circuit 21' according to a first modification of the ninth embodiment. As shown in FIG. 31, in the pixel circuit 21', the driving line L1 is arranged in the vertical direction. Therefore, the same voltage can be output to the liquid crystal 42 in the vertical direction of the pixel circuits 21' arranged in the matrix. Therefore, the direction in which the refractive index changes becomes the longitudinal direction.

That is, in the example shown in FIGS. 6A and 6B, the refractive index of the liquid crystal 42 changes in the vertical direction, whereas in the first modification of the ninth embodiment shown in FIG. 31, the refractive index of the liquid crystal 42 changes in the horizontal direction.

Description of Second Modification of Ninth Embodiment

Next, a second modification of the ninth embodiment will be described. FIGS. 32A and 32B are explanatory views showing temporal changes in the ramp waveform voltage according to the second modification of the ninth embodiment. In the second modification of the ninth embodiment, 2 pixel circuits are connected to the intersections of the column data lines D1 to Dm and the row scanning lines G1 to Gn shown in FIG. 27, respectively. These are referred to as a first pixel circuit 21A and a second pixel circuit 21B.

Then, the first pixel circuit 21A has a positive polarity and the second pixel circuit 21B has a negative polarity, and the first pixel circuit 21A and the second pixel circuit 21B apply a ramp waveform voltage in which the directions in which the voltages change are reversed to each other.

That is, as shown in the graph (a) of FIG. 32A, a monotonically increasing ramp waveform voltage is applied to the first pixel circuit 21A, and as shown in the graph (a) of FIG. 32B, a monotonically decreasing ramp waveform voltage is applied to the second pixel circuit 21B. In the gradation h, the control voltage VpixH (see FIG. 32A) and the control voltage VpixL (see FIG. 32B) can be obtained. Therefore, as shown in the graph (b) of FIG. 32A, the voltages CceL to VpixH with respect to the voltage CceL of the counter electrode and the voltages VpixL to CceH with respect to the voltage CceH of the counter electrode can be output to the liquid crystal 42, and the gradation of the liquid crystal 42 can be changed in a time shorter than 1 horizontal scanning period. Therefore, the accuracy of the phase modulation can be further improved.

Description of Tenth Embodiment

The basic configuration of a phase modulator according to a tenth embodiment is the same as the basic configuration of the embodiments shown in FIGS. 1 and 2 described in the first embodiment, and therefore the description thereof is omitted.

Figure 33:
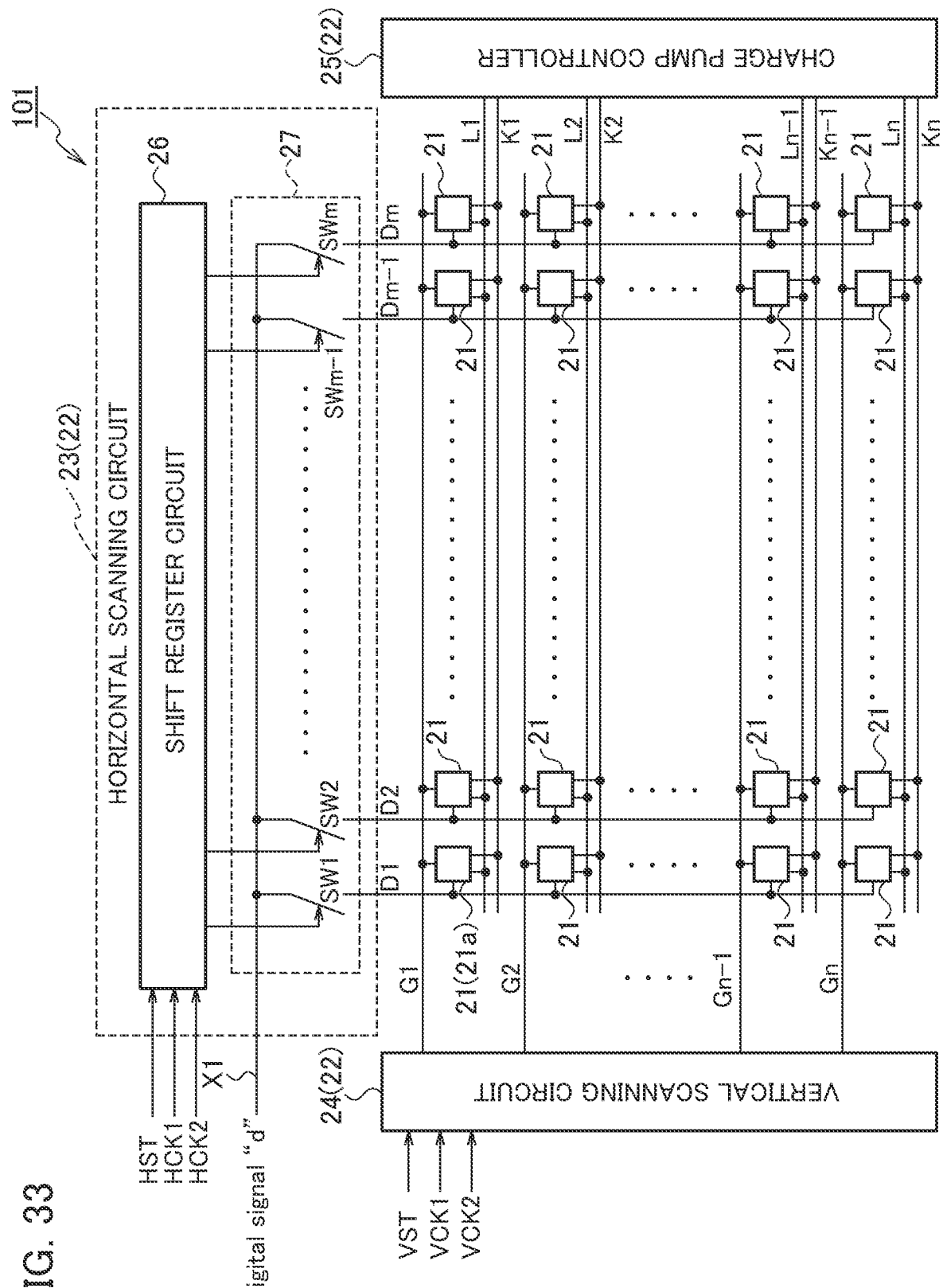
FIG. 33 is a circuit diagram of a phase modulator according to a tenth embodiment.

In the phase modulator 101 according to the tenth embodiment, the configuration of each pixel circuit 21 and a control circuit 22 for controlling each pixel circuit 21 will be described with reference to the block diagram shown in FIG. 33 and the circuit diagram shown in FIG. 34. In FIG. 33, the control circuit 22 includes a plurality of (m columns, n rows) pixel circuits 21 arranged in a matrix, a horizontal scanning circuit 23, a vertical scanning circuit 24, and a charge pump controller 25. Then, the control circuit 22 outputs an electric signal to each pixel circuit 21 to drive each pixel circuit 21, and a driving voltage is applied from each pixel circuit 21. The refractive index of each liquid crystal 42 on each reflection pixel to the incident light is controlled to be a desired value.

The plurality of (m×n) pixel circuits 21 are arranged in a matrix at the intersections (intersecting locations) of m number of column data lines (D1 to Dm) and n number of row scanning lines (G1 to Gn) which are orthogonal to each other. The plurality of pixel circuits 21 are all configured identically. Further, in parallel with the row scanning lines (G1 to Gn), driving lines (L1 to Ln) and control lines (K1 to Kn) are provided. The driving lines (L1 to Ln) and the control lines (K1 to Kn) are connected to the charge pump controller 25.

The driving lines (L1 to Ln) are lines for transmitting control signals for switching on/off each second transistor Q2 (short-circuit switch; see FIG. 34) provided in each pixel circuit 21. The control lines (K1 to Kn) are lines for transmitting control signals for switching on/off the switches S1 to S4 (see FIG. 34) provided in each pixel circuit 21. As shown in FIG. 34, each of the plurality of control lines (K1 to Kn) includes a plurality of lines (in FIG. 34, two lines K1-1, K1-2), but in FIG. 33, only one control line K1 is used.

The column data lines (D1 to Dm) are lines for supplying digital signals outputted from the digital signal line X1 to each pixel circuit 21.

Figure 34:
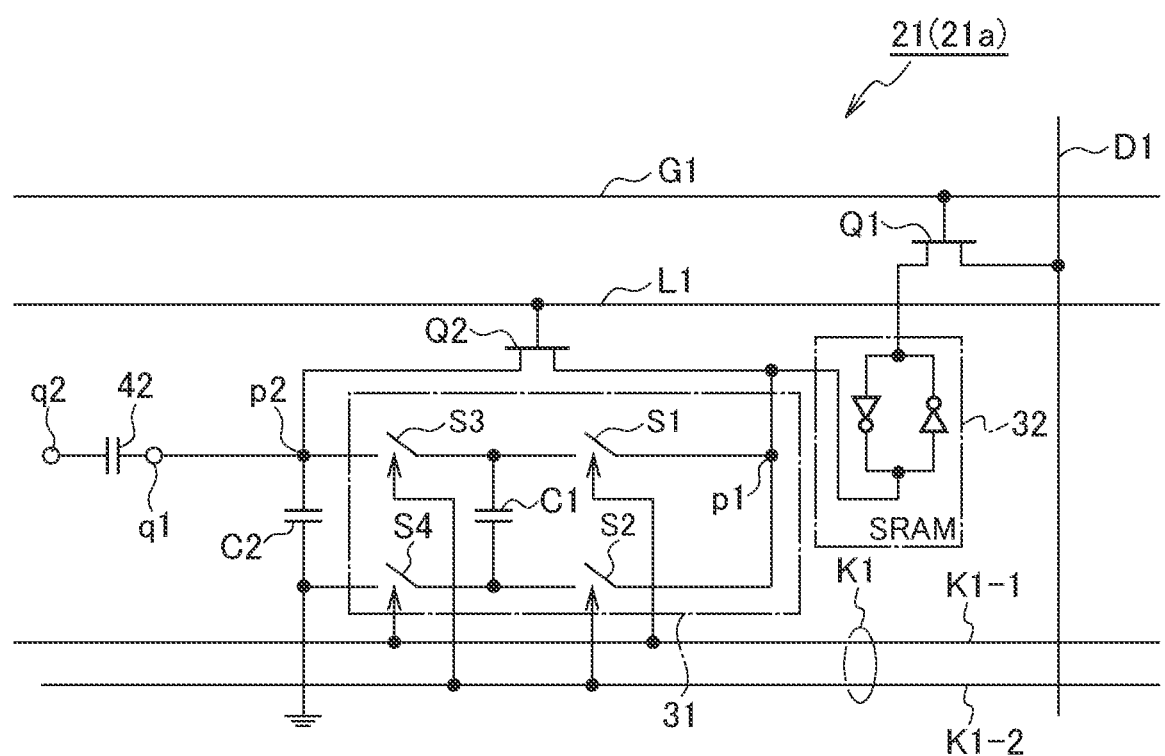
FIG. 34 is a circuit diagram showing a configuration of each pixel circuit provided in the phase modulator according to the tenth embodiment.

FIG. 34 is a circuit diagram showing a detailed configuration of the pixel circuit 21. Here, the configuration of the pixel circuit 21 (i.e. referred to as a pixel circuit 21a) disposed at the intersection of the column data line D1 and the row scanning line G1 shown in FIG. 33 will be described. As shown in FIG. 34, the pixel circuit 21a includes an SRAM (static RAM; digital signal holding unit) 32, a first transistor Q1, a second transistor Q2, a charge pump 31, and an output capacitor C2.

The SRAM 32 holds a digital signal composed of a pulse pattern corresponding to each bit supplied from the column data line D1, and outputs a digital signal of the voltage VLC having the maximum amplitude. As described later, the SRAM 32 outputs a digital signal of voltage "0" or "VLC". Specifically, when the pulse does not stand, a voltage "VLC" is outputted, and when the pulse does stand, a pulse pattern of an amplitude "VLC" is outputted. Further, by driving the charge pump 31, the voltage VLC can be amplified to a voltage "2×VLC" twice higher and supplied to the liquid crystal 42.

That is, the SRAM 32 has a function of outputting a digital signal corresponding to the pulse number or pulse width of the digital signal supplied to the column data line. The first transistor Q1 is a switching transistor, and is composed of, for example, an N-channel MOSFET (field effect transistor). The first terminal (e.g. drain) of the first transistor Q1 is connected to the column data line D1, and the second terminal (e.g. source) is connected to the input of the SRAM 32. The control terminal (e.g. gate) of the first transistor Q1 is connected to the row scanning line G1. Therefore, when the row scanning line G1 is selected and a digital signal is input from the column data line D1, the digital signal is supplied to the SRAM 32.

The second transistor Q2 is a switching transistor in the same manner as the first transistor Q1 described above, and is formed of, for example, an N-channel MOSFET (field effect transistor). The second transistor Q2 has a first terminal (e.g. drain) connected to the input terminal p1 of the charge pump 31, and a second terminal (e.g. source) connected to the output terminal p2 of the charge pump 31.

The control terminal (e.g. gate) of the second transistor Q2 is connected to the driving line L1. Therefore, when a voltage of "H" level is supplied to the driving line L1, the second transistor Q2 is turned on to short-circuit the input terminal p1 and the output terminal p2 of the charge pump 31, so that the voltage supplied to the input terminal p1 can be output to the output terminal p2 as it is, and the function of the charge pump 31 can be stopped. On the contrary, when a voltage of "L" level is supplied to the driving line L1, the second transistor Q2 is turned off, the input terminal p1 and the output terminal p2 of the charge pump 31 are opened, and the charge pump 31 can be operated. That is, the second transistor Q2 has a function as a short circuit switch for short-circuiting the input terminal p1 to which the output voltage of the SRAM 32 is supplied to the charge pump 31 and the output terminal p2 to output the voltage (driving voltage) from the charge pump 31 to the liquid crystal 42.

As described later, when the number of data bits of the digital signal supplied from the column data line D1 is in the range of "0 to m/2" (where m is the maximum number of bits), the charge pump controller 25 (see FIG. 33) short-circuits the second transistor Q2 and stops driving the charge pump 31. When the number of data bits of the digital signal is in the range of "m/2 to m", the second transistor Q2 is opened to enable the charge pump 31 to be driven.

The charge pump 31 includes 4 switches S1 to S4 and a first capacitor C1 for accumulating charge, and amplifies a voltage (output voltage of the SRAM 32) supplied to an input terminal p1 and outputs it to an output terminal p2.

In the charge pump 31, the first switch S1 and the third switch S3 are connected in series with each other, the end of the first switch S1 side is connected to the input terminal p1, and the end of the third switch S3 side is connected to the output terminal p2. The second switch S2 and the fourth switch S4 are connected in series with each other, and the end of the second switch S2 side is connected to the input terminal p1, and the end of the fourth switch S4 side is connected to the ground.

Further, a first capacitor C1 is provided between a connection point of the first switch S1 and the third switch S3 and a connection point of the second switch S2 and the fourth switch S4. The output terminal p2 is connected to the ground via the output capacitor C2, and further connected to the pixel electrode q1 of the liquid crystal 42. That is, one end of the first capacitor C1 is connected to the first switch S1 and the third switch S3, and the other end of the first capacitor C1 is connected to the second switch S2 and the fourth switch S4. As described above, the common electrode q2 of the liquid crystal 42 is a transparent electrode provided on a transparent glass. A common electrode voltage is applied to the transparent electrode.

The liquid crystal 42 is driven according to a potential difference between a driving voltage applied from the pixel circuit 21 to the pixel electrode q1 and a common electrode applied to the common electrode q2. Therefore, the incident light incident into the liquid crystal 42 is phase-modulated according to the potential difference and reflected.

Also in the ninth embodiment, the relationship between the angle of the incident light incident into the reflection pixel 20 corresponding to the pixel circuit 21 provided on the reflection substrate 11 and the angle of the reflected light reflected by the reflection pixel 20 corresponding to the pixel circuit 21 is the same as that described with reference to FIG. 5 in the first embodiment, and therefore, the description thereof is omitted.

Although the first embodiment is described as a change in the refractive index of the liquid crystal according to the voltage value, the refractive index can be changed according to the number of pulses, the pulse width and the pulse pattern even when a high frequency pulse signal is added to the liquid crystal. In the case of a pulse pattern, for example, the change amount of the refractive index can be increased as the number of pulses increases.

As shown in FIG. 33, the horizontal scanning circuit 23 provided in the control circuit 22 includes a shift register circuit 26 and a switch circuit 27 including switches SW1 to SWm.

The shift register circuit 26 receives a horizontal synchronization signal (HST) and horizontal scanning clock signals (HCK1, HCK2). The shift register circuit 26 sequentially shifts the clock signals on the basis of the horizontal synchronization signal and the clock signal for horizontal scanning to generate switching signals (i.e. referred to as "SD1 to SDm") to be output to the switch circuit 27 in a period of 1 horizontal scanning period.

The switch circuit 27 includes m number of switches SW1 to SWm for switching on/off of the column data lines (D1 to Dm). The switches SW1 to SWm are controlled to be on or off based on switching signals (SD1 to SDm) outputted from the shift register circuit 26. The switches SW1 to SWm are provided corresponding to the column data lines (D1 to Dm) and sequentially input the digital signal "d" corresponding to each column data line.

The switches SW1 to SWm selectively apply digital signals corresponding to respective column data lines (D1 to Dm) to the column data lines. For example, the switch SW1 is turned on when the switching signal SD1 is at a high level, selects a digital signal corresponding to the column data line D1, and outputs the selected digital signal to the column data line D1. The digital signal is supplied from the digital signal line X1.

Figure 35:
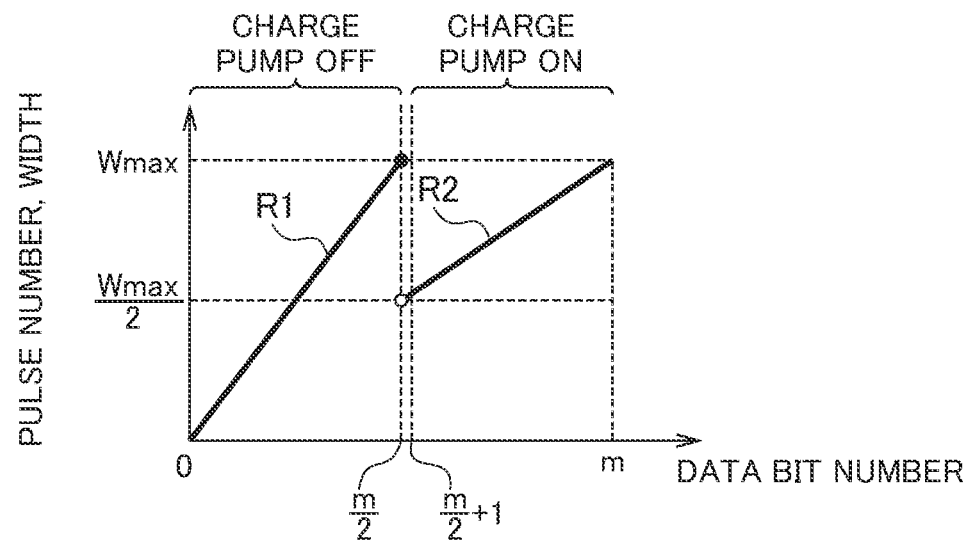
FIG. 35 is a graph showing the relationship between the number of data bits of a digital signal and the number and width of pulses in the phase modulator according to the tenth embodiment.

FIG. 35 is a graph showing the relationship between the number of data bits and the number of pulses of the digital signal. In FIG. 35, the horizontal axis indicates the number of data bits (maximum value: m) of the digital signal supplied from the column data line D1, and the vertical axis indicates the number of pulses. Although it is possible to use a pulse width instead of the number of pulses, the description will be made as the number of pulses.

As shown in FIG. 35, in the range of the number of data bits from 0 to (m/2), as shown in the graph R1, the number of pulses varies from 0 to the maximum value Wmax. In the range of the number of data bits from (m/2) to m, as shown in the graph R2, the number of pulses varies from (Wmax/2) to Wmax. Then, the charge pump 31 is turned off in the range of the number of data bits from 0 to (m/2), and the charge pump 31 is turned on in the range of (m/2) to m. That is, the charge pump controller 25 shown in FIG. 33 controls the charge pump 31 to be turned off in the range of the number of data bits of the digital signal from 0 to (m/2), and the charge pump 31 to be turned on in the range of (m/2) to m.

In FIG. 35, when there is no pulse of the digital signal, the voltage supplied from the column data line is "0". At this time, the output voltage of the SRAM 32 is "VLC". When the pulse is standing and the number of data bits is in the range of 0 to (m/2), the SRAM 32 outputs a pulse pattern corresponding to each bit at the voltage VLC which is the maximum amplitude of the digital signal. At this time, the charge pump 31 is turned off. Therefore, the voltage VLC outputted from the SRAM 32 is not amplified by the charge pump 31, but is supplied as a driving voltage to the liquid crystal 42.

When a pulse is present and the number of data bits is in the range of (m/2) to m, the SRAM 32 outputs a pulse pattern corresponding to each bit at the voltage VLC which is the maximum amplitude of the digital signal. At this time, the charge pump 31 is turned on. Therefore, the voltage VLC outputted from the SRAM 32 is amplified by the charge pump 31 to a voltage that is twice higher (2×VLC), and a pulse pattern of this voltage (2×VLC) is supplied to the liquid crystal 42 as a driving voltage.

Therefore, when the pulse does not stand, the voltage outputted from the SRAM 32 can be set to "VLC" and the driving voltage supplied to the liquid crystal 42 can be set to "VLC". Further, by outputting the voltage VLC from the SRAM 32 and stopping the charge pump 31, the driving voltage supplied to the liquid crystal 42 can be set to "VLC". Further, by outputting the pulse pattern of the voltage VLC from the SRAM 32 and driving the charge pump 31, the voltage VLC can be amplified by a factor of 2, so that the amplitude "2×VLC" of the driving voltage supplied to the liquid crystal 42 can be made.

Although the graphs R1 and R2 shown in FIG. 35 are linear, the relationship between the phase change and the voltage in the liquid crystal 42 is not necessarily linear, so that the number of pulses is not necessarily linear. Since the polarity of the voltage outputted from the SRAM 32 is inverted, the voltage with the inverted polarity is supplied to the pixel electrode q1. Correspondingly, by inverting the voltage supplied to the common electrode q2, a desired voltage can be applied to the liquid crystal 42.

Thus, by the operation of the charge pump 31, the amplitude of the driving voltage of the pulse pattern supplied to the liquid crystal 42 can be set in 3 ways of "0", "VLC" and "2×VLC". By the pulse pattern (pulse width or number of pulses) of each amplitude, the liquid crystal 42 can be set to a plurality of gradations.

Therefore, by controlling on/off of each switch SW1 to SWm provided in the switch circuit 27 and controlling driving of the charge pump 31, the pixel circuit 21 can generate driving signals of a plurality of gradations and supply them to the liquid crystal 42.

As shown in FIG. 33, the vertical scanning circuit 24 is connected to row scanning lines (G1 to Gn). The vertical scanning circuit 24 receives a vertical synchronization signal (VST) and clock signals (VCK1, VCK2) for vertical scanning.

The vertical scanning circuit 24 supplies a row selection signal (scanning signal) sequentially from the row scanning line G1 to the row scanning line Gn in a period of 1 horizontal scanning period based on the vertical synchronizing signal and the clock signal for vertical scanning.

The charge pump controller 25 outputs a drive signal to each driving line (L1 to Ln) shown in FIG. 33. Specifically, when the number of data bits of the digital signal supplied from the column data line is in the range of 0 to (m/2), an "H" level signal is outputted to the driving line. When the number of data bits of the digital signal is in the range of (m/2) to m, a signal of "L" level is outputted to the driving line. Further, the charge pump controller 25 performs control so as not to drive the charge pump 31 when a signal of "H" level is supplied to the driving line, but to drive the charge pump 31 when a signal of "L" level is supplied to the driving line. The operation of the charge pump 31 will be described below.

When driving the charge pump 31, the charge pump controller 25 outputs a control signal for controlling on/off of each of the switches S1 to S4 shown in FIG. 34 to the control line K1 (K1-1, K1-2). Specifically, when a pulse pattern is outputted from the SRAM 32, the first switch S1 and the fourth switch S4 are turned on, and the second switch S2 and the third switch S3 are turned off.

Therefore, the voltage according to the pulse pattern of the amplitude VLC outputted from the SRAM 32 is stored in the first capacitor C1. After the lapse of a predetermined time, the first switch S1 and the fourth switch S4 are turned off, and the second switch S2 and the third switch S3 are turned on. As a result, the voltage of the pulse pattern outputted from the SRAM 32 and the voltage VLC stored in the first capacitor C1 are added, and the added voltage is stored in the output capacitor C2. Therefore, the voltage accumulated in the output capacitor C2 is outputted to the pixel electrode q1.

Then, in the phase modulator 101 according to the tenth embodiment, among the (n×m) pixel circuits 21 shown in FIG. 33, a block including some pixel circuits is set. For example, in the tenth embodiment, as in the case of the first embodiment, as shown in FIG. 6A, a block including (5 rows×6 columns) pixel circuits 21 is set.

In FIG. 6A, the 6 pixel circuits 21-11 to 21-16 in the same row are set to the same refractive index. For example, the pixel circuits 21-11 to 21-16 in the first row are set to the first refractive index, and the pixel circuits 21-21 to 21-26 in the second row are set to the second refractive index. The pixel circuits 21-31 to 21-36 of the third row are set to the third refractive index, the pixel circuits 21-41 to 21-46 of the fourth row are set to the fourth refractive index, and the pixel circuits 21-51 to 21-56 of the fifth row are set to the fifth refractive index.

Specifically, as shown in FIG. 6B, in the pixel circuits 21-11 to 21-51 arranged in the vertical direction, the refractive index of each liquid crystal 42 is set to change in 5 levels. Therefore, the 6 pixel circuits 21 arranged in the horizontal direction are made into one group, and the phase can be changed in 5 levels, and thus the reflected light phase-modulated in 5 levels can be obtained. The vertical direction and the horizontal direction may be interchanged.

Description of Operation of Tenth Embodiment

Figure 36:
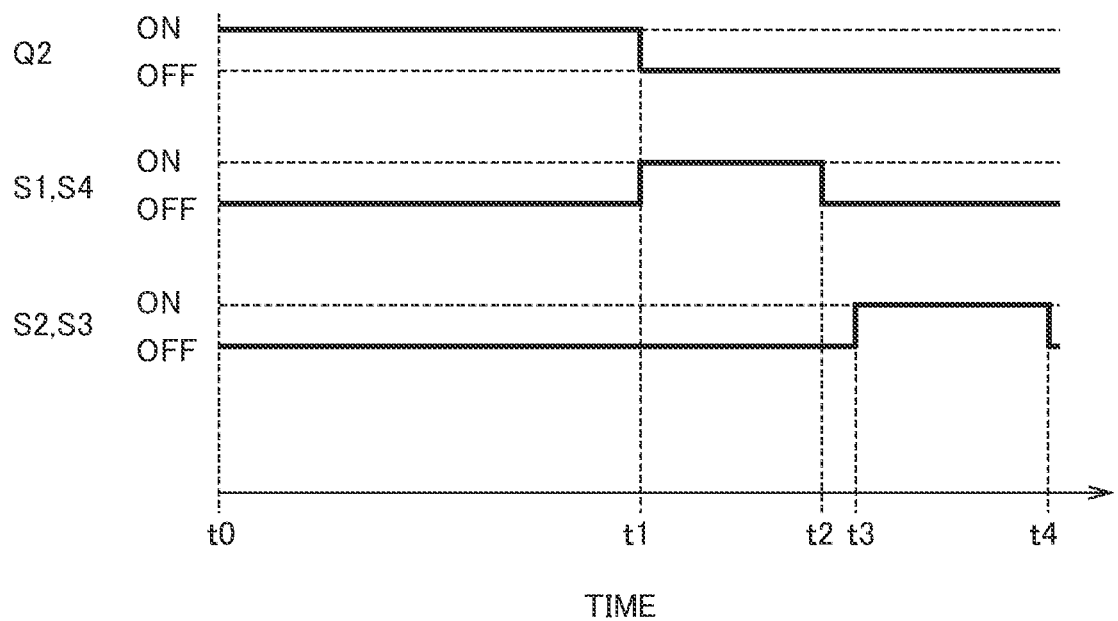
FIG. 36 is a timing chart showing operations of a second transistor Q2 and switches S1 to S4 provided in each pixel circuit of the phase modulator according to the tenth embodiment.

The operation of the phase modulator 101 according to the tenth embodiment will be described with reference to the graph shown in FIG. 45 and the timing chart shown in FIG. 36. In the following, as shown in FIG. 6A, an example in which the pixel circuits 21 arranged in a 6×5 matrix and the reflection pixels corresponding to the pixel circuits 21 are provided will be described.

The horizontal scanning circuit 23 shown in FIG. 33 controls on/off of the switches SW1 to SWm (where m=6) provided in the switching circuit 27, thereby supplying the digital signal supplied from the digital signal line X1 to the desired column data line.

Further, by driving the vertical scanning circuit 24, the scanning line corresponding to the desired pixel circuit 21 is selected from the respective scanning lines (G1 to Gn) (where n=5). As a result, the digital signal can be supplied to the SRAM 32 of the desired pixel circuit 21.

Specifically, when the pulse of the digital signal does not stand, the SRAM 32 outputs a voltage "VLC". As shown in the graph R1 of FIG. 7, when the number of data bits is in the range of 0 to (m/2) and the pulse is standing, the SRAM 32 outputs a pulse pattern of amplitude "VLC". At this time, as shown at times t0 to t1 in FIG. 8, the second transistor Q2 is turned on and all the switches S1 to S4 are turned off. Therefore, the charge pump 31 is not driven. The pulse pattern of amplitude "VLC" is supplied via the second transistor Q2 to the pixel electrode q1 and the liquid crystal 42.

On the other hand, as shown in the graph R2 of FIG. 35, when the number of data bits is in the range of (m/2) to m and the pulse is standing, the SRAM 32 outputs a pulse pattern of amplitude "VLC". At this time, as shown at times t1 to t4 in FIG. 36, the second transistor Q2 is turned off. Furthermore, at times t1 to t2, the first switch S1 and the fourth switch S4 are turned on, the second switch S2 and the third switch S3 are turned off, and at times t3 to t4, the second switch S2 and the third switch S3 are turned on, and the first switch S1 and the fourth switch S4 are turned off, so that the pulse pattern outputted from the SRAM 32 is amplified by a factor of 2 and supplied to the pixel electrode q1 and the liquid crystal 42.

Explanation of Effects of Tenth Embodiment

In the phase modulator 101 according to the tenth embodiment, the digital signal outputted from the column data line (D1 to Dm) is inputted to the SRAM 32 provided in each pixel circuit 21. By controlling the driving and stopping of the charge pump 31, the liquid crystal 42 can be switched to a plurality of gradations in the range of "0" to "2×VLC".

Therefore, when the maximum value of the digital signal outputted from the SRAM 32 is the voltage VLC, the driving voltage for driving the liquid crystal 42 can be set within a voltage range that is twice the voltage (2×VLC). Therefore, the refractive index of the liquid crystal 42 can be changed over a wider range, and the accuracy of phase modulation can be improved.

Further, since gradation can be set in a wide voltage range without increasing the maximum voltage VLC of the voltage supplied to the pixel circuit 21, it is not necessary to increase the breakdown voltage of each component constituting the control circuit 22, and the device can be miniaturized and lightened.

Further, since the voltage range for setting the gradation of the liquid crystal 42 is set to a voltage which is twice the predetermined maximum voltage (VLC), a desired driving voltage can be obtained by a simple process of amplifying the voltage outputted from the SRAM 32 by twice, thereby simplifying the circuit configuration.

In the tenth embodiment, the refractive index of the liquid crystal 42 is set to change in one direction out of the column direction and the row direction shown in FIG. 33, and the driving lines (L1 to Ln) each for switching the charge pump on and off are arranged in the other direction. Therefore, it is possible to prevent the alignment of the liquid crystal from being disturbed due to the change in the refractive index.

Further, since the SRAM 32 is used as the digital signal holding unit, the digital signal can be held with a simple configuration and output to the charge pump 31. Furthermore, since the digital signal is used in the tenth embodiment, the operation of switching the gradation can be performed at a higher speed.

In the tenth embodiment, as the maximum value of the driving voltage for driving the liquid crystal 42, a voltage which is twice the maximum voltage VLC (2×VLC) is set, but it is not limited to this, and the maximum value of the driving voltage may be larger than a predetermined maximum voltage (VLC).

Description of Modification of Tenth Embodiment

Figure 37:
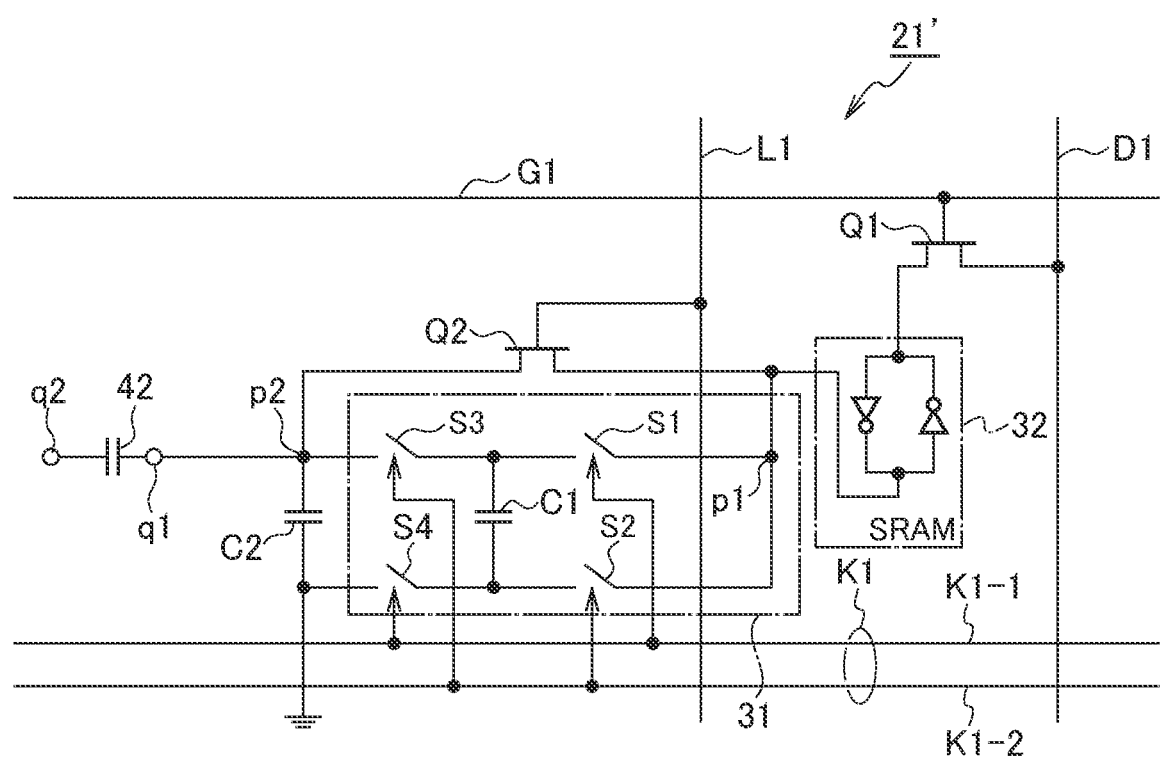
FIG. 37 is an explanatory diagram showing a configuration of each pixel circuit provided in the phase modulator according to a modification of the tenth embodiment.

Next, a modification of the tenth embodiment will be described. FIG. 37 is a circuit diagram showing a configuration of a pixel circuit 21' according to the modification of the tenth embodiment. As shown in FIG. 37, in the pixel circuit 21', the driving line L1 is arranged in the vertical direction. Therefore, the charge pump circuit can be turned on or off in the vertical direction of each pixel circuit 21' arranged in a matrix. Therefore, the direction in which the refractive index changes becomes the lateral direction.

That is, in the example shown in FIGS. 6A and 6B, the refractive index of the liquid crystal 42 changes in the vertical direction, while in the modification of the tenth embodiment shown in FIG. 37, the refractive index of the liquid crystal 42 changes in the horizontal direction. In this case, the digital signal supplied to the pixel circuit 21' is set so that the number of pulses or the pulse width changes in 1 vertical scanning period.

While embodiments of the invention have been described above, the discussion and drawings forming part of the disclosure should not be construed as limiting the invention. Various alternative embodiments, embodiments and operational techniques will be apparent to those skilled in the art from this disclosure.

What is claimed is:

1. A phase modulator for reflecting incident light at a desired angle, comprising:
   a plurality of column data lines and a plurality of row scanning lines orthogonal to each other;
   a plurality of pixel circuits provided at positions where the plurality of column data lines and the plurality of row scanning lines intersect each other;
   a plurality of reflection pixels provided respectively corresponding to the plurality of pixel circuits;
   a plurality of liquid crystal layers provided corresponding to each of the plurality of reflection pixels and each of whose refractive index with respect to incident light is changed by a driving voltage supplied from a corresponding pixel circuit; and
   a charge pump controller, wherein
   each of the column data lines outputs a control voltage varying within a range up to a predetermined maximum voltage to each of the pixel circuits,
   each of the pixel circuits includes a charge pump configured to amplify the control voltage, and
   when the driving voltage supplied to a corresponding liquid crystal layer is not higher than the predetermined maximum voltage, the charge pump controller is configured to output the control voltage to the corresponding liquid crystal layer without amplifying the control voltage, and when the driving voltage exceeds the predetermined maximum voltage, the charge pump controller is configured to control the charge pump to amplify the control voltage and output an amplified control voltage to the corresponding liquid crystal layer.

2. The phase modulator of claim 1, wherein the charge pump amplifies the control voltage by adding the predetermined maximum voltage to the control voltage.

3. The phase modulator of claim 1, further comprising a control circuit configured to control the pixel circuits, wherein
   the control circuit comprises a control voltage output unit configured to output the control voltage that varies within the range up to the predetermined maximum voltage and the predetermined maximum voltage in a time-division manner, and
   when the driving voltage is not higher than the predetermined maximum voltage, the charge pump controller is configured to output the control voltage outputted from the control voltage output unit to the liquid crystal layer without amplifying, and when the driving voltage exceeds the predetermined maximum voltage, the charge pump controller is configured to amplify the control voltage and output the amplified control voltage to the liquid crystal layer by adding the control voltage outputted from the control voltage output unit in time division and the predetermined maximum voltage by the charge pump.

4. The phase modulator of claim 1, further comprising a control circuit configured to control the pixel circuits, wherein the control circuit comprises:
   the charge pump controller configured to control to supply an output voltage to the liquid crystal layer, the control voltage as the output voltage when the driving voltage is not higher than the predetermined maximum voltage, and a voltage amplified by the charge pump as the output voltage when the driving voltage exceeds the predetermined maximum voltage;
   a first selector switch configured to switch between short-circuiting and opening of a supply point for supplying the output voltage in one pixel circuit and a supply point for supplying the output voltage in another pixel circuit adjacent to the one pixel circuit; and
   a selector switch controller configured to control the first selector switch to open when the output voltage of the one pixel circuit is supplied to the liquid crystal layer, and to be short-circuit at least a part of a time when the output voltage of the one pixel circuit is not supplied to the liquid crystal layer.

5. The phase modulator of claim 1, further comprising a control circuit configured to control the pixel circuits, wherein
   each of the pixel circuits further comprises a source follower configured to amplify the control voltage or the control voltage amplified by the charge pump,
   the control circuit comprises the charge pump controller configured to control to supply an output voltage to the liquid crystal layer, the control voltage as the output voltage when the driving voltage is not higher than the predetermined maximum voltage, and a voltage amplified by the charge pump as the output voltage when the driving voltage exceeds the predetermined maximum voltage, and
   a well and a source of the source follower are connected, and a well potential and a source potential are set to be same potential.

6. The phase modulator of claim 1, further comprising
a control circuit configured to control the pixel circuits, wherein each of the pixel circuits comprises:
  a source follower configured to amplify a control voltage outputted from a corresponding column data line; and
  the charge pump configured to amplify an output voltage of the source follower as the control voltage,
the control circuit comprises the charge pump controller configured to control to supply an output voltage to the liquid crystal layer, an output of the source follower as the output voltage when the driving voltage is not higher than the predetermined maximum voltage, and a voltage amplified by the charge pump as the output voltage when the driving voltage exceeds the predetermined maximum voltage, and
a well and a source of the source follower are connected, and a well potential and a source potential are set to be same potential.

7. The phase modulator of claim 1, wherein
each of the pixel circuits further comprises a bridge circuit comprising a plurality of switches, and
the charge pump controller is configured to control to supply an output voltage to the liquid crystal layer, the output voltage that the plurality of switches is controlled to short-circuit an input terminal and an output terminal of the charge pump to output the control voltage without amplifying the control voltage when the driving voltage is not higher than the predetermined maximum voltage, and the output voltage by controlling short-circuit and opening of the plurality of switches to amplify the control voltage when the driving voltage exceeds the predetermined maximum voltage.

8. The phase modulator of claim 1, further comprising
a control circuit configured to control driving of the pixel circuits, wherein the control circuit comprises:
  the charge pump controller;
    a counter circuit for counting up to a maximum value of a predetermined digital gradation; and
    a comparator circuit which compares a gradation value corresponding to each of the pixel circuits with a count value outputted from the counter circuit, and outputs a switching control signal when the gradation value and the count value match,
  a ramp-like reference voltage varying up to the predetermined maximum voltage is applied to a wiring connected to the column data line via the switch circuit, and
when the switch circuit is turned off at a timing of the switching control signal, the control voltage is determined and held in each pixel circuit.

9. The phase modulator of claim 1, further comprising
a control circuit configured to control driving of the pixel circuits, wherein each of the pixel circuit comprises:
  a digital signal holding unit configured to hold a digital signal when the digital signal having a predetermined pulse width or a predetermined number of pulses is supplied; and
  the charge pump configured to amplify the digital signal outputted from the digital signal holding unit as the control voltage, and
the control circuit includes the charge pump controller configured to control to supply an output voltage to the liquid crystal layer, the output voltage outputting the digital signal to the liquid crystal layer without amplifying when the driving voltage is not higher than the maximum amplitude of the digital signal, and the output voltage amplifying the digital signal by the charge pump when the driving voltage exceeds the maximum amplitude.

10. The phase modulator of claim 1, wherein
the refractive index of each of the liquid crystal layers is set to change in one direction in directions perpendicular to each other, and a driving line for switching the charge pump on and off is arranged in another direction in the directions perpendicular to each other.

11. The phase modulator of claim 1, wherein
each of the pixel circuits includes a short circuit switch configured to short-circuit an input terminal to which the control voltage is supplied to the charge pump and an output terminal for outputting the control voltage from the charge pump to a corresponding liquid crystal layer, and
the charge pump controller is configured to short-circuit the short circuit switch when the driving voltage output to the corresponding liquid crystal layer is not higher than the predetermined maximum voltage, and open the short circuit switch when the driving voltage output to the corresponding liquid crystal layer exceeds the predetermined maximum voltage.

12. The phase modulator of claim 1, wherein
each of the pixel circuit further comprises an output capacitor configured to store a voltage to be supplied to a corresponding liquid crystal layer, and
the charge pump comprises:
  a first capacitor for storing electric charge;
  a first switch provided between one end of the first capacitor and an input terminal to which the control voltage is supplied;
  a second switch provided between the other end of the first capacitor and the input terminal;
  a third switch provided between the one end of the first capacitor and one end of the output capacitor; and
  a fourth switch provided between the other end of the first capacitor and the other end of the output capacitor.

13. The phase modulator of claim 1, wherein
a maximum voltage of the driving voltage supplied to the liquid crystal layers is set to twice the predetermined maximum voltage.

14. A phase modulation method for reflecting incident light at a desired angle, comprising:
  a control voltage output step of outputting a control voltage varying in a range up to a predetermined maximum voltage to a plurality of pixel circuits provided at positions where a plurality of column data lines and a plurality of row scanning lines orthogonal to each other intersect each other;
  a non-amplified voltage output step of outputting the control voltage to liquid crystal layers without amplifying the control voltage when a driving voltage supplied to the liquid crystal layers is not higher than the predetermined maximum voltage, the liquid crystal layers provided corresponding to each of the pixel circuits and each of whose refractive index for incident light varies according to the input voltage; and
  an amplified voltage output step of amplifying the control voltage by a charge pump and outputting an amplified control voltage to the liquid crystal layers when the driving voltage exceeds the predetermined maximum voltage.

15. The phase modulation method of claim 14, wherein
in the amplified voltage output step, when the driving voltage exceeds the predetermined maximum voltage, the charge pump adds the predetermined maximum voltage to the control voltage to amplify the control voltage and output the amplified control voltage to the liquid crystal layers.

16. The phase modulation method of claim 14, wherein
the control voltage output step outputs to the plurality of pixel circuits the control voltage varying in the range up to the predetermined maximum voltage and the predetermined maximum voltage in time division, and
in the amplified voltage output step, when the driving voltage exceeds the predetermined maximum voltage, the charge pump adds the predetermined maximum voltage to the control voltage to amplify the control voltage and output the amplified control voltage to the liquid crystal layers.

17. The phase modulation method of claim 14, wherein
in the non-amplified voltage output step, when the driving voltage is not higher than the predetermined maximum voltage, a voltage which does not amplify the control voltage is outputted to a supply point,
in the non-amplified voltage output step, when the driving voltage exceeds the predetermined maximum voltage, a voltage obtained by amplifying the control voltage by the charge pump is outputted to the supply point, and
in a first selector switch control step, when the voltage at the supply point is supplied to the liquid crystal layer, the first selector switch for switching between short-circuiting and open-circuiting the supply point in one pixel circuit and the supply point in another pixel circuit adjacent to the one pixel circuit is opened, and the first selector switch is controlled so as to be short-circuited at least for a part of time when the voltage at the supply point is not supplied to the liquid crystal layer.

18. The phase modulation method of claim 14, wherein
in the non-amplified voltage output step, when the driving voltage is not higher than the predetermined maximum voltage, a voltage for which the control voltage is not amplified by the charge pump is amplified by a source follower and output to the supply point,
in the amplified voltage output step, when the driving voltage exceeds the predetermined maximum voltage, a voltage obtained by amplifying the control voltage by the charge pump is amplified by the source follower and output to the supply point, and
a well and a source of the source follower are connected, and a well potential and a source potential are set to be same potential.

19. The phase modulation method of claim 14, further comprising
a control voltage amplification step of amplifying the control voltage with a source follower, wherein
in the non-amplified voltage output step, when the driving voltage is not higher than the predetermined maximum voltage, the charge pump outputs the output voltage of the source follower to the supply point without amplifying the output voltage,
in the amplified voltage output step, when the driving voltage exceeds the predetermined maximum voltage, the charge pump amplifies the output voltage of the source follower and outputs the amplified output voltage to the supply point, and
a well and a source of the source follower are connected, and a well potential and a source potential are set to be same potential.

20. The phase modulation method of claim 14, wherein
the non-amplified voltage output step is configured to control a plurality of switches provided in a bridge circuit of the charge pump to short-circuit the input terminal and the output terminal, and output the control voltage to the liquid crystal layer without amplifying the control voltage, when the driving voltage is not higher than the predetermined maximum voltage, and
the amplified voltage output step is configured to amplify the control voltage by controlling short-circuiting and opening of the plurality of switches, and output the amplified control voltage to the liquid crystal layer, when the driving voltage exceeds the predetermined maximum voltage.

* * * * *